(12) United States Patent
Kondo et al.

(10) Patent No.: US 7,831,086 B2
(45) Date of Patent: Nov. 9, 2010

(54) IMAGE PROCESSING DEVICE AND METHOD, PROGRAM, PROGRAM RECORDING MEDIUM, DATA STRUCTURE, AND DATA RECORDING MEDIUM

(75) Inventors: Tetsujiro Kondo, Tokyo (JP); Kenji Tanaka, Tokyo (JP); Tsugihiko Haga, Tokyo (JP)

(73) Assignee: Sony Corporation, Tokyo (JP)

( * ) Notice: Subject to any disclaimer, the term of this patent is extended or adjusted under 35 U.S.C. 154(b) by 601 days.

(21) Appl. No.: 10/485,577

(22) PCT Filed: Jun. 3, 2003

(86) PCT No.: PCT/JP03/06982
§ 371 (c)(1),
(2), (4) Date: Sep. 7, 2004

(87) PCT Pub. No.: WO03/103278
PCT Pub. Date: Dec. 11, 2003

(65) Prior Publication Data
US 2005/0012745 A1    Jan. 20, 2005

(30) Foreign Application Priority Data
Jun. 3, 2002    (JP) .............................. 2002-161838

(51) Int. Cl.
*G06K 9/00* (2006.01)
*G06K 9/32* (2006.01)
*G06T 15/00* (2006.01)
*G06T 15/10* (2006.01)
*G06T 15/20* (2006.01)

(52) U.S. Cl. ........................ 382/154; 382/300; 345/419; 345/427

(58) Field of Classification Search ................. 345/429, 345/427, 419; 382/154, 300; 348/39
See application file for complete search history.

(56) References Cited

U.S. PATENT DOCUMENTS 5,185,667 A * 2/1993 Zimmermann ......... 348/207.99

(Continued)

FOREIGN PATENT DOCUMENTS

EP    1 117 256    7/2001

(Continued)

OTHER PUBLICATIONS

McMillan, et al. "Plenoptic Modeling: An Image-Based Rendering System." Proceedings of SIGGRAPH 95. (1995): 39-46. Print.*
Lippman, et al. "Movie-maps: An Application of the Optical Videodisc to Computer Graphics." ACM SIGGRAPH Computer Graphics. 14.3 (1980): 32-42. Print.*

(Continued)

*Primary Examiner*—Matthew C Bella
*Assistant Examiner*—Michael A Newman
(74) *Attorney, Agent, or Firm*—Frommer Lawrence & Haug LLP; William S. Frommer; Thomas F. Presson

(57) ABSTRACT

An image processing apparatus for obtaining an image in accordance with a user's viewpoint. Original image data of an object, captured at arbitrary points on a curved surface, is stored. Considering a straight line connecting a viewpoint and a point on the object, an intersection of the straight line and the curved surface will be identified. When the object is viewed from the viewpoint, a pixel value corresponding to a light ray directed from the point on the object to the viewpoint coincides with a pixel value corresponding to a light ray directed from the point on the object to the intersection on the curved surface Ω, and this pixel value of the intersection exists in the original image data. That is, the pixel value for the point on the object as viewed from the viewpoint can be obtained from original image data captured at the intersection on the curved surface.

74 Claims, 52 Drawing Sheets

U.S. PATENT DOCUMENTS

| | | | |
|---|---|---|---|
| 5,563,650 A * | 10/1996 | Poelstra | 348/36 |
| 5,657,082 A * | 8/1997 | Harada et al. | 348/262 |
| 5,703,961 A * | 12/1997 | Rogina et al. | 382/154 |
| 5,710,875 A * | 1/1998 | Harashima et al. | 345/419 |
| 5,793,379 A * | 8/1998 | Lapidous | 345/606 |
| 5,963,664 A * | 10/1999 | Kumar et al. | 382/154 |
| 5,991,464 A * | 11/1999 | Hsu et al. | 382/300 |
| 6,009,190 A * | 12/1999 | Szeliski et al. | 382/154 |
| 6,023,523 A * | 2/2000 | Cohen et al. | 382/154 |
| 6,055,664 A * | 4/2000 | Ishii et al. | 714/763 |
| 6,198,770 B1 * | 3/2001 | Kondo | 375/240.14 |
| 6,263,100 B1 * | 7/2001 | Oshino et al. | 382/154 |
| 6,327,325 B1 * | 12/2001 | Hsieh | 378/4 |
| 6,356,397 B1 * | 3/2002 | Nalwa | 359/725 |
| 6,445,807 B1 * | 9/2002 | Katayama et al. | 382/100 |
| 6,532,036 B1 * | 3/2003 | Peleg et al. | 348/36 |
| 6,683,977 B1 * | 1/2004 | Albrecht et al. | 382/154 |
| 6,750,860 B1 * | 6/2004 | Shum et al. | 345/419 |
| 6,798,409 B2 * | 9/2004 | Thomas et al. | 345/427 |
| 6,959,120 B1 * | 10/2005 | Zhang et al. | 382/284 |
| 2001/0015751 A1 * | 8/2001 | Geng | 348/36 |
| 2001/0043737 A1 * | 11/2001 | Rogina et al. | 382/154 |
| 2003/0071891 A1 * | 4/2003 | Geng | 348/39 |
| 2004/0247173 A1 * | 12/2004 | Nielsen et al. | 382/154 |

FOREIGN PATENT DOCUMENTS

| | | |
|---|---|---|
| JP | 7 129792 | 5/1995 |
| JP | 8 96165 | 4/1996 |
| JP | 9 49714 | 2/1997 |
| JP | 9 187038 | 7/1997 |
| JP | 2000 285259 | 10/2000 |
| WO | WO 00/72270 | 11/2000 |
| WO | WO 01/05154 | 1/2001 |

OTHER PUBLICATIONS

Patent Abstracts of Japan, vol. 2000, No. 14, Mar. 5, 2001 & JP 2000 331168 A (Tokyoto Gesuido Service KK; Nippon Koei Co Ltd), Nov. 30, 2000.

Patent Abstracts of Japan, vol. 2000, No. 10, Nov. 17, 2000 & JP 2000 206635 A (Yisheng Science & amp; Technology Co Ltd), Jul. 28, 2000.

Patent Abstracts of Japan, vol. 2002, No. 6, Jun. 4, 2002 & JP 2002 064812 A (Sharp Corp), Feb. 28, 2002.

Patent Abstracts of Japan, vol. 2000, No. 13, Feb. 5, 2001 & JP 2000 276613 A (Sony Corp), Oct. 6, 2000.

* cited by examiner

Related Art

REAL WORLD

LOOK-IN TELEVISION

IMAGES AS VIEWED FROM
LARGE NUMBER OF VIEWPOINTS

FIG. 29A

| θ \ φ | −180 | −179 | −178 | --- | 0 | ----- | 178 | 179 |
|---|---|---|---|---|---|---|---|---|
| −90 | ☐ | ☐ | ☐ | --- | ☐ | ----- | ☐ | ☐ |
| −89 | ☐ | ☐ | ☐ | --- | ☐ | ----- | ☐ | ☐ |
| −88 | ☐ | ☐ | ☐ | --- | ☐ | ----- | ☐ | ☐ |
| ⋮ | ----- | ----- | ----- | --- | ----- | ----- | ----- | ----- |
| 0 | ☐ | ☐ | ☐ | --- | ☐ | ----- | ☐ | ☐ |
| ⋮ | ----- | ----- | ----- | --- | ----- | ----- | ----- | ----- |
| 89 | ☐ | ☐ | ☐ | --- | ☐ | ----- | ☐ | ☐ |
| 90 | ☐ | ☐ | ☐ | --- | ☐ | ----- | ☐ | ☐ |

FIG. 29B

| $y_\alpha$ \ $x_\alpha$ | $x_1$ | $x_1+1$ | $x_1+2$ | ------------------- | $x_2$ |
|---|---|---|---|---|---|
| $y_1$ | $p(x_1,y_1)$ | | | | |
| $y_1+1$ | | | | | |
| $y_1+2$ | | | | | |
| ⋮ | | | | | |
| $y_2$ | | | | | $p(x_2,y_2)$ |

AFTER INTERPOLATION

BEFORE INTERPOLATION

FIG. 35A

| $x_α$ \ $y_α$ | $x_1$ | $x_1+1$ | $x_1+2$ | ---------- | $x_2$ |
|---|---|---|---|---|---|
| $y_1$ | ☐ | ☐ | ☐ | | ☐ |
| $y_1+1$ | ☐ | ☐ | ☐ | | ☐ |
| $y_1+2$ | ☐ | ☐ | ☐ | | ☐ |
| ⋮ | | | | | |
| $y_2$ | ☐ | ☐ | ☐ | | ☐ |

FIG. 35B

| $θ$ \ $φ$ | −180 | −179 | −178 | --- | 0 | ----- | 178 | 179 |
|---|---|---|---|---|---|---|---|---|
| −90 | | | | --- | p(−90,0) | ----- | | |
| −89 | | | | --- | p(−89,0) | ----- | | |
| −88 | | | | --- | p(−88,0) | ----- | | |
| ⋮ | ----- | ----- | ----- | --- | ----- | ----- | ----- | ----- |
| 0 | | | | --- | p(0,0) | ----- | | |
| ⋮ | ----- | ----- | ----- | --- | ----- | ----- | ----- | ----- |
| 89 | | | | --- | p(89,0) | ----- | | |
| 90 | | | | --- | p(90,0) | ----- | | |

DIRECTION #1

DIRECTION #2

DIRECTION #3

DIRECTION #4

FIG. 48A

| φ | φmin | φmin+1 | ----------------- | φmax |
|---|------|--------|-------------------|------|
|   |      |        | ----------------- |      |

FIG. 48B

| xα \ yα | $x_1$ | $x_1+1$ | $x_1+2$ | ------------------- | $x_2$ |
|---|---|---|---|---|---|
| $y_1$ | $p(x_1,y_1)$ | | | | |
| $y_1+1$ | | | | | |
| $y_1+2$ | | | | | |
| ⋮ | | | | | |
| $y_2$ | | | | | $p(x_2,y_2)$ |

IMAGE PROCESSING DEVICE AND METHOD, PROGRAM, PROGRAM RECORDING MEDIUM, DATA STRUCTURE, AND DATA RECORDING MEDIUM

TECHNICAL FIELD

The present invention relates to image processing apparatuses and methods, programs and program recording media, and data structures and data recording media. For example, the present invention relates to an image processing apparatus and method, a program and program recording medium, and a data structure and data recording medium with which an image in accordance with a user's viewpoint can be displayed.

BACKGROUND ART

In conventional displays based on CRTs (Cathode Ray Tubes), liquid crystal panels, or projectors, an image captured, for example, by a video camera (hereinafter simply referred to as a camera when appropriate) is displayed, which is simply as viewed from a camera's position as a viewpoint, as shown in FIG. 1.

Thus, for example, even when a user moves his/her head to change his/her viewpoint for viewing an image displayed on a display, the image displayed on the display remains an image as viewed from a lens center of the camera (hereinafter referred to as a camera's viewpoint when appropriate), and the image displayed on the display does not change in accordance with the change in the user's viewpoint.

In view of this situation, as an example of image display method by which an image displayed on a display changes in accordance with a user's viewpoint, a method called zebra imaging is used.

However, zebra imaging is a method based on holography. Since an image displayed by zebra imaging is a hologram, a large amount of computation and time is required for generating the image.

As another example of image display method by which an image displayed on a display changes in accordance with a user's viewpoint, VR (Virtual Reality) systems based on IPT (Immersive Projection Technology) or IPD (Immersive Projection Display), such as CAVE developed at Illinois University, are known.

However, such VR systems are directed to images of CG (Computer Graphics), and it is difficult to display real images captured by video cameras.

DISCLOSURE OF INVENTION

The present invention has been made in view of the situation described above, and it allows even a real image actually captured to be readily changed in accordance with a user's viewpoint.

A first image processing apparatus according to the present invention comprises converting means for converting first image data into second image data as viewed from a user's viewpoint, using light-ray information representing trajectories of light rays for the capture of the first image data and representing pixel values corresponding to the light rays.

A first image processing method according to the present invention comprises a converting step of converting first image data into second image data as viewed from a user's viewpoint, using light-ray information representing trajectories of light rays for the capture of the first image data and representing pixel values corresponding to the light rays.

A first program according to the present invention comprises a converting step of converting first image data into second image data as viewed from a user's viewpoint, using light-ray information representing trajectories of light rays for the capture of the first image data and representing pixel values corresponding to the light rays.

A first program recording medium according to the present invention has recorded thereon a program comprising a converting step of converting first image data into second image data as viewed from a user's viewpoint, using light-ray information representing trajectories of light rays for the capture of the first image data and representing pixel values corresponding to the light rays.

A second image processing apparatus according to the present invention comprises converting means for converting image data into intermediate data, the intermediate data being image data in which pixel values of predetermined pixels constituting the image data are pixel values at intersections of light rays incident on the predetermined pixels and a plane perpendicular to the light rays and passing through a predetermined point.

A second image processing method according to the present invention comprises a converting step of converting image data into intermediate data, the intermediate data being image data in which pixel values of predetermined pixels constituting the image data are pixel values at intersections of light rays incident on the predetermined pixels and a plane perpendicular to the light rays and passing through a predetermined point.

A second program according to the present invention comprises a converting step of converting image data into intermediate data, the intermediate data being image data in which pixel values of predetermined pixels constituting the image data are pixel values at intersections of light rays incident on the predetermined pixels and a plane perpendicular to the light rays and passing through a predetermined point.

A second program recording medium according to the present invention has recorded thereon a program comprising a converting step of converting image data into intermediate data, the intermediate data being image data in which pixel values of predetermined pixels constituting the image data are pixel values at intersections of light rays incident on the predetermined pixels and a plane perpendicular to the light rays and passing through a predetermined point.

In a data structure according to the present invention, intersections of light rays incident on predetermined pixels constituting original image data and a plane perpendicular to the light rays and passing through a predetermined point serve as pixels, and pixel values of the pixels are used as pixel values of the predetermined pixels.

A data recording medium according to the present invention has recorded thereon image data wherein intersections of light rays incident on predetermined pixels constituting original image data and a plane perpendicular to the light rays and passing through a predetermined point serve as pixels, and wherein pixel values of the pixels are used as pixel values of the predetermined pixels.

A third image processing apparatus according to the present invention comprises intermediate-data output means for outputting intermediate data in a predetermined format, the intermediate data including pixel values corresponding to light rays from an object; viewpoint output means for outputting position information of a viewpoint for the object; and intermediate-data converting means for generating an image of the object as viewed from the viewpoint, using the intermediate data.

A third image processing method according to the present invention comprises an intermediate-data output step of outputting intermediate data in a predetermined format, the intermediate data including pixel values corresponding to light rays from an object; a viewpoint output step of outputting position information of a viewpoint for the object; and an intermediate-data converting step of generating an image of the object as viewed from the viewpoint, using the intermediate data.

A third program according to the present invention comprises an intermediate-data output step of outputting intermediate data in a predetermined format, the intermediate data including pixel values corresponding to light rays from an object; a viewpoint output step of outputting position information of a viewpoint for the object; and an intermediate-data converting step of generating an image of the object as viewed from the viewpoint, using the intermediate data.

A third program recording medium according to the present invention has recorded thereon a program comprising an intermediate-data output step of outputting intermediate data in a predetermined format, the intermediate data including pixel values corresponding to light rays from an object; a viewpoint output step of outputting position information of a viewpoint for the object; and an intermediate-data converting step of generating an image of the object as viewed from the viewpoint, using the intermediate data.

According to the first image processing apparatus, image processing method, program, and program recording medium according to the present invention, first image data is converted into second image data as viewed from a user's viewpoint, using light-ray information representing trajectories of light rays for the capture of the first image data and representing pixel values corresponding to the light rays.

According to the second image processing apparatus, image processing method, program, and program recording medium according to the present invention, image data is converted into intermediate data, the intermediate data being image data in which pixel values of predetermined pixels constituting the image data are pixel values at intersections of light rays incident on the predetermined pixels and a plane perpendicular to the light rays and passing through a predetermined point.

According to the data structure and data recording medium according to the present invention, intersections of light rays incident on predetermined pixels constituting original image data and a plane perpendicular to the light rays and passing through a predetermined point serve as pixels, and wherein pixel values of the pixels are used as pixel values of the predetermined pixels.

According to the third image processing apparatus, image processing method, program, and program recording medium, intermediate data in a predetermined format, the intermediate data including pixel values corresponding to light rays from an object is output, position information of a viewpoint for the object is output, and an image of the object as viewed from the viewpoint is generated using the intermediate data.

The image data may be either a still picture or a moving picture. Furthermore, the image data may be, for example, either real image data actually captured or CG.

BRIEF DESCRIPTION OF THE DRAWINGS

FIG. 29A is a diagram showing a format of intermediate data.

FIG. 29B is a diagram showing the format of intermediate data.

FIG. 35A is a diagram showing another format of intermediate data.

FIG. 35B is a diagram showing the another format of intermediate data.

FIG. 48A is a diagram showing a format of intermediate data.

FIG. 48B is a diagram showing the format of intermediate data.

BEST MODE FOR CARRYING OUT THE INVENTION

Figure 2:
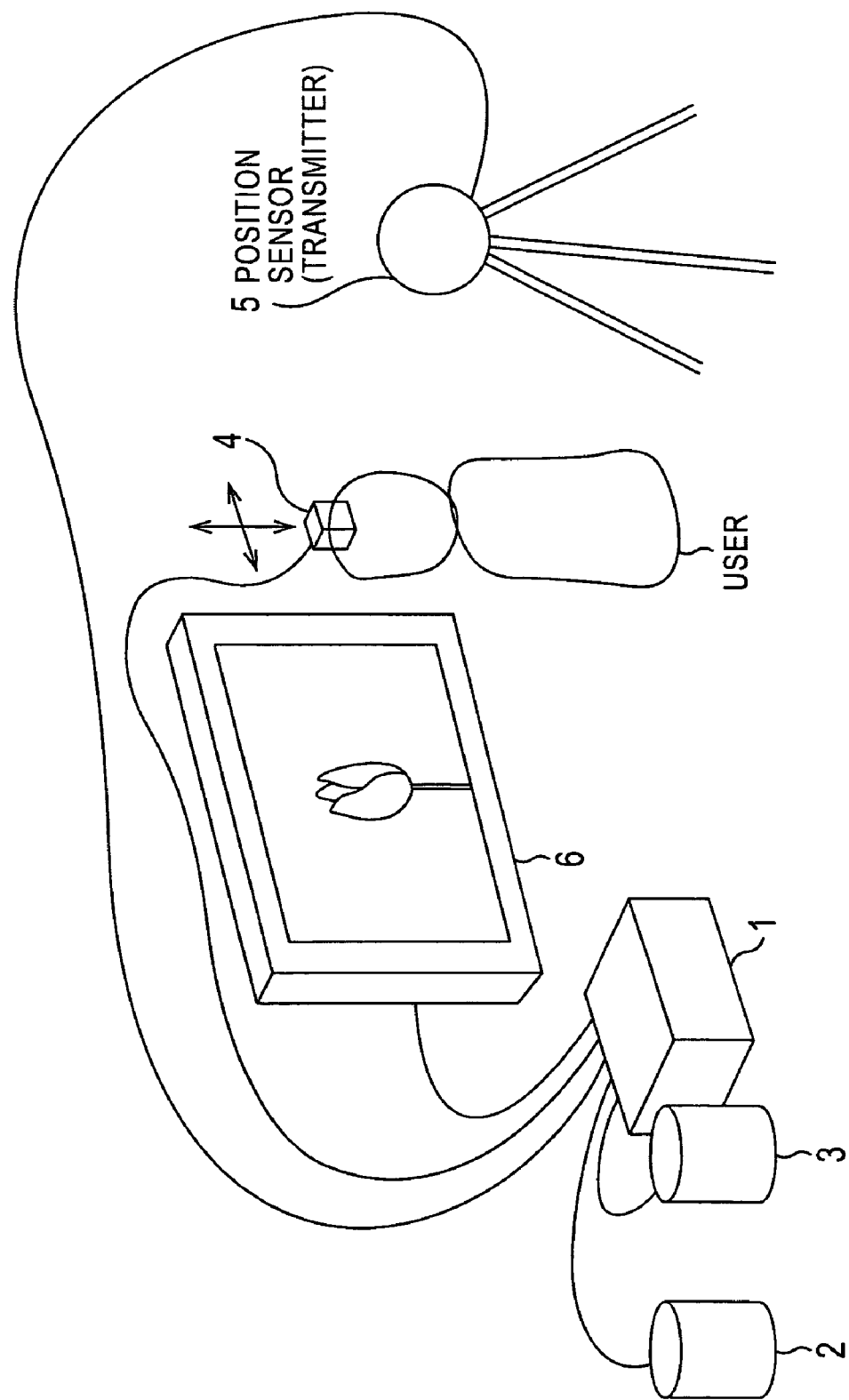
FIG. 2 is a diagram showing an example configuration of an image display apparatus according to an embodiment of the present invention.

FIG. 2 shows an example configuration of an image display apparatus according to an embodiment of the present invention.

A computer 1 is, for example, a workstation, and it converts original image data stored in an image database 2 into intermediate data, which will be described later, and stores the intermediate data in an intermediate database 3. Furthermore, the computer 1 controls a receiver 4 and a transmitter 5 that function as a position sensor, and it detects a user's position (and an attitude as required) based on an output of the receiver 4. Furthermore, the computer 1 sets the user's position as a position of a user's viewpoint, and converts the intermediate data stored in the intermediate database 3 into image data as viewed from the user's viewpoint (hereinafter referred to as presentation image data when appropriate). Then, the computer 1 supplies the presentation image data to a display 6, where the presentation image data is displayed.

The image database 2 stores original image data that is image data actually captured by an imaging apparatus such as a camera, as will be described later. The intermediate database 3 stores intermediate data supplied from the computer 1, obtained by converting the original image data.

The receiver 4 is mounted on a user, and it detects a magnetic field generated by the transmitter 5, and supplies an intensity of the magnetic field to the computer 1. The transmitter 5 generates a magnetic field under the control of the computer 1. That is, in the embodiment shown in FIG. 2, the receiver 4 and the transmitter 5 form a magnetic sensor that functions as a position sensor. That is, the receiver 4 determines the intensity of the magnetic field generated by the transmitter, thereby detecting a position of the receiver 4 and thus detecting a user's position.

The receiver 4 is, for example, mounted on the head of the user. Alternatively, for example, if a user is wearing a tiepin or glasses, the receiver 4 may be mounted on the tiepin or the frame of the glasses.

The magnetic sensor that functions as a position sensor may be implemented, for example, by a three-dimensional position sensor from Polhemus, Inc.

Alternatively, the position sensor may be implemented, for example, by mechanically linked positioning means (e.g., a three-dimensional digitizer) instead of the magnetic sensor. Yet alternatively, the position sensor may be implemented by means that allows input of change in the user's position, e.g., a joystick or a trackball. That is, the position sensor herein need not be means for detecting an actual user's position, and may be means that allows input of a virtual user's position.

The display 6 is implemented, for example, by a CRT or a liquid crystal panel, and it displays presentation image data supplied from the computer 1. The display 6 may be implemented, for example, by a projector, an HMD (Head Mount Display), or other means capable of displaying images, instead of a CRT or a liquid crystal panel.

Figure 1:
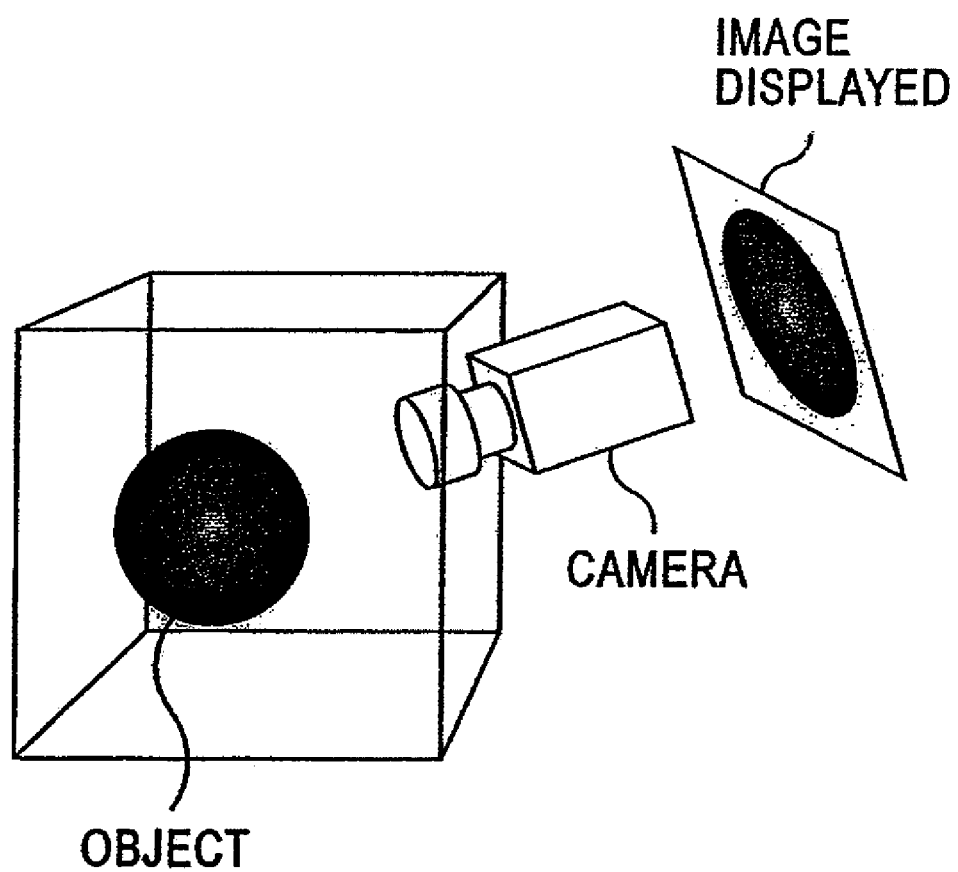
FIG. 1 is a diagram showing a conventional method for displaying an image.
Figure 3:
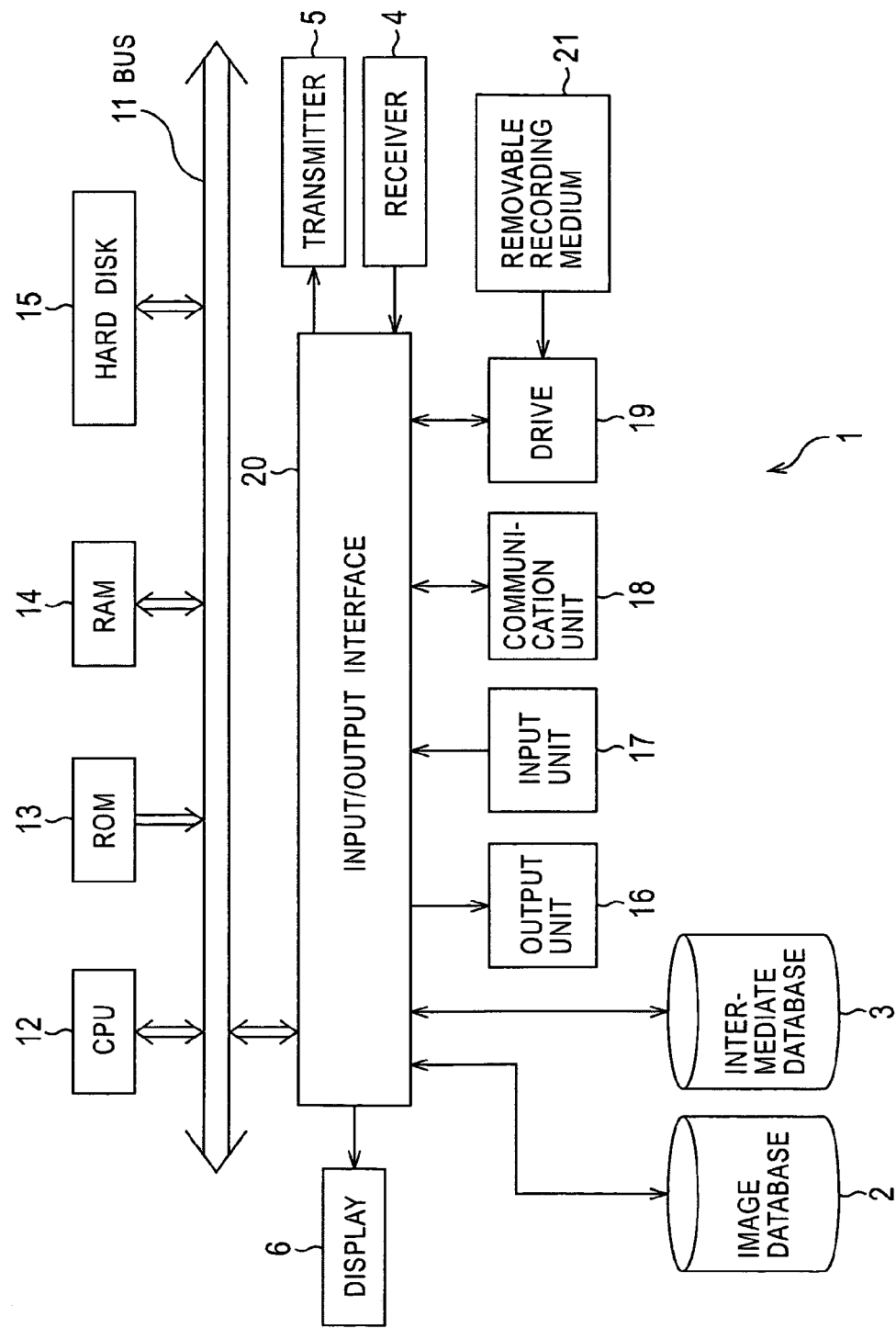
FIG. 3 is a block diagram showing an example hardware configuration of a computer 1.

Next, FIG. 3 shows an example of the hardware configuration of the computer 1 shown in FIG. 1.

On the computer 1, programs for executing a series of processes that will be described later have been installed.

The programs may be recorded in advance in a hard disc 15 or a ROM 13 that serves as a recording medium, included in the computer 1.

Alternatively, the programs may be stored (recorded) temporarily or permanently on a removable recording medium 21, e.g., a flexible disc, a CD-ROM (Compact Disc Read Only Memory), an MO (Magneto Optical) disc, a DVD (Digital Versatile Disc), a magnetic disc, or a semiconductor memory. The removable recording medium 21 may be provided in the form of what is called package software.

Instead of installing the programs from the removable recording medium 21 on the computer 1 as described above, the programs may be transferred by wireless from a downloading site to the computer 1 via an artificial satellite for digital satellite broadcasting, or transferred by wire to the computer 1 via a network, e.g., a LAN (Local Area Network) or the Internet, allowing the computer 1 to receive the program transferred as described above by a communication unit 18 and to install the programs on the hard disc 15 included therein.

The computer 1 includes a CPU (Central Processing Unit) 12. The CPU 12 is connected to an input/output interface 20 via a bus 11. The CPU 12, when a command is input, for example, in response to an operation by a user of an input unit 17 including, for example, a keyboard, a mouse, and a microphone, accordingly executes a program stored in the ROM (Read Only Memory 13). Alternatively, the CPU 12 loads into a RAM (Random Access Memory) 14 and executes a program stored in the hard disc 15, a program transferred via a satellite or a network, received by the communication unit 18, and installed on the hard disc 15, or a program read from the removable recording medium 21 mounted on a drive 19 and installed on the hard disc 15. Thus, the CPU 12 executes processes that will be described later with reference to flowcharts, or processes executed by arrangements that will be described later with reference to block diagrams. As required, the CPU 12, for example, outputs results of the processes through an output unit 16 such as a speaker, sends results of the processes through the communication unit 18, or records results of the processes on the hard disc 15, via the input/output interface 20.

In the embodiment shown in FIG. 3, the input/output interface 20 is connected to the image database 2, the intermediate database 3, the receiver 4, the transmitter 5, and the display 6. The CPU 12 reads original image data stored in the image database 2 via the input/output interface 20, and converts the original image data into intermediate data. Furthermore, the CPU 12 stores the intermediate data in the intermediate database 3 via the input/output interface 20. The CPU 12 also controls the transmitter 5 and receives an output of the receiver 4 via the input/output interface 20, thereby detecting a user's position. Furthermore, the CPU 12 sets the user's position as a user's viewpoint, and converts the intermediate data stored in the intermediate database 3 into presentation image data in accordance with the user's viewpoint. Furthermore, the CPU 12 supplies the presentation image data to the display 6 via the input/output interface 20, where the presentation image data is displayed.

In this specification, processing steps defining programs for allowing the computer 1 to execute various processes need not necessarily be executed sequentially in the orders that will be described later with reference to flowcharts, and include processes executed in parallel or individually (e.g., parallel processing or processing by objects).

The programs may be executed either by a signal computer or by distributed processing involving a plurality of computers. Also, the programs may be transferred to and executed by a remote computer via a network.

Figure 4A:
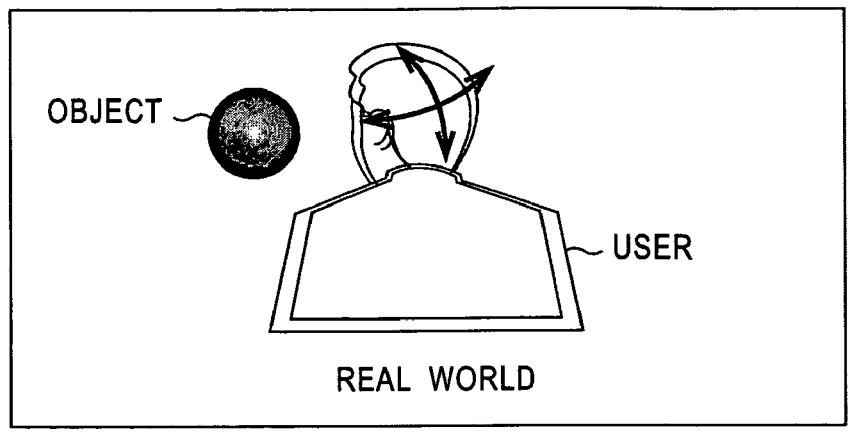
FIG. 4A is a diagram showing a method of displaying an image by the image display apparatus.

The image display apparatus shown in FIG. 2, configured based on the above-described computer 1 shown in FIG. 3, displays presentation image data corresponding to an object as observed by a user in the real world, for example, as shown in FIG. 4A.

That is, in the real world, when a user is observing an object and moves his/her viewpoint, the user is allowed to observe the object as viewed from the viewpoint after the movement. More specifically, in the real world, part that is viewable and part that is unviewable of an object change as the user moves his/her viewpoint.

Figure 4B:
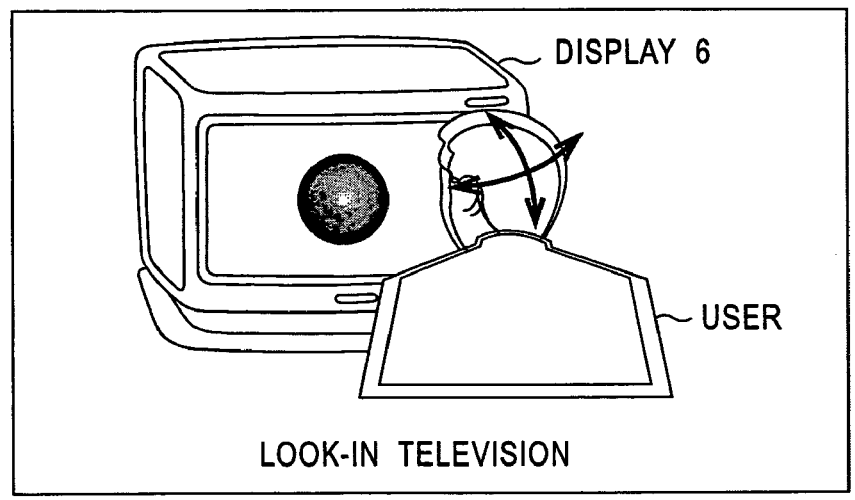
FIG. 4B is a diagram showing a method of displaying an image by the image display apparatus.
Figure 4C:
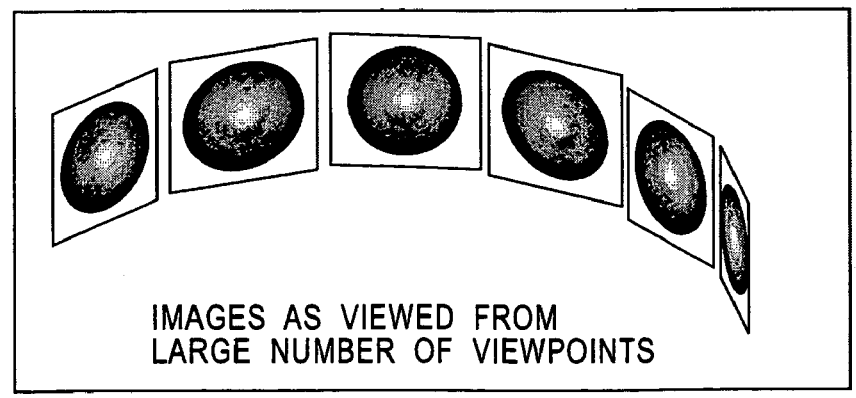
FIG. 4C is a diagram showing a method of displaying an image by the image display apparatus.

Similarly, in the image display apparatus shown in FIG. 2, when the user moves his/her viewpoint, presentation image data displayed on the display 6 changes in accordance with the viewpoint so that an object as perceived by the vision of the user in the real world is displayed, as shown in FIG. 4B. That is, when the user moves his/her viewpoint, the image display apparatus shown in FIG. 2 displays presentation image data corresponding to an object as viewed from the new viewpoint, as shown in FIG. 4C.

Thus, when the user has moved his/her viewpoint, the image display apparatus shown in FIG. 2 displays presentation image data in which a part of an object that has not been viewable from the viewpoint before the movement is now viewable. That is, when the user moves his/her viewpoint so as to look into an object displayed in the presentation image data on the display 6, presentation image data corresponding to the object as perceived by the vision from the viewpoint after the movement in the real world, i.e., presentation image data in which a part of the object that the user has looked into is now viewable, is displayed. Thus, the image display apparatus shown in FIG. 2 can be called a kind of "look-in television" (multi-viewpoint image display television).

Figure 5:
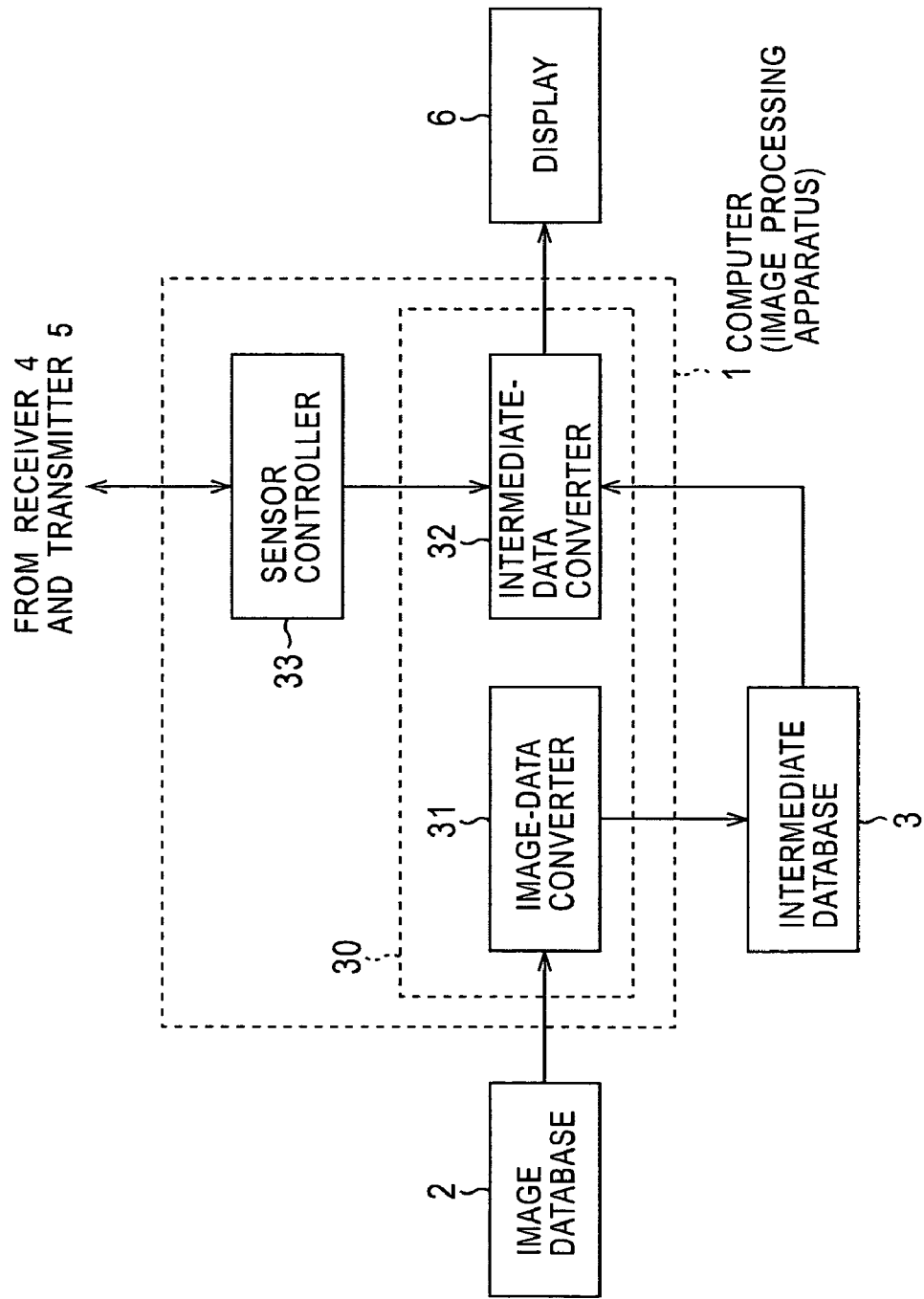
FIG. 5 is a block diagram showing a first example of the functional configuration of a computer as an image processing apparatus.

FIG. 5 shows an example of the functional configuration of an image processing apparatus for executing the same processes as processes implemented by execution of programs by the computer 1 shown in FIG. 1.

The image processing apparatus for executing the same processes as processes implemented by execution of programs by (the CPU 12 of) the computer 1 includes a data converter 30 and a sensor controller 33.

The data converter 30 includes an image-data converter 31 and an intermediate-data converter 32. The data converter 30, using light-ray information representing trajectories of light rays for the capture of original image data stored in the image database 2 and representing pixel values corresponding to the light rays, converts the original image data into presentation image data as viewed from a user's viewpoint supplied from the sensor controller 33, and supplies the presentation image data to the display 6, where the presentation image data is displayed.

More specifically, the image-data converter 31 reads original image data from the image database 2, and geometrically converts the original image data into intermediate data. Furthermore, the image-data converter 31 supplies the intermediate data to the intermediate database 3, where the intermediate data is stored.

The intermediate-data converter 32 converts the intermediate data into presentation image data based on a user's viewpoint supplied from the sensor controller 33, that is, it reconstructs image data as viewed from the user's viewpoint, and supplies the presentation image data to the display 6, where the presentation image data is displayed.

The sensor controller 33 controls the receiver 4 and the transmitter 5 that function as a position sensor, thereby detecting a user's viewpoint, and supplies the user's viewpoint to the intermediate-data converter 32. More specifically, the sensor controller 33 controls the transmitter 5 to generate a magnetic field. Furthermore, the sensor controller 33 detects a user's position based on a result of detection of the magnetic field generated by the transmitter 5, supplied from the receiver 4. The sensor controller 33 sets the user's position as a user's viewpoint, and supplies the user's viewpoint to the intermediate-data converter 32.

Next, image processing by the image processing apparatus (computer) 1 shown in FIG. 5 will be described with reference to a flowchart shown in FIG. 6.

First, in step S1, the image-data converter 31 reads original image data from the image database 2, and converts the original image data into intermediate data. Furthermore, in step S1, the image-data converter 31 supplies the intermediate data to the intermediate database 3, where the intermediate data is stored. The process then proceeds to step S2.

In step S2, the sensor controller 33 detects a user's position based on an output of the receiver 4, sets the user's position as a user's viewpoint, and supplies the user's viewpoint to the intermediate-data converter 32.

The process then proceeds to step S3, in which the intermediate-data converter 32 converts the intermediate data into presentation image data based on the user's viewpoint supplied from the sensor controller 33. The process then proceeds to step S4.

In step S4, the intermediate-data converter 32 supplies the presentation image data to the display 6, where the presentation image data is displayed. The process then proceeds to step S5.

In step S5, the CPU 12 (FIG. 3) determines whether, for example, the user has operated the input unit 17 (FIG. 3) to exit image processing. If it is determined in step S5 that the input unit 17 has not been operated to exit image processing, the process returns to step S2, and then the same process is repeated.

On the other hand, if it is determined in step S5 that the input unit 17 has been operated to exit image processing, the process is exited.

Figure 6:
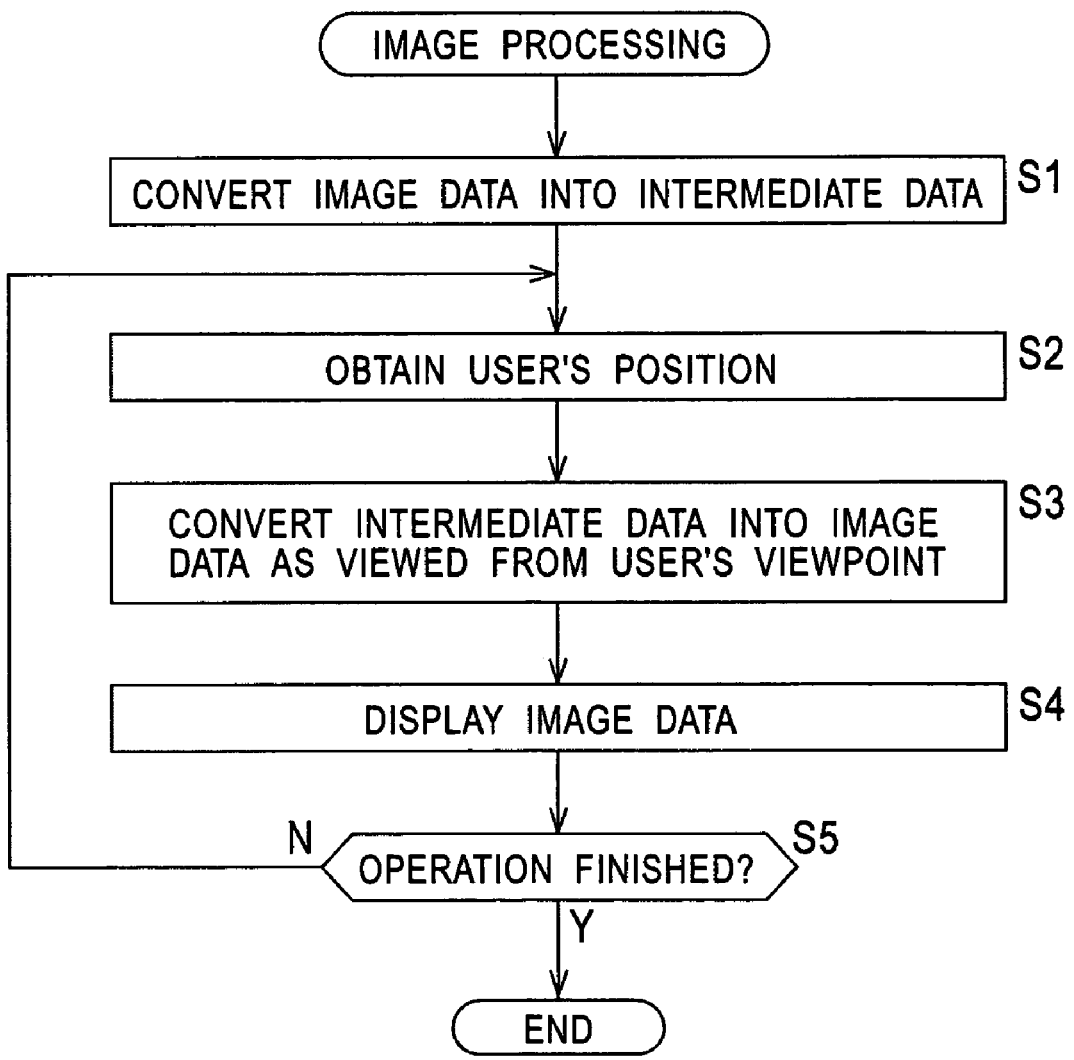
FIG. 6 is a flowchart showing image processing by the image processing apparatus.

If the image processing shown in FIG. 6 has been executed in the past whereby intermediate data obtained by converting the original image data stored in the image database 2 has already been stored in the intermediate database 3, the processing in step S1 can be skipped.

Figure 7:
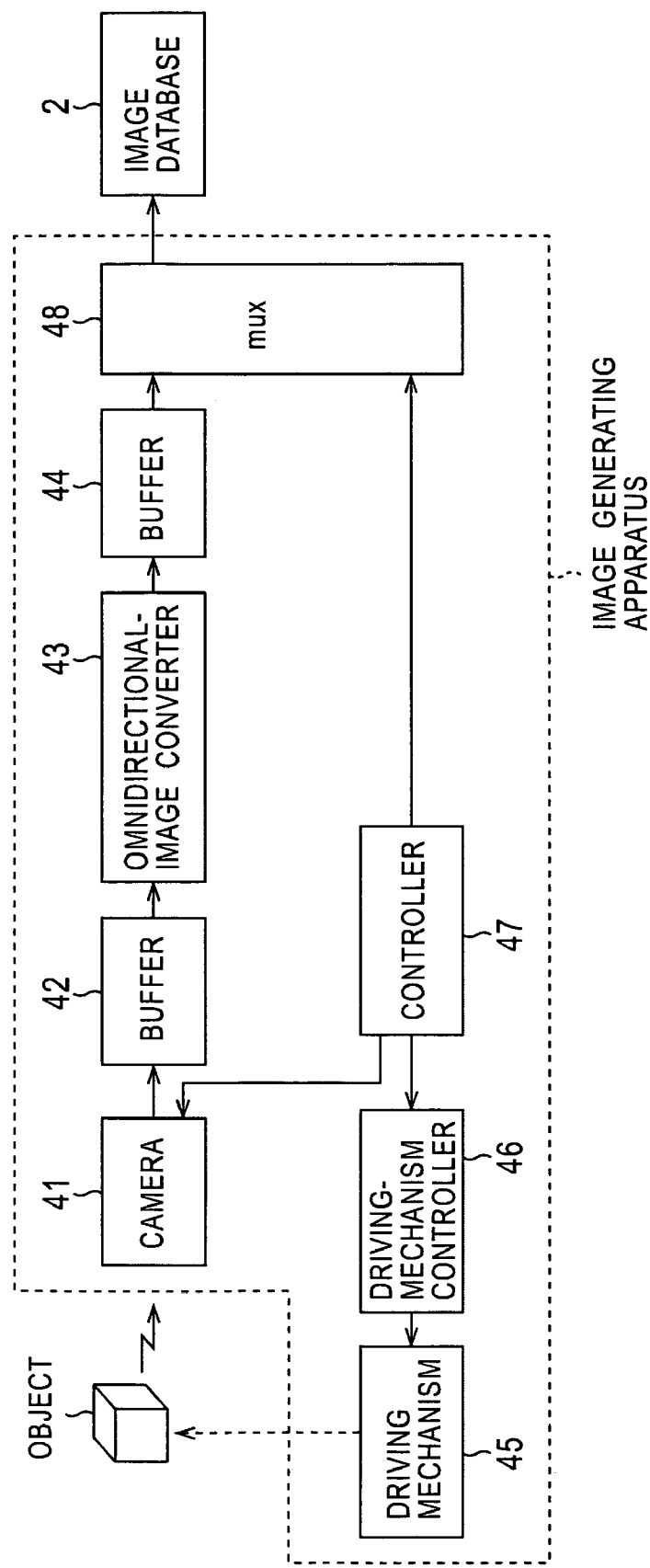
FIG. 7 is a block diagram showing an example of the functional configuration of an image generating apparatus for capturing (generating) image data to be stored in an image database 2.

FIG. 7 shows an example configuration of an image generating apparatus for generating (capturing) original image data to be stored in the image database 2.

In the embodiment shown in FIG. 7, a camera 41 is implemented, for example, by what is called an omnidirectional camera. The camera 41, under the control of a controller 47, captures image data in all directions including an object (omnidirectional image data), and supplies the omnidirectional image data to a buffer 42.

The buffer 42 temporarily stores the omnidirectional image data supplied from the camera 41.

An omnidirectional-image converter 43 reads the omnidirectional image data stored in the buffer 42, converts the omnidirectional image data into original image data in a latitude-longitude representation which will be described later, and supplies the original image data to a buffer 44.

The buffer 44 temporarily stores the original image data supplied from the omnidirectional-image converter 43.

A driving mechanism 45, under the control of a driving-mechanism controller 46, moves an object to be imaged by the camera 41. BY moving the object by the driving mechanism 45, the viewpoint (optical center) of the camera 41 for the object is relatively changed to a plurality of positions.

The driving-mechanism controller 46 drives the driving mechanism under the control of the controller 47.

The controller 47 controls the timing of imaging by the camera 41, the speed and direction for driving the driving mechanism 45 by the driving-mechanism controller 46, and so forth. Furthermore, the controller 47 supplies information indicating a timing of imaging by the camera 41 (imaging time), a position of an object moved by the driving mechanism 45 (including an attitude of the object as required), and so forth to a mux (multiplexer) 48.

The multiplexer 48 adds, to each frame of original image data stored in the buffer 44, information output from the controller 47 for the relevant frame, and supplies the result to the image database 2, where the result is stored.

Figure 8:
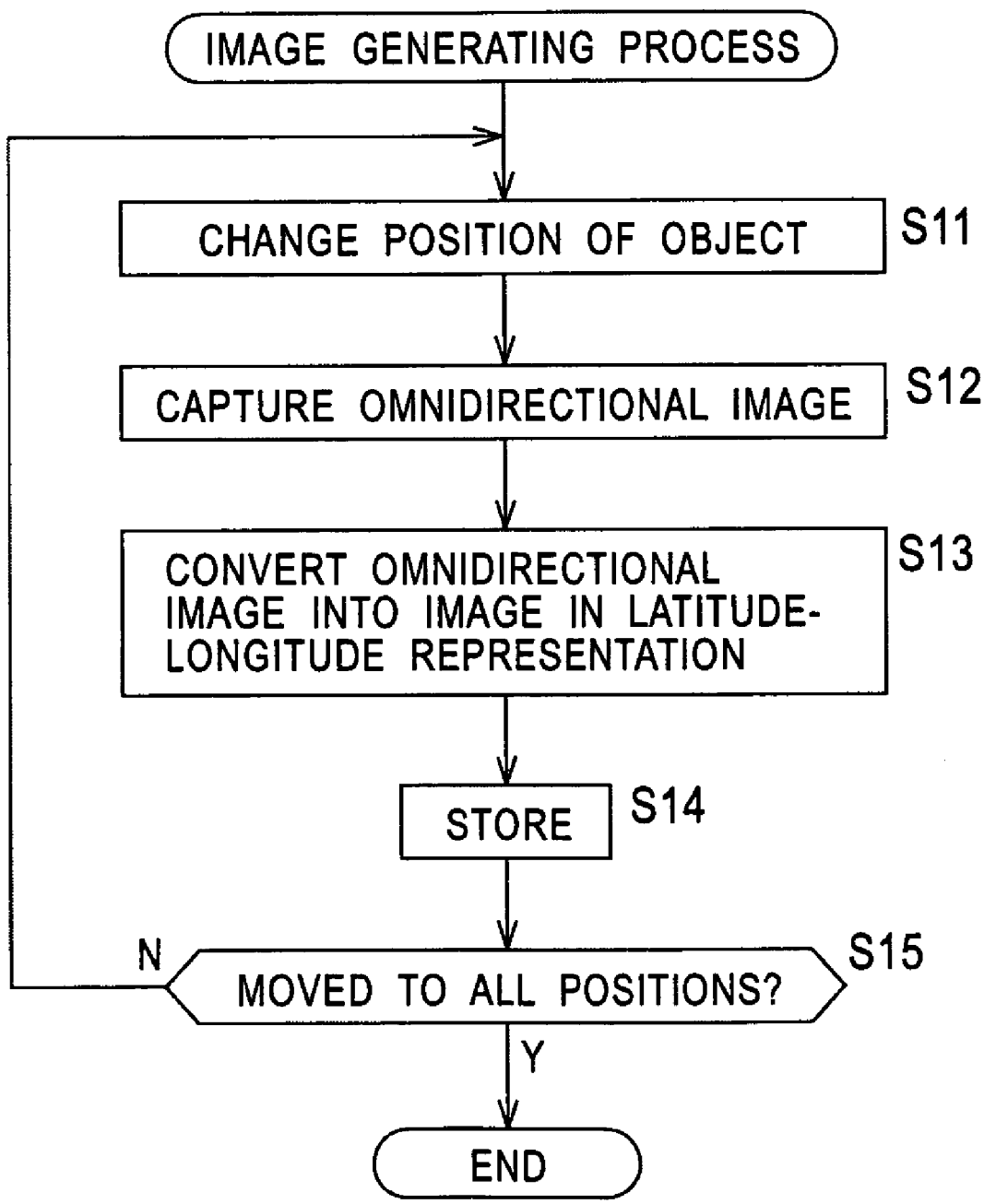
FIG. 8 is a flowchart showing an image generating process by the image generating apparatus.

Next, an image generating process executed by the image generating apparatus shown in FIG. 7 will be described with reference to a flowchart shown in FIG. 8.

First, the controller 47 moves an object to a designated position, controls the camera 41 and the driving-mechanism controller 46 to image the object, and supplies information representing the designated position and timing of imaging of the object to the mux 48.

The controller 47 presets, for example, a three-dimensional coordinate system in the real world (hereinafter referred to as an imaging coordinate system when appropriate), and outputs coordinates of the object in the imaging coordinate system as information representing a position of the object (hereinafter referred to as position information when appropriate). Furthermore, the controller 47 also outputs an angle representing a change in the object with a certain attitude of the object (e.g., an attitude of the object at the start of imaging of the object) as a reference attitude, the angle being included in the position information. Furthermore, the controller 47 outputs information representing coordinates of a position of the camera 41 (e.g., the position of a lens center) and a direction of an optical axis thereof (viewing direction), the information being included in the position information.

If the object is moved by a motion base system described later with reference to FIG. 9 or by a turntable system described later with reference to FIG. 11, the lens center (optical center) of the camera 41 is not changed and is fixed. It is to be assumed that, in that case, the position of the lens center and the direction of the optical axis of the camera 41 are preset in the controller 47.

The coordinates and attitude of the object described above is actually grasped from the status of the driving mechanism 45 that moves the object. The status of the driving mechanism 45 is recognized by the controller 47 that controls the driving mechanism 45 via the driving-mechanism controller 46.

In step S11, the driving-mechanism controller 46, under the control of the controller 47, controls the driving mechanism 45 to change the position of the object. The process then proceeds to step S12. In step S12, the camera 41, under the control of the controller 47, images the object, and supplies the resulting omnidirectional image data to the buffer 42, where the omnidirectional image data is stored.

In step S13, the omnidirectional-image converter 43 reads the omnidirectional image data stored in the buffer 42, converts the omnidirectional image data into original image data in the latitude-longitude representation, and supplies the original image data to the buffer 44. The process then proceeds to step S14, in which the mux 48 adds information supplied from the controller 47 to the frames of the original image data stored in the buffer 44, and supplies the result to the image database 2, where the result is stored.

After the processing in step S14, the process proceeds to step S15, in which the controller 47 determines whether the object has been moved to all the preset positions (and whether the object has been placed in all the preset attitudes, as required). If it is determined that the object has not been moved to all the positions, the controller 47 controls the camera 41 and the driving-mechanism controller 46 so that the object will be moved to a position where the object has not yet been moved and the object will then be imaged, and supplies information representing the position where the object has been moved, timing of imaging of the object, and so forth, to the mux 48. Then, the process returns to step S11, and then the same process is repeated.

On the other hand, if it is determined in step S15 that the object has been moved to all the preset positions, that is, if the object has been imaged at all the preset positions, the process is exited.

Next, systems for moving an object when an omnidirectional image of the object is to be captured by the image generating apparatus shown in FIG. 7 will be described.

The image generating apparatus shown in FIG. 7 images an object while moving the object, in which case the position of the object must be controlled precisely. Such systems for moving an object include, for example, a motion base system and a turntable system.

Figure 9:
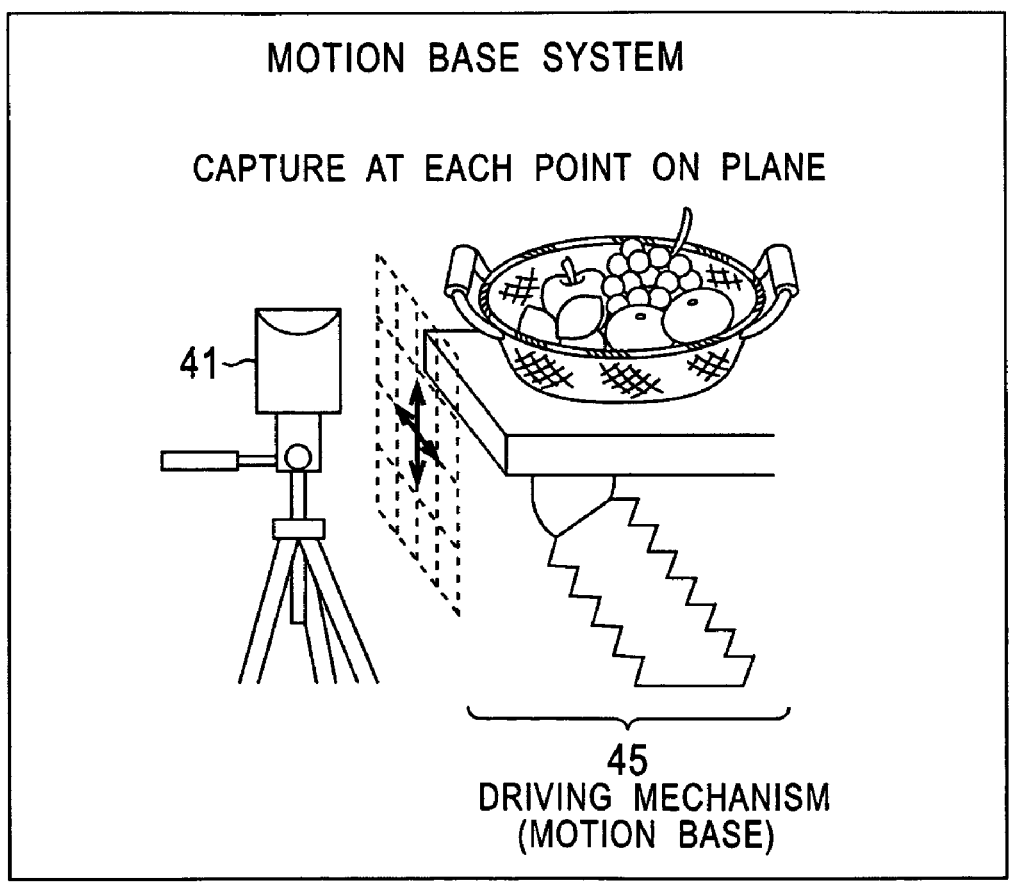
FIG. 9 is a diagram showing a motion base system.

In the motion base system, a motion base is used as the driving mechanism 45, as shown in FIG. 9. An object is mounted on the motion base acting as the driving mechanism 45, and the motion base is moved up and down and left and right (with respect to the camera 41) so that the object moves accordingly.

Figure 10B:
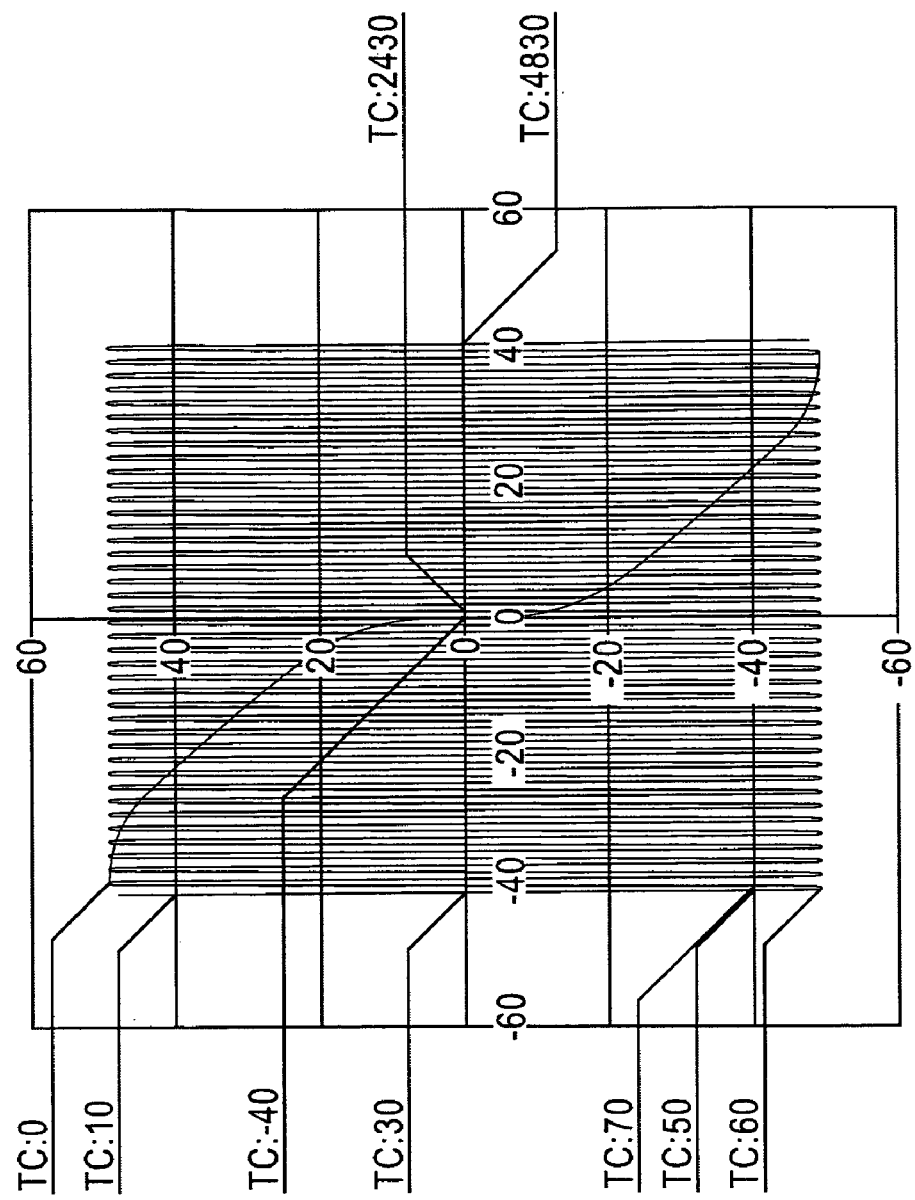
FIG. 10B is a diagram showing an example of movement of the motion base.
Figure 10A:
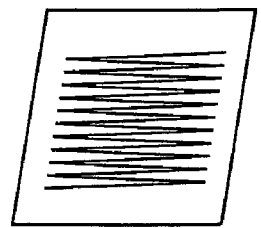
FIG. 10A is a diagram showing an example of movement of the motion base.

More specifically, in the motion base system, for example, the motion base acting as the driving mechanism 45 is gradually moved from left to right while moving it in the vertical direction, as shown in FIG. 10A. FIG. 10B shows an actual trajectory of the motion base. In FIG. 10B, the numerals shown after "TC:" along with the trajectory of the motion base denote time codes of images captured by the camera 41. Thus, in FIG. 10B, the trajectory of the motion base and the time codes are associated with each other, so that association between positions (attitudes) of the object and frames of image data representing the object at the positions can be recognized.

According to the motion base system shown in FIG. 9, light-ray information representing trajectories of light rays from an object and pixel values corresponding to the light rays in a case where the object is imaged, for example, from viewpoints at a plurality of points on an open curved surface, e.g., a plane, assumed between the object and the camera 41, can be obtained. The pixel values corresponding to the light rays from the object can be obtained from image data output by the camera 41, and the trajectories of the light rays from the object can be obtained from the positions of the camera 41 and the object.

Figure 11:
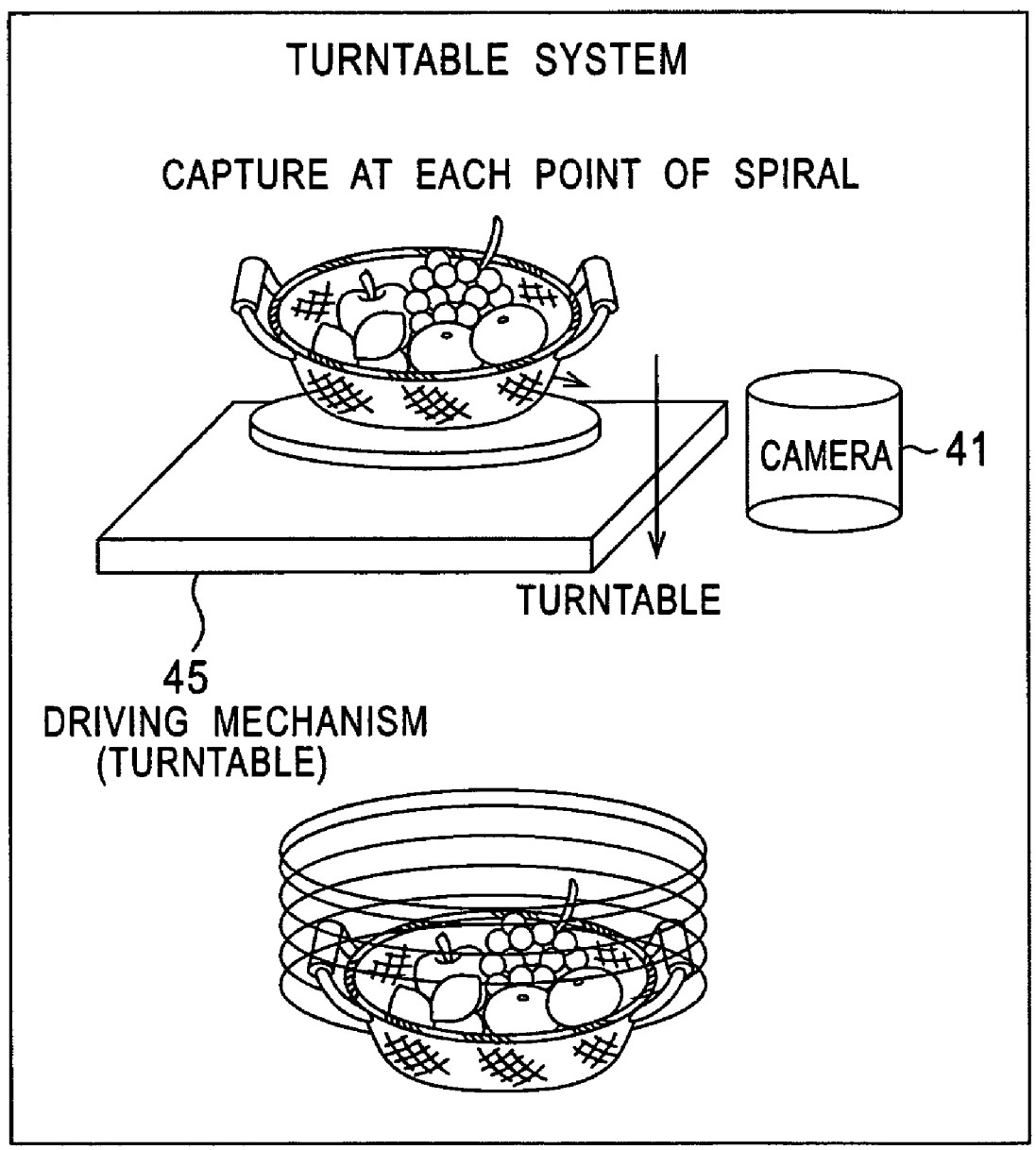
FIG. 11 is a diagram showing a turntable system.

In the turntable system, a turntable is used as the driving mechanism 45, as shown in FIG. 11. An object is mounted on the turntable acting as the driving mechanism 45, and the turntable is rotated at a constant angular velocity while moving it upward or downward at a very low speed.

According to the turntable system shown in FIG. 11, assuming a cylinder as an open curved surface surrounding the object, light-ray information regarding the object as imaged from viewpoints at a plurality of points on the side surface of the assumed cylinder can be obtained.

In the image generating apparatus shown in FIG. 7, image data of an object as viewed respectively from a plurality of viewpoints is captured by moving the object. Alternatively, image data of an object as viewed respectively from a plurality of viewpoints may be captured by moving the camera 41 instead of moving the object. Other methods may be used as long as omnidirectional image data of an object can be obtained.

In the image generating apparatus shown in FIG. 7, image data of an object as viewed respectively from a plurality of viewpoints is captured by the single camera 41 while moving the object. Alternatively, for example, image data of an object as viewed respectively from a plurality of positions may be captured by imaging the object by a plurality of cameras disposed at different positions.

The image generating apparatus shown in FIG. 7 includes an omnidirectional camera that acts as the camera 41. Now, imaging by the omnidirectional camera and conversion of omnidirectional image data by the omnidirectional-image converter 43 will be described.

Figure 12:
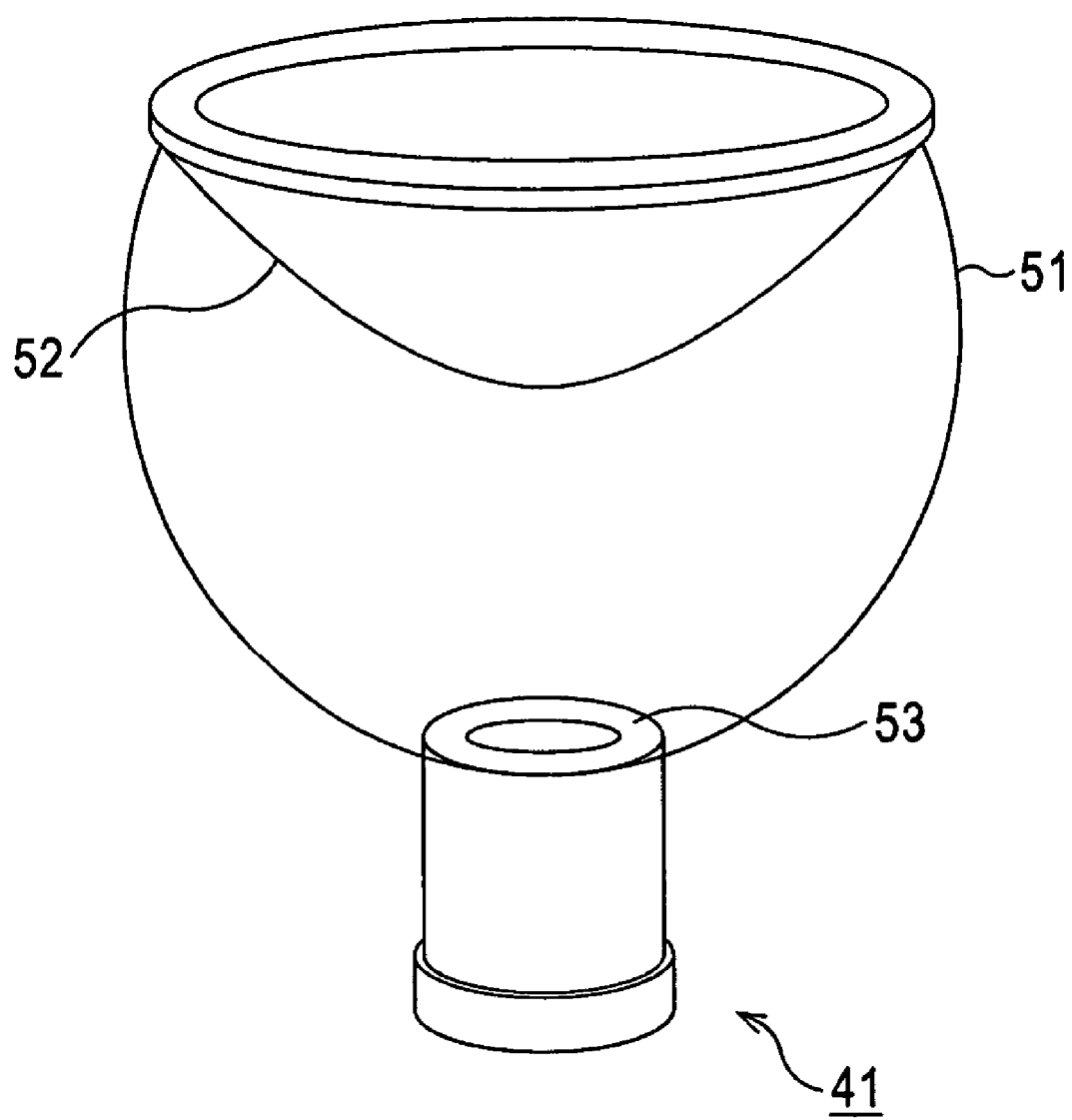
FIG. 12 is a perspective view showing an example configuration of a camera 41.

FIG. 12 shows an example configuration of an optical system of the omnidirectional camera acting as the camera 41 shown in FIG. 7.

In the embodiment shown in FIG. 12, the camera 41 is configured such that a condenser 52 is supported by a supporter 51 disposed on top of an imager 53, so that the camera 41 is allowed to capture images in directions of 360° around the condenser 52.

The supporter 51 is composed of a transparent material having a low reflectivity, such as glass. The supporter 51, in order to minimize refraction of light on the glass surface, forms a spherical surface centered at a focal point of the condenser 52, which will be described later, such that incident light will be perpendicular to the glass surface.

The condenser 52 is implemented, for example, by a mirror in a hyperboloidal shape (hyperboloidal mirror). The condenser 52 reflects ambient light incident through the supporter 51 towards the direction of the imager 53.

The imager 53 is implemented, for example, by a photoelectric converter element such as a CCD (Charge Coupled Device), and it converts light incident thereon into image data in the form of electric signals. The image data acquired by the imager 53 is supplied, as an output of the camera 41, to the buffer 42 shown in FIG. 7.

The configuration of the omnidirectional camera shown in FIG. 12 and the principles of condensing are disclosed, for example, in "Idou-robotto you zen-houi shikaku-sensa no kaihatsu" Jidou-ka Gijutsu, vol. 29-6 (1997) (hereinafter referred to as Document 1 when appropriate), and so will be described only briefly herein.

Figure 13:
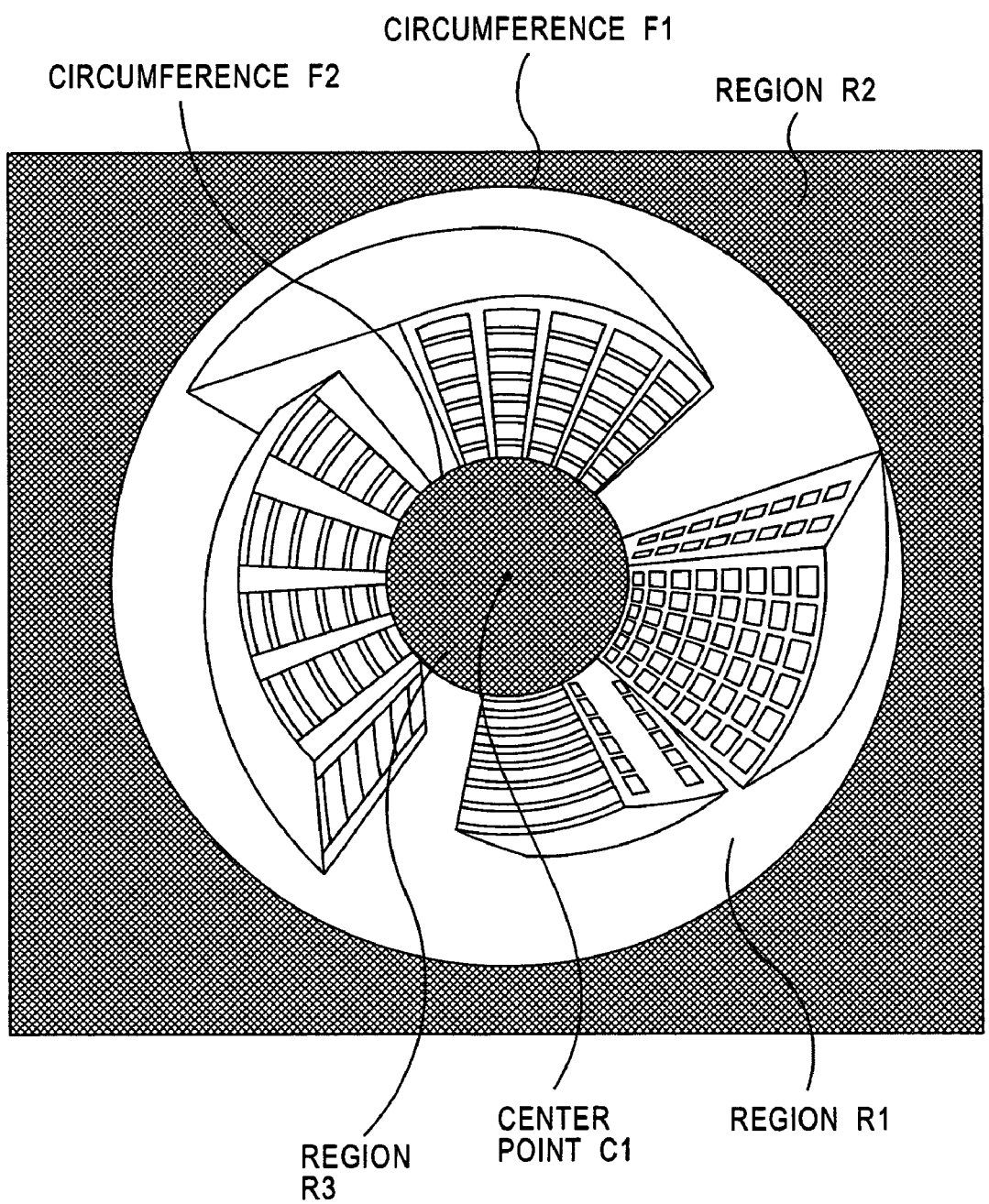
FIG. 13 is a diagram showing omnidirectional image data.

FIG. 13 shows an example of omnidirectional image data captured by the camera 41 shown in FIG. 12.

The omnidirectional image data is segmented by circumferences F1 and F2 of two circles centered at a center point C1. In FIG. 13, the circumference F1 has a radius larger than that of the circumference F2.

That is, the omnidirectional image data includes a region R1 that is insider of the larger circumference F1 and outside of the smaller circumference F2, a region R2 outside of the larger circumference F1, and a region (inner region) R3 surrounded by the smaller circumference F2.

Of the three regions R1 to R3, image data corresponding to ambient light reflected by the condenser 52 is captured in the region R1, part outside of the condenser 52 is imaged in the region R2, and the imager 53 itself is imaged in the region R3.

In the embodiment shown in FIG. 13, a plurality of buildings is imaged in the region R1. More specifically, an upper part of the buildings is imaged in a direction nearer to the circumference F1, and a lower part of the buildings is imaged in a direction nearer to the circumference F2.

Next, a hyperboloid constituting the condenser 52 shown in FIG. 12 will be described with reference to FIG. 14.

The condenser 52 is formed by a part of a hyperboloid. More specifically, a mirror surface is formed on a convex surface of a convex top portion of a hyperboloid, formed by cutting the hyperboloid by a plane perpendicular to the axis of the hyperboloid.

The condenser 52 can be formed using a two-sheeted hyperboloid, which is a type of hyperboloid. As shown in FIG. 14, a two-sheeted hyperboloid is a curved surface obtained by rotating a hyperbola about an axis (the Z axis in FIG. 14), and is composed of a hyperboloid H1 that is convex downward, existing in a region of Z>0, and a hyperboloid H2 that is convex upward, existing in a region of Z<0.

Of the two sheets of hyperboloid H1 and H2, the hyperboloid H1 existing in the region Z>0 is used. Hereinafter, the Z axis will be referred to as a center axis or simply an axis of the hyperbola when appropriate.

Figure 14:
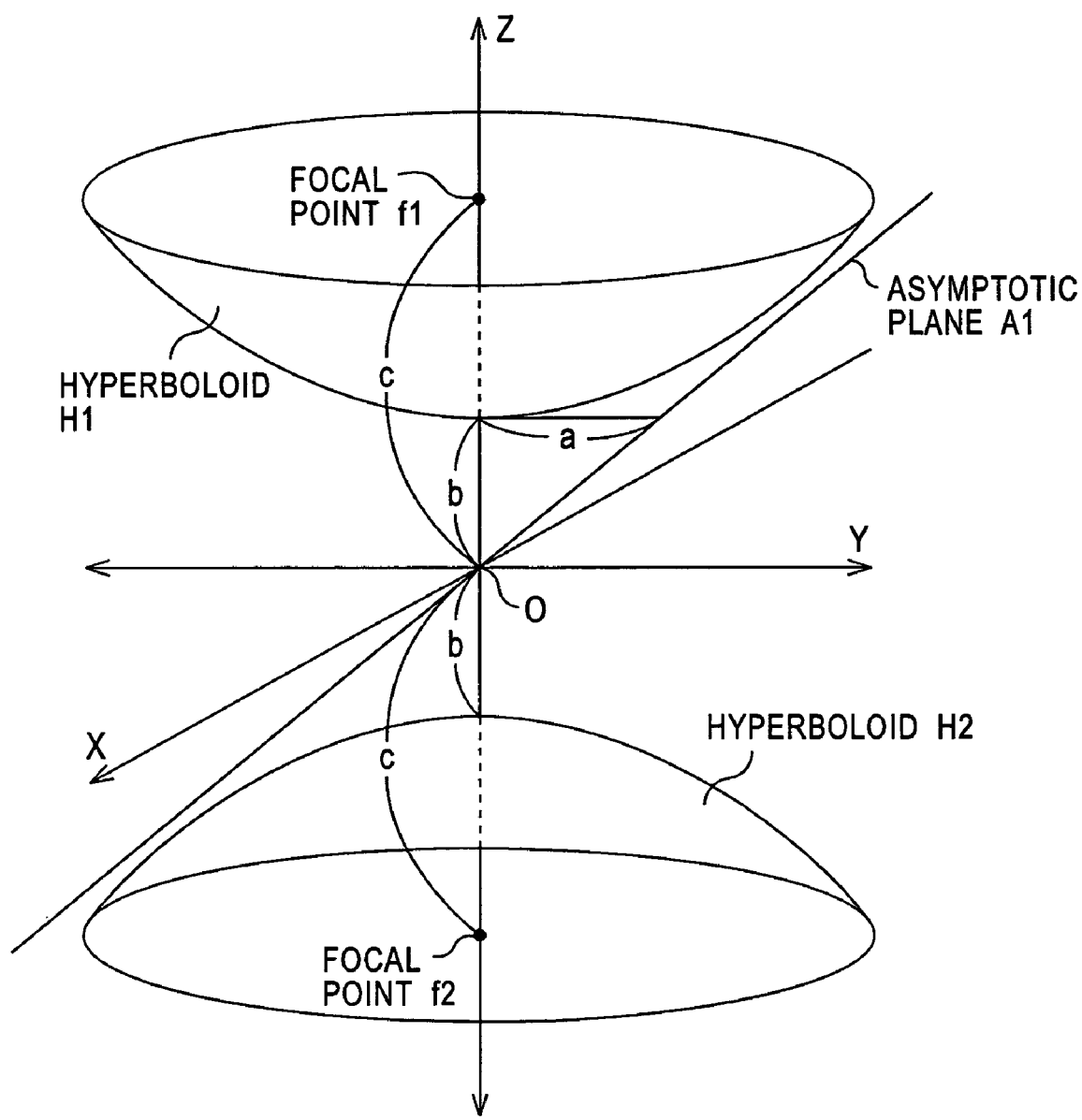
FIG. 14 is a diagram showing hyperboloids constituting a condenser 52.

In the three-dimensional orthogonal coordinate system of X, Y, and Z, shown in FIG. 14, the two sheets of hyperboloid H1 and H2 can be represented by equation (1):

$$\frac{X^2+Y^2}{a^2} - \frac{Z^2}{b^2} = -1 \quad (1)$$

In equation (1), constants a and b define the shapes of the hyperboloids H1 and H2. More specifically, the constant b denotes the distance from an origin O to an intersection of the hyperboloid H1 (H2) and the Z axis. The constant a denotes a radius of a circle formed by a line of intersection of a plane crossing through the intersection and parallel to the XY plane and an asymptotic plane A1 of the hyperboloid H1 (H2).

Furthermore, in equation (1), a constant C defines the positions of the focal points of the hyperboloids H1 and H2. More specifically, a position of +c on the Z axis (0, 0, +c) is the focal point f1 of the hyperboloid H2, and a position of −c on the Z axis (0, 0, −c) is the focal point f2 of the hyperboloid H1.

The constants a, b, and c have the relationship expressed in the following equation:

$$C=\sqrt{a^2+b^2} \quad (2)$$

Figure 15:
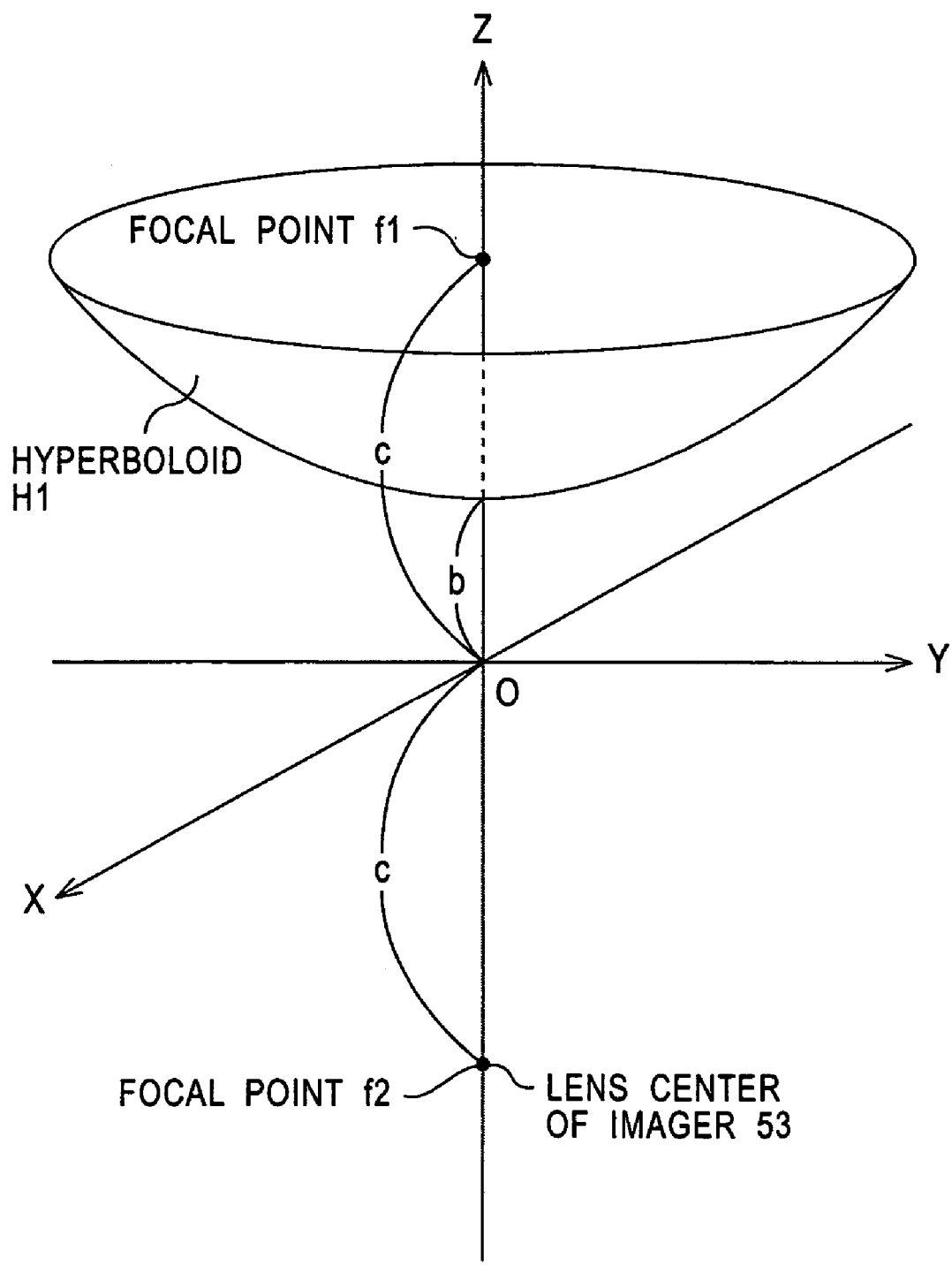
FIG. 15 is a diagram for explaining positional relationship between the condenser 52 and an imager 53.

Assuming that the condenser 52 is formed by the hyperboloid H1 described with reference to FIG. 14, the imager 53 is disposed such that the center axis of the lens (optical axis) thereof coincides with the Z axis and that the lens center (the lens center of the camera 41) coincides with the focal point f2 of the hyperboloid H1, as shown in FIG. 15.

Figure 16:
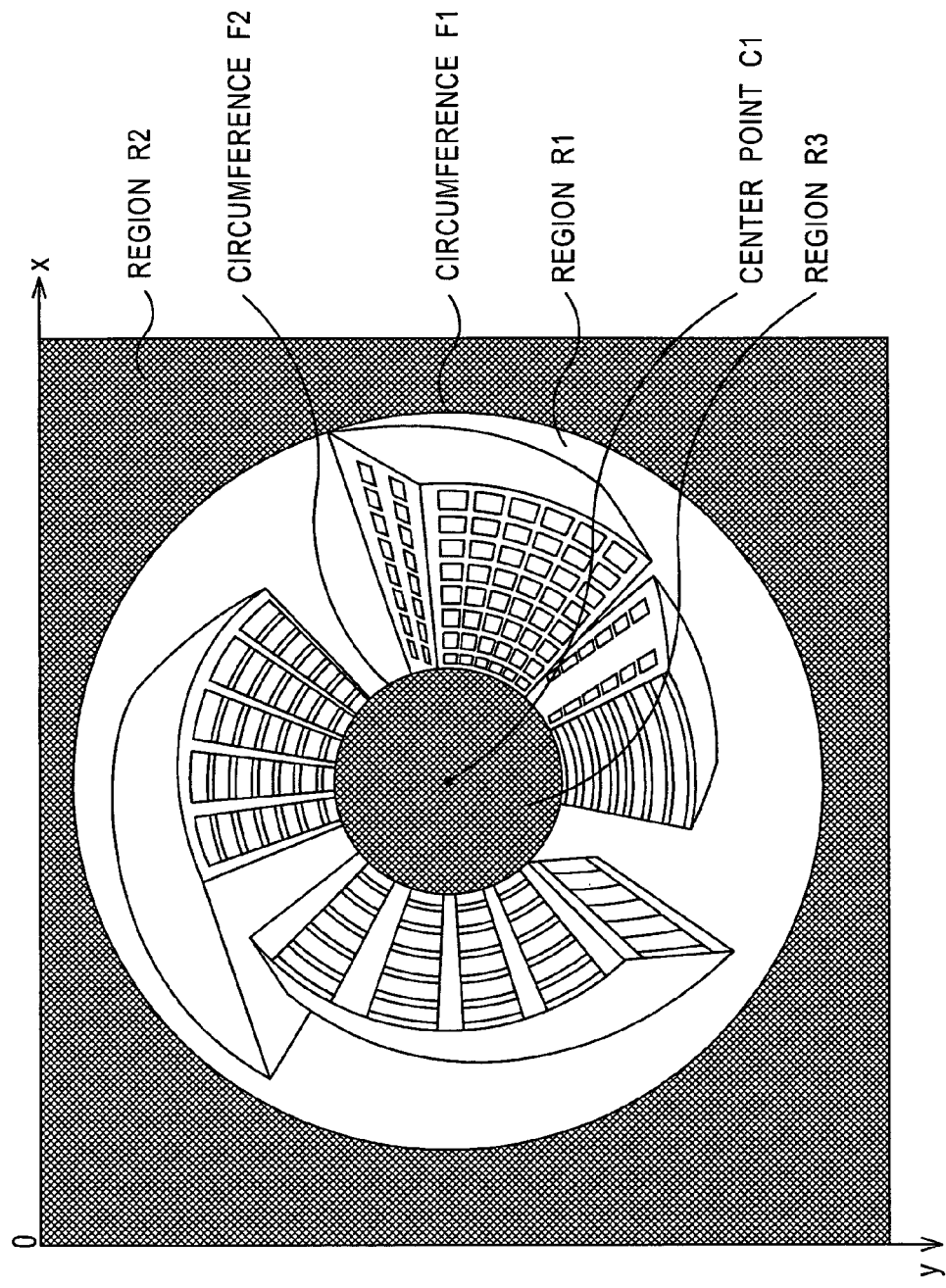
FIG. 16 is a diagram showing omnidirectional image data.

FIG. 13 shows the omnidirectional image data output from the imager 53, described earlier. Regarding the omnidirectional image data, let a two-dimensional orthogonal coordinate system be defined with an origin O at a top left point, an x axis extending from left to right, and a y axis extending from top to bottom, as shown in FIG. 16.

In this case, letting the center point C1 of the circles of the circumferences F1 and F2 be denoted as $(X_0, Y_0)$, the radius of the circle of the circumference F1 as $r_{F1}$, and the radius of the circle of the circumference F2 as $r_{F2}$, points (x, y) constituting the region R2 outside of the circumference F1 can be expressed by equation (3), and points (x, y) constituting the region R3 inside of the circumference F2 can be expressed by equation (4):

$$(x-X_0)^2+(y-Y_0)^2 > r_{F1}^2 \quad (3)$$

$$(x-X_0)^2+(y-Y_0)^2 < r_{F2}^2 \quad (4)$$

The omnidirectional-image converter 43 shown in FIG. 7, before converting omnidirectional image data into original image data in the latitude-longitude representation, converts pixel values constituting the region R2 expressed by equation (3) and pixel values constituting the region R3 expressed by equation (4) into values that are generally impossible as pixel values (e.g., 0).

In converting the pixel values, the coordinates $(X_0, Y_0)$ of the center point C1 and the radii $r_{F1}$ and $r_{F2}$ are needed. This information is supplied from the camera 41 to the omnidirectional-image converter 43 via the buffer 42.

For simplicity of description, exposure time, aperture, and zoom are assumed to be fixed herein.

Figure 17:
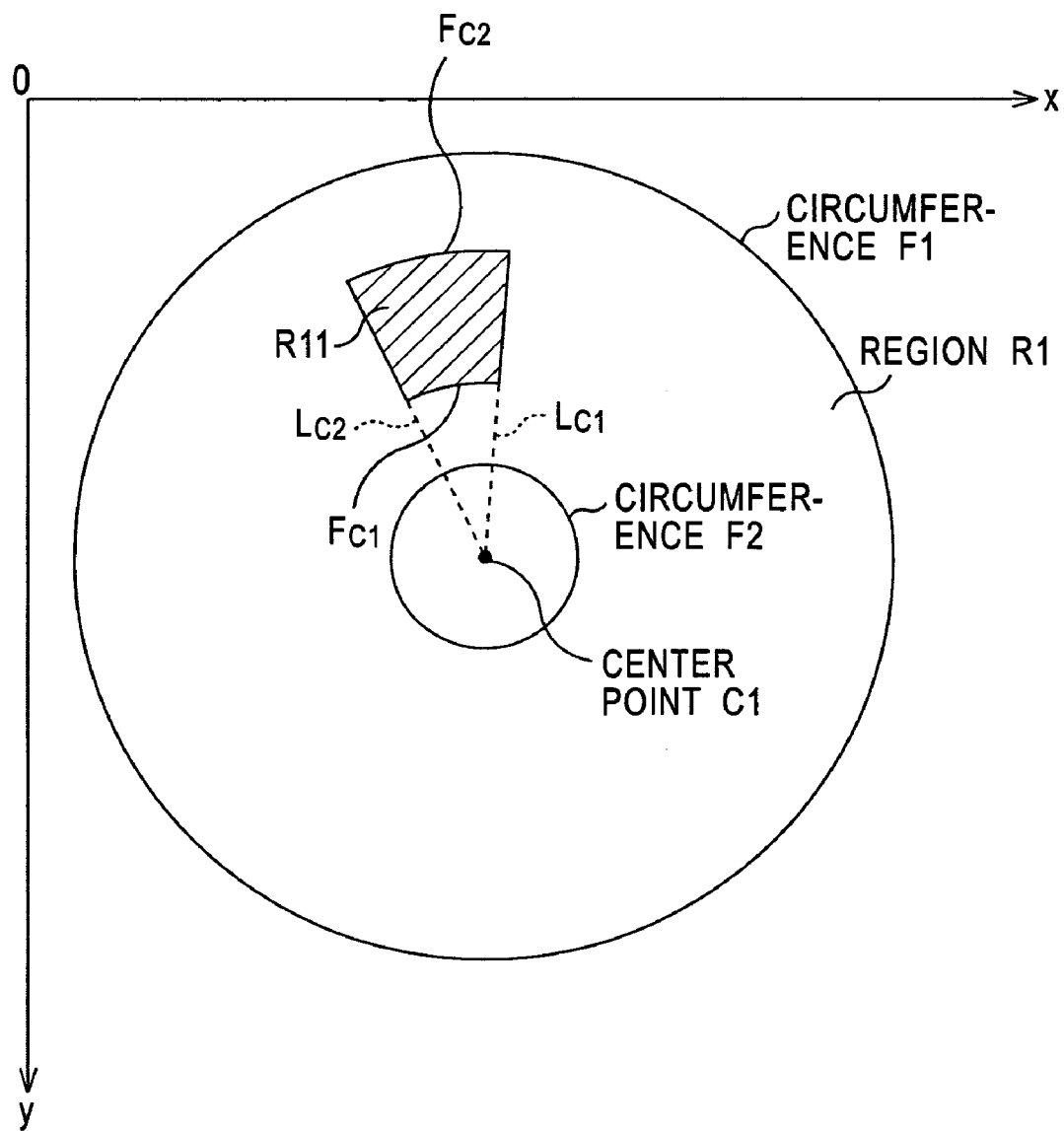
FIG. 17 is a diagram for explaining extraction from the omnidirectional image data.

Regarding the omnidirectional image data that is image data in the region R1 shown in FIGS. 13 and 16, in some cases, only a portion of the omnidirectional image data, such as a portion representing a desired object, is needed. In that case, the portion needed must be extracted from the omnidirectional image data, which must be done in the omnidirectional-image converter 43. That is, the omnidirectional-image converter 43 extracts image data of a substantially fan-shaped region R11 including a desired object, surrounded by two straight lines $L_{c1}$ and $L_{c2}$ in the radial direction, passing through the center point C1, and surrounded by circumferences $F_{c1}$ and $F_{c2}$ of the two circles centered at the center point C1, as shown in FIG. 17.

As shown in FIGS. 13 and 16, the omnidirectional image data includes a distortion such that it becomes narrower as it comes closer to the center point C1, and such that, conversely, it becomes wider as it goes away from the center point C1. This also applies to substantially fan-shaped image data that is extracted from the omnidirectional image data by the omnidirectional-image converter 43, and image data having such a distortion must be converted to remove the distortion before being processed by the image processing apparatus shown in FIG. 5.

The above-described distortion in the omnidirectional image data output from the camera 41 that functions as an omnidirectional camera can be considered separately as a distortion in the circumferential direction of a circle passing through the center point C1 and a distortion in the radial direction thereof.

First, regarding the distortion in the circumferential direction, in the omnidirectional image data shown in FIGS. 13 and 16, on the circumference of a circle centered at the center point C1, the scale is constant and therefore a distortion does not exist.

Figure 18:
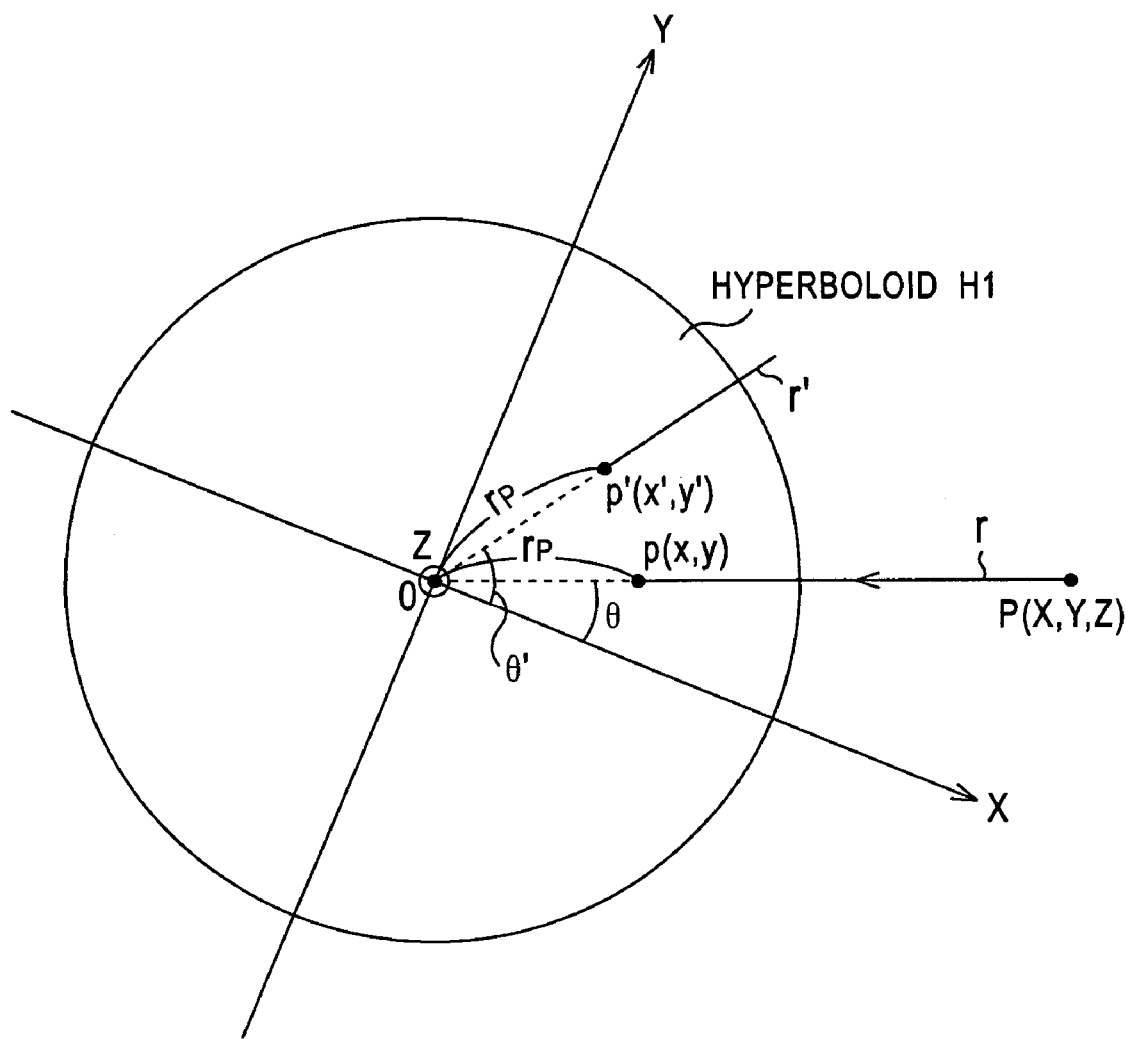
FIG. 18 is a diagram for explaining a distortion in a circumferential direction.

FIG. 18 shows the hyperboloid H1 acting as the condenser 52, as viewed from the direction of the Z axis.

Referring to FIG. 18, a light ray r is incident from a point P(X,Y,Z) on an object toward the Z axis at an angle θ with the X axis (XZ plane). The light ray r is reflected by the hyperboloid H1 and thereby reaches a point p(x, y) on a photo-receiving surface (image surface) A3 of the imager 53 (virtual screen) shown in FIG. 19, which will be described later. In this case, the point p(x, y) makes the same angle θ with the X axis (XZ plane) as the angle the light ray r makes with the X axis.

Considering a light ray r' that is incident toward the Z axis with an angle θ' with respect to the X axis, the light ray r' is also reflected by the hyperboloid H1 and thereby reaches a point p'(x', y') on the photo-receiving surface (image surface) A3. Also in this case, the point p'(x', y') makes the same angle θ' with the X axis as the light ray r' makes with the X axis.

Furthermore, if the light rays r and r' have the same elevation angle (which will be described later) with respect to the Z axis, the light rays r and r' are received at points on the photo-receiving surface A3 at different positions but having the same distance $r_p$ from the X axis.

From what has been described above, a plurality of light rays having the same elevation angle with respect to the Z axis is received at points on the photo-receiving surface A3, the points having the same distance from the Z axis and making the same angles with the X axis as angles that the light rays make with the X axis.

Thus, a plurality of light rays having the same elevation angle with respect to the Z axis and having the same angle with respect to the X axis is incident on a circumference of the photo-receiving surface A3 about the Z axis at regular intervals. Therefore, in the omnidirectional image data, a distortion does not exist in the circumferential direction of a circle centered at the center point C1 at the intersection of the photo-receiving surface A3 and the Z axis.

On the other hand, in the omnidirectional image data shown in FIGS. 13 and 16, on a straight line in the radial direction passing through the center point C1, the scale becomes smaller towards the center point C1 and the scale becomes larger away from the center point C1. Therefore, the omnidirectional image data includes a distortion in the radial direction.

Figure 19:
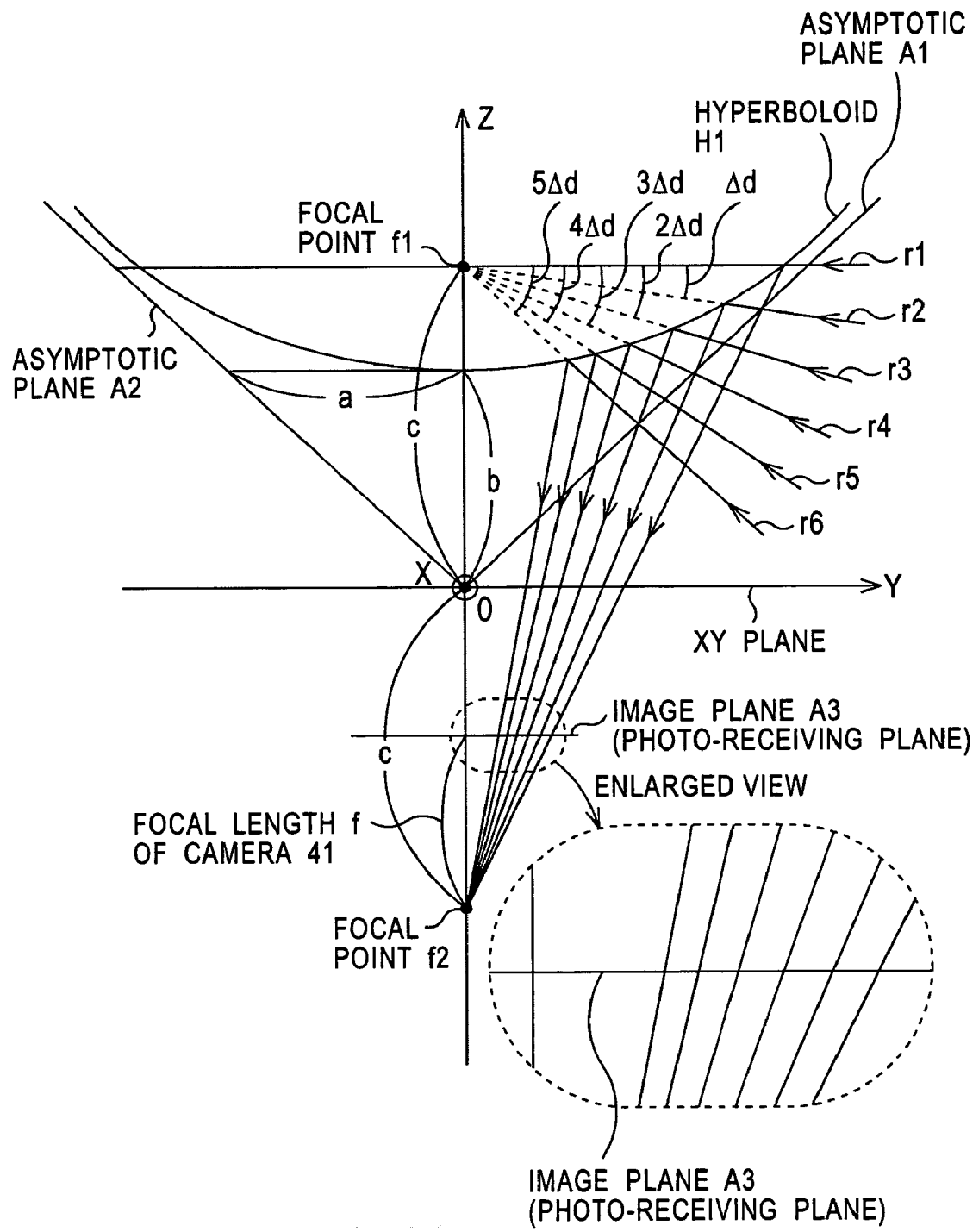
FIG. 19 is a diagram for explaining a distortion in a radial direction.

FIG. 19 shows the hyperboloid H1 acting as the condenser 52, as viewed from the direction of the X axis.

Referring to FIG. 19, a light ray r1 that is incident toward the focal point f1 at an elevation angle of 0° with respect to the Z axis is reflected by the hyperboloid H1, is thereby directed toward the focal point f2, and is received by the photo-receiving surface (image surface) A3 of the imager 53.

The elevation angle with respect to the Z axis herein refers to an angle made by a plane passing through the focal point on the Z axis and parallel to the XY plane and a light ray incident toward the focal point f1. The photo-receiving surface A3 of the imager 53 is located in the direction of the origin O, and is distant by the focal length f of the camera 41 from the focal point f2 along the Z axis.

A light ray r2 that is incident toward the focal point f1 at an elevation angle Δd° with respect to the Z axis is reflected by the hyperboloid H1, is thereby directed toward the focal point f2, and is received by the photo-receiving surface A3. A light ray r3 that is incident toward the focal point f1 at an elevation angle 2Δd° with respect to the Z axis is reflected by the hyperboloid H1, is thereby directed toward the focal point f2, and is received by the photo-receiving surface A3. Similarly, light rays r4, r5, and r6, with elevation angles increasing by steps of Δd°, are received by the photo-receiving surface A3.

As described above, the intervals of points where the light rays r1 to r6 with elevation angles that vary by steps of Δd° are not regular, and become smaller for points closer to the Z axis (the intervals becomes larger for points remote from the Z axis), as shown in an enlarged view in FIG. 19. That is, the intervals become smaller between light rays having larger elevation angles (the intervals become larger between light rays having smaller elevation angles).

Since the intervals of points where light rays having the same elevation angle are received on the photo-receiving surface A3 are not regular as described above, the omnidirectional image data includes a distortion in the radial direction.

Thus, in order to remove the distortion in the radial direction of the omnidirectional image data, the intervals of points where light rays having the same elevation angle are received on the photo-receiving surface A3 must be regular.

Figure 20:
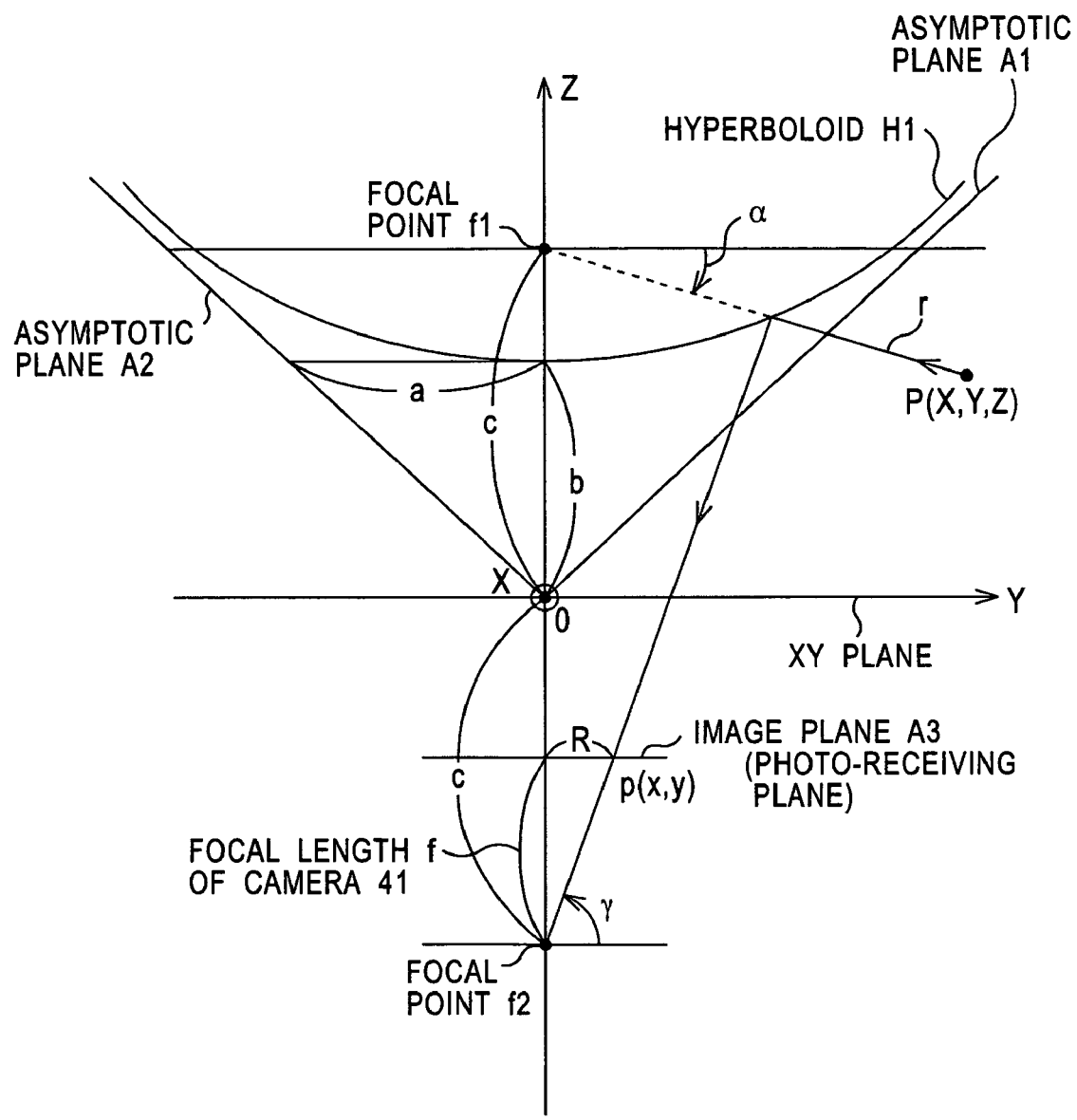
FIG. 20 is a diagram for explaining a method for removing the distortion in the radial direction.

Now, a light ray r that is incident from a point P(X, Y, Z) on an object toward the focal point f1 at an elevation angle of α°, as shown in FIG. 20, will be considered.

Similarly to the case described with reference to FIG. 19, the light ray r is reflected by the hyperboloid H1 acting as the condenser 52, is directed towards the focal point f2, and is received by the photo-receiving surface A3.

In this case, the angle that the light ray r directed toward the focal point f2 makes with a plane passing through the focal point f2 and parallel to the XY plane will be denoted as γ°. Furthermore, in a two-dimensional orthogonal coordinate system defined by the X axis and the Y axis, coordinates of a point p where the light ray r is received on the photo-receiving surface A3 (photo-receiving point) will be denoted as (x, y), and the distance between the point p(x, y) and the Z axis will be denoted as R.

The angle α in FIG. 20 can be expressed by calculating coordinates of a point where the light ray r is reflected on the hyperboloid H1 expressed by equation (1), as in the following equation:

$$\alpha = \tan^{-1} \frac{(b^2 + c^2)\sin\gamma - 2bc}{(b^2 - c^2)\cos\gamma} \quad (5)$$

From equation (5), tan α can be calculated by the following equation:

$$\tan\alpha = \frac{(b^2 + c^2)\sin\gamma - 2bc}{(b^2 - c^2)\cos\gamma} \quad (6)$$

Now, let cos γ be defined as in the following equation:

$$\cos\gamma = X \quad (7)$$

Assigning equation (7) into equation (6) yields the following equation:

$$\{(b^2-c^2)\tan\alpha\}\cdot X=(b^2+c^2)\sqrt{1-X^2}-2bc \quad (8)$$

Rearranging equation (8) yields equation (9):

$$\frac{(b^2 - c^2)\tan\alpha}{b^2 + c^2} \cdot X + \frac{2bc}{b^2 + c^2} = \sqrt{1 - X^2} \quad (9)$$

Let A and B be defined as in equations (10) and (11), respectively:

$$A = \frac{(b^2 - c^2)\tan\alpha}{b^2 + c^2} \quad (10)$$

$$B = \frac{2bc}{b^2 + c^2} \quad (11)$$

Assigning equations (10) and (11) into equation (9) yields equation (12):

$$AX + B = \sqrt{1 - X^2} \quad (12)$$

Equation (12) can be rearranged into a quadratic equation for X, as follows:

$$(A^2+1)X^2 + 2ABX + B^2 - 1 = 0 \quad (13)$$

Solving the quadratic equation in equation (13) yields the following equation:

$$X = \frac{-AB + \sqrt{A^2 - B^2 + 1}}{A^2 + 1} \quad (14)$$

Thus, from equation (7), the angle γ can be calculated by the following equation:

$$\gamma = \cos^{-1}(X) \quad (15)$$

In equation (15), X is defined by equation (14), and A and B in equation (14) are defined by equations (10) and (11), respectively.

Furthermore, from the coordinates of the point p in FIG. 20, the angle γ can be calculated by the following equation:

$$\gamma = \tan^{-1}\left(\frac{f}{R}\right) \quad (16)$$

Since the distance R between the Z axis and the point p(x, y) in FIG. 20 can be expressed as $\sqrt{x^2+y^2}$, equation (16) can be rearranged into the following equation:

$$R = \sqrt{x^2 + y^2} = \left(\frac{f}{\tan \gamma}\right) \quad (17)$$

From what has been described above, by calculating the angle γ according to equation (15) and calculating equation (17) using the angle γ, the distance R from the Z axis to the point p(x, y) where the light ray r incident toward the focal point f1 at an elevation angle α with respect to the Z axis is received on the photo-receiving surface A3 can be calculated.

Thus, omnidirectional image from which a distortion in the radial direction has been removed can be obtained by dividing a predetermined range of elevation angle with respect to the Z axis (e.g., from 0° to 80° equally by an angle Δd°, and calculating distances $R_{p1}$, $R_{p2}$, $R_{p3}$, ... from the Z axis to points p1, p2, p3, ... where light rays incident at elevation angles Δd, 2Δd, 3Δd, ... are received on the photo-receiving surface A3, and converting omnidirectional image data output from the camera 41 so that distances between adjacent points $|R_{p1}-R_{p2}|$, $|R_{p2}-R_{p3}|$, ... will be a constant value.

The conversion of the omnidirectional image data for removing the distortion is executed by the omnidirectional-image converter 43 shown in FIG. 7.

Figure 21:
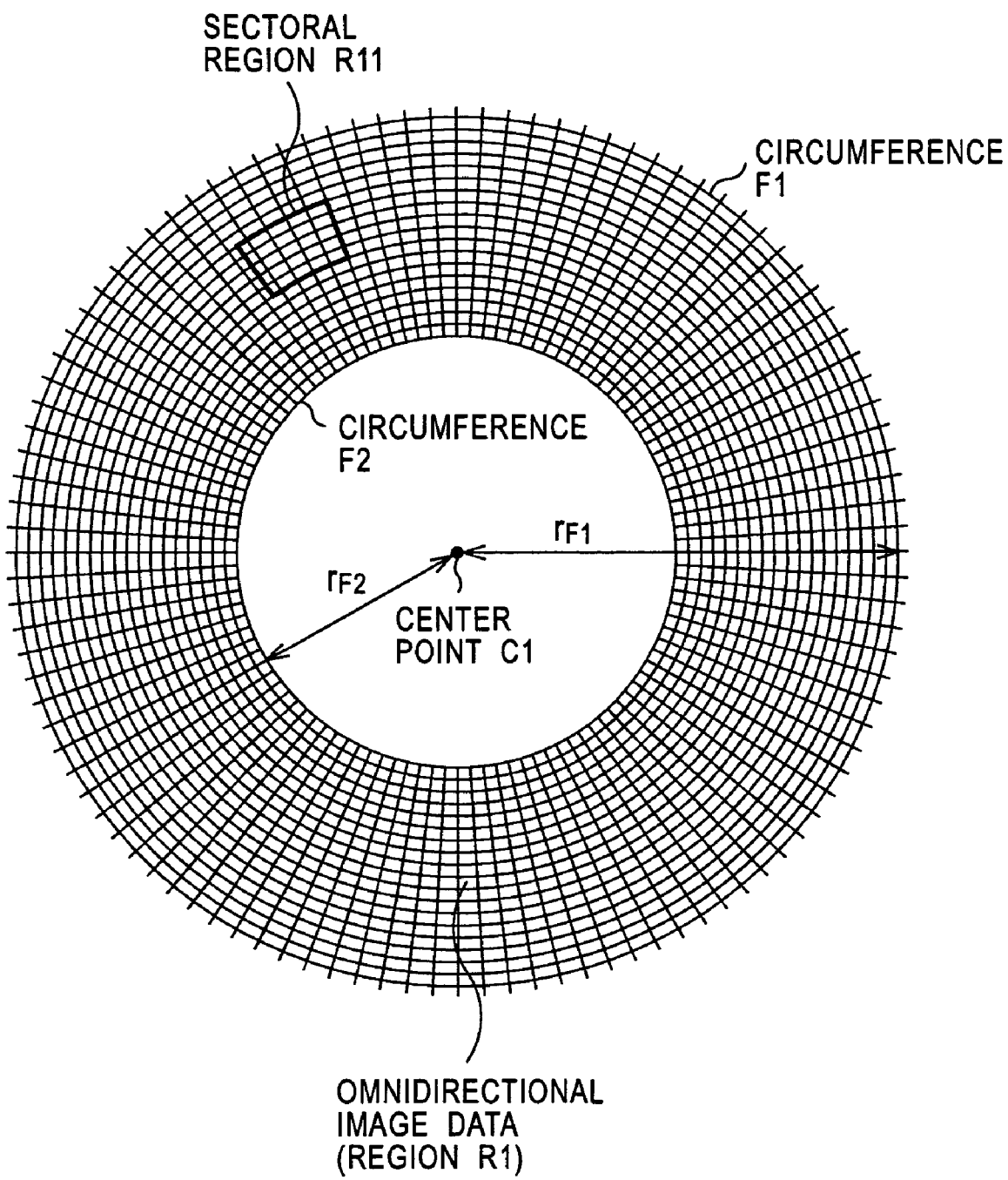
FIG. 21 is a diagram for explaining a method for removing a distortion in a radial direction.

More specifically, the omnidirectional-image converter 43 receives the center point C1, the radius $r_{F1}$ of the circle of the circumference F1, and the radius $r_{F2}$ of the circle of the circumference F2 as well as the omnidirectional data including the above-described distortion in the radial direction, from the camera 41 via the buffer 42, as shown in FIG. 21.

The omnidirectional-image converter 43 draws a plurality of concentric circles having radii $R_{p1}$, $R_{p2}$, $R_{p3}$, ... and centered at the center point C1, in the region R1 surrounded by the circumference F1 of the circle centered at the center point C1 and having the radius $r_{F1}$ and the circumference F2 of the circle centered at the center point C1 and having the radius $r_{F2}$. Furthermore, the omnidirectional-image converter 43 draws a plurality of straight lines passing through the center point C1 and equally dividing the circumferences of the plurality of concentric circles. Thus, the omnidirectional-image converter 43 obtains a large number of intersections of the plurality of concentric circles and the plurality of straight lines in the region R1.

The large number of intersections formed by the plurality of concentric circles and the plurality of straight lines will be referred to as conversion-subject points when appropriate.

From what has been described above, by disposing conversion-subject points such that adjacent conversion-subject points are regularly spaced, omnidirectional image data including a distortion can be converted into image data from which the distortion has been removed.

Now, a case will be considered where image data of the substantially fan-shaped region R1 shown in FIG. 21, which is the same as that shown in FIG. 17, is converted into image data not including a distortion.

Figure 22:
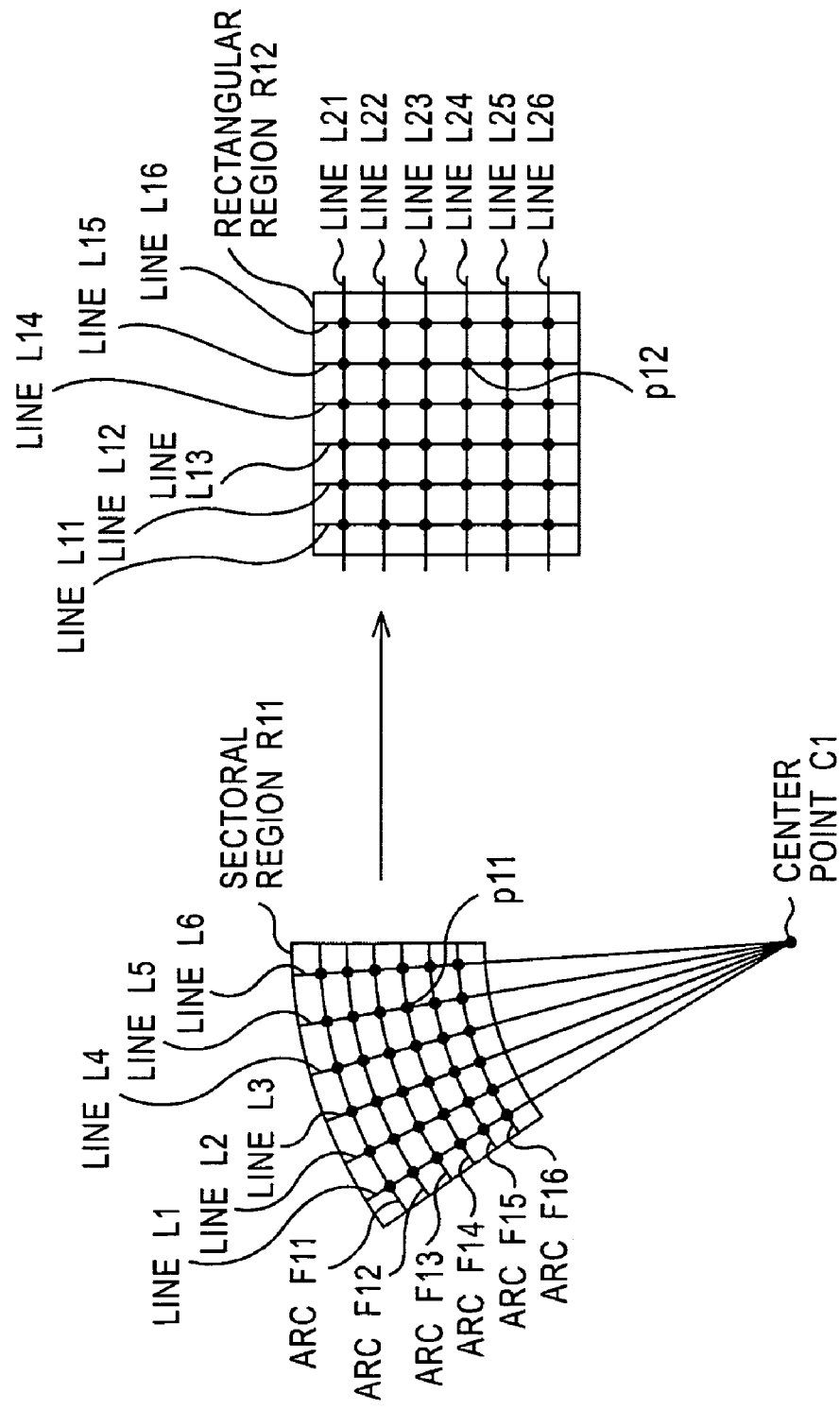
FIG. 22A is a diagram for explaining conversion of omnidirectional image data by which a distortion in a radial direction is removed.
FIG. 22B is a diagram for explaining conversion of omnidirectional image data by which a distortion in a radial direction is removed.

As shown in FIG. 22A, in the region R11, a large number of conversion-subject points corresponding to intersections of arcs F11, F12, F13, F14, F15, F16 of the plurality of concentric circles centered at the center point C1 and the plurality of straight lines L1, L2, L3, L4, L5, and L6.

The omnidirectional-image converter 43 disposes the large number of conversion-subject points in the region R11 such that adjacent conversion points are regularly spaced, as shown in FIG. 22B.

More specifically, the omnidirectional-image converter 43 assumes regularly spaced straight lines L21, L22, L23, L24, L25, and L26 in the horizontal direction, respectively corresponding to the arcs F11, F12, F13, F14, F15, and F16 shown in FIG. 22A, and regularly spaced straight lines L11, L12, L13, L14, L15, and L16 in the vertical direction, respectively corresponding to the straight lines L1, L2, L3, L4, L5, and L6 shown in FIG. 22A. The omnidirectional-image converter 43 then converts (assigns) conversion-subject points to corresponding intersections of the straight lines L21 to L26 in the horizontal direction and the straight lines L11 to L16 in the vertical direction.

Thus, for example, a conversion-subject point p11 at an intersection of the arc F14 and the straight line L5 in FIG. 22A is converted into an intersection p12 of the straight line L24 corresponding to the arc F14 and the straight line L15 corresponding to the straight line L5 in FIG. 22B.

Considering a sphere having a mirror surface and surrounding the camera 41, omnidirectional image data displays the scenery of the outside of the sphere, reflected on the surface of the sphere. Thus, for example, regarding the sphere surrounding the camera 41 as the Earth, the vertical axis and the horizontal axis of image data obtained by the omnidirectional-image converter 43 correspond to the latitude and longitude of the Earth, respectively. Thus, in this embodiment, omnidirectional image data output from the omnidirectional-image converter 43, from which a distortion has been removed, is referred to as image data in a latitude-longitude representation.

As described above, the omnidirectional-image converter 43 converts (changes) the positions of conversion-subject points to convert image data including a distortion in the radial direction (omnidirectional image data) into image data from which the distortion has been removed (image data in the latitude-longitude representation). As described earlier, the conversion-subject points are intersections of the circles centered at the center point C1 and the straight lines passing through the center point C1. Thus, the conversion-subject points do not necessarily coincide with pixel centers of pixels constituting the photo-receiving surface A3 (FIGS. 19 and 20) of the imager 53 (FIG. 12). In general, coincidence does not often occur.

Since conversion-subject points are generally deviated from pixel centers as descried above, the omnidirectional-image converter 43 must calculate pixel values of conversion-subject points before converting the positions of the conversion-subject points.

Thus, the omnidirectional-image converter 43 calculates pixel values at conversion-subject points, for example, in the manner described below.

Figure 23:
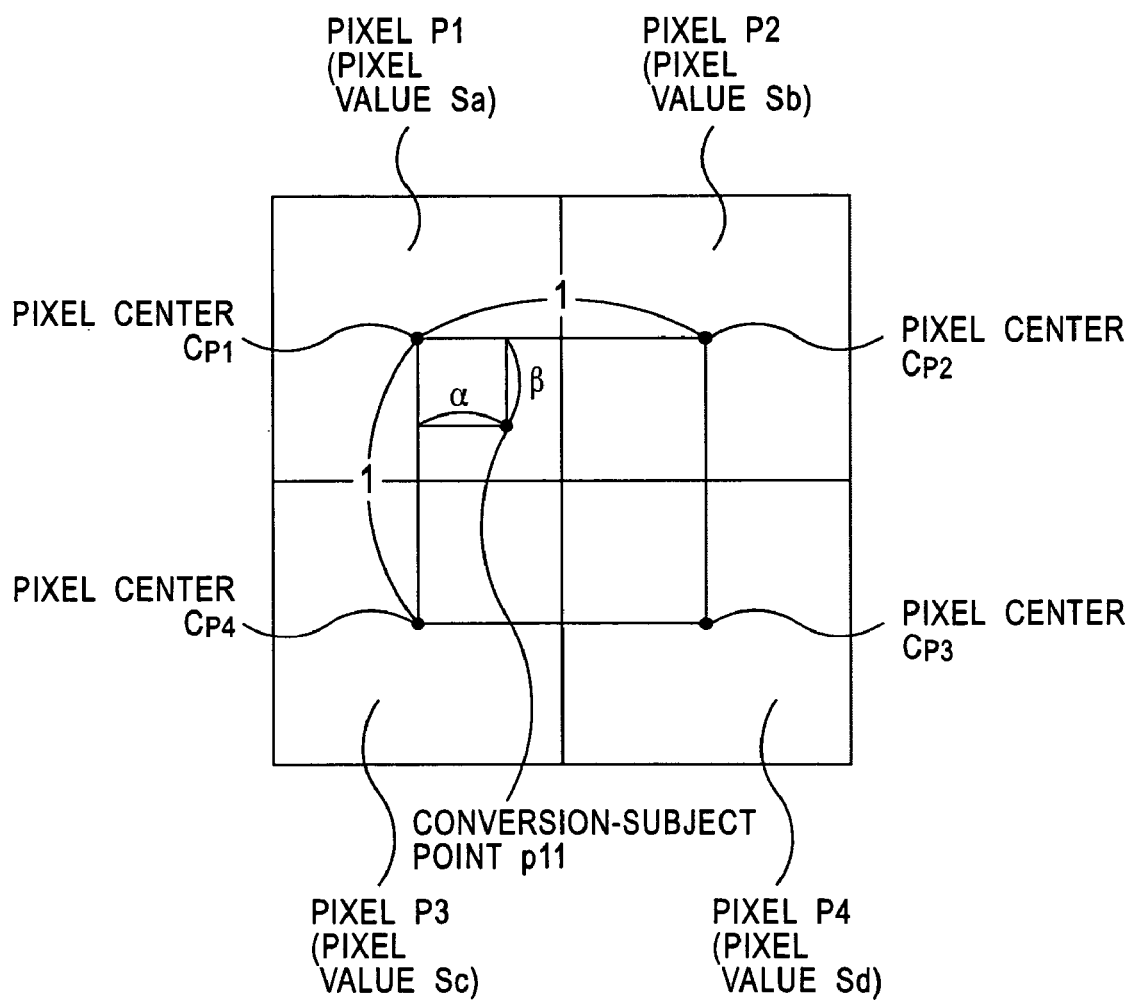
FIG. 23 is a diagram for explaining a method for calculating a pixel value at a conversion-subject point.

Now, let it be assumed that the conversion-subject point p1 in FIGS. 22A and 22B resides within a rectangle (square) having vertices at pixel centers $C_{P1}$, $C_{P2}$, $C_{P3}$, and $C_{P4}$ of 2×2, four pixels P1, P2, P3, and P4 adjacent to each other on the photo-receiving surface A3, as shown in FIG. 23. In the embodiment shown in FIG. 23, pixel centers adjacent to each other in the vertical or horizontal direction is assumed to be 1.

If the conversion-subject point p11 is a point that is rightward by a distance α and downward by a distance β relative to the pixel center $C_{P1}$, for example, the omnidirectional-image converter 43 uses a pixel values $S_s$ according to the following equation as a pixel value of the conversion-subject point p11:

$$S_s = \{S_a \cdot (1-\alpha) + \alpha \cdot S_b\}(1-\beta) + \beta \cdot \{S_c \cdot (1-\alpha) + \alpha \cdot S_d\} \quad (18)$$

In equation (18), $S_a$, $S_b$, $S_c$, and $S_d$ denote the pixel values of the pixels P1, P2, P3, and P4, respectively. Furthermore, in equation (18), α and β are values in a range of 0 to 1, and correspond to the position of the conversion-subject point p11.

In the embodiment shown in FIG. 12, the condenser 52 is implemented by a hyperboloidal mirror. Alternatively, for example, the condenser 52 may be implemented by a spherical mirror.

In the embodiment shown in FIG. 7, the camera 41 is implemented by an omnidirectional camera that is capable of capturing omnidirectional image data. Alternatively, for example, the camera 41 may be implemented by a video camera having a fish-eye lens, a video camera having a usual (ordinary) lens, etc.

In a video camera having an ordinary lens, assuming a virtual screen is formed by a rectangular plane perpendicular to the optical axis of the video camera, having a center of gravity on the optical axis, and disposed between the lens center of the video camera and an object, image data formed on the virtual screen by light rays incident on the lens center from points on the object is captured. At that time, the light rays incident on the virtual screen ideally undergo no conversion, so that the virtual screen that is a two-dimensional plane loyally reflects the circumstances of the real world that is a three-dimensional space.

On the other hand, in a video camera having an omnidirectional camera or a fish-eye lens, although omnidirectional or wide-angle imaging is allowed, light rays incident on a virtual screen is converted non-linearly. More specifically, in the case of an omnidirectional camera, as shown in FIG. 19, light rays are reflected by (the hyperboloid H1 representing) a hyperbolic mirror, so that omnidirectional data in which the circumstances of the real world are reflected with a distortion is formed on the virtual screen.

Thus, in the omnidirectional-image converter 43 shown in FIG. 7, such omnidirectional data including a distortion is converted into image data in latitude-longitude representation similar to image data captured by a camera having an ordinary lens. Assuming that the image data in latitude-longitude representation as image data captured by a camera having an ordinary lens, the image data in the latitude-longitude representation represents all longitudinal directions centered about the optical axis of the omnidirectional camera. Thus, a virtual screen of the camera having an ordinary lens has an infinite length in the horizontal direction (latitudinal direction).

In the case of an omnidirectional camera, regarding latitudinal direction, ideally, directions of 0° to −90° (directions from arbitrary points below the XY plane toward the origin in FIG. 19) are imaged. Thus, assuming image data in latitude-longitude representation as image data captured by a camera having an ordinary lens, a virtual screen thereof has an infinite length in the downward direction (direction of minus latitude).

Image data in the latitude-longitude representation, obtained by conversion of omnidirectional image data captured by an omnidirectional camera, is not needed in its entirety when the image display apparatus shown in FIG. 2 displays an image. That is, when the image display apparatus shown in FIG. 2 displays an image, of the image data in the latitude-longitude representation, image data of a certain range including the object being considered basically suffices.

Thus, in the following description, it is assumed that an object is imaged using a camera having an ordinary lens, image data in a range that is reflected on a virtual screen thereof is extracted from image data in the latitude-longitude representation, and processing is executed on the image data that has been extracted. The extraction can be performed, for example, by the omnidirectional-image converter 43 shown in FIG. 7.

Furthermore, in the following description, the optical axis or the lens center of the camera 41, assuming that the camera 41 is a camera having an ordinary lens, refers to the optical axis or the lens center of the camera having an ordinary lens. Thus, as described earlier, regarding image data extracted from image data in the latitude-longitude representation, assuming that the image data was captured by a camera having an ordinary lens, the optical axis or the lens center of the camera is the optical axis or the lens center of the camera 41.

In the image processing apparatus shown in FIG. 5, the data converter 30 converts image data stored in the image database 2, so that image data as viewed from a user's viewpoint, that is, image data showing an object as viewed by a user in the real world, is displayed on the display 6, as described earlier with reference to FIGS. 4A to 4C.

The data converter 30 is allowed to obtain image data showing an object as viewed by a user in the real world by the following principles.

Figure 24:
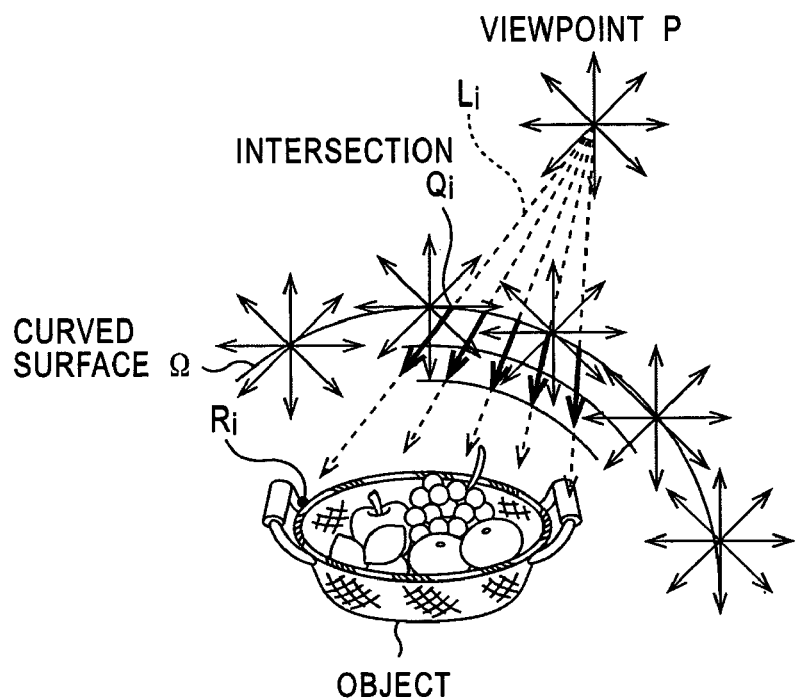
FIG. 24 is a diagram showing the principles for converting original image data into presentation image data as viewed from a user.

The image database 2 stores original image data in latitude-longitude representation, captured from a plurality of viewpoints (viewpoints of the camera 41), output from the image generating apparatus shown in FIG. 7. This can be considered that image data of an object captured from a plurality of viewpoints on a curved surface Ω as viewpoints is stored in the image database 2, as shown in FIG. 24.

Now, setting a viewpoint P at a certain point that is on the other side of an object with respect to the curved surface Ω, image of the object as viewed from the viewpoint P will be considered.

The viewpoint P is taken at a point such that a straight line connecting the viewpoint P to an arbitrary point on the object crosses the curved surface Ω.

For simplicity of description, it is assumed herein that image data of an object captured from arbitrary points on the curved surface Ω as viewpoints is stored in the image database 2, and that light rays go straight, without being attenuated, in a space (medium) where the user observes the object.

The trajectories of light rays relating to the object as viewed from the viewpoint P (trajectories of light rays incident from the object to the viewpoint P) can be represented by straight lines connecting the viewpoint P and respective points on the object. Since the light rays always crosses the curved surface Ω, pixel values corresponding to light rays having trajectories coinciding those of the light rays (light-ray information that is the same as the light-ray information of the object as viewed from the viewpoint P) always exist in the image database 2.

Now, considering a straight line $L_i$ connecting the viewpoint P and a point $R_i$ on the object, the intersection of the straight line $L_i$ and the curved surface Ω will be denotes as $Q_i$. In this case, image data of an object captured with arbitrary points on the curved surface Ω as viewpoints is stored in the image database 2, so that image data of the object captured with the point $Q_i$ as a viewpoint is stored in the image database 2. Furthermore, in this case, light rays go straight without being attenuated, so that a light ray incident from the point $R_i$ on the object to the point $Q_i$ on the curved surface Ω coincides with a light ray incident on the viewpoint P. Thus, when the object is viewed from the viewpoint P, the pixel value corresponding to the light ray directed from the point $R_i$ on the object to the viewpoint P coincides with the pixel value corresponding to the light ray directed from the point $R_i$ on the object to the point $Q_i$ on the curved surface Ω, and this pixel value corresponding to the light ray directed from the point $R_i$ to the point $Q_i$ is stored in the image database 2.

From what has been described above, the pixel value at point $R_i$ on the object as viewed from the viewpoint P can be obtained from image data captured with the point $Q_i$ on the curved surface Ω as a viewpoint.

Similarly, pixel values relating to other points on the object as viewed from the viewpoint P can be obtained from image data captured with points on the curved surface Ω as viewpoints. Thus, if image data captured with arbitrary points on the curved surface Ω as viewpoints exists, image data of the object as viewed from the viewpoint P can be obtained by selecting, from the pixel values of pixels constituting the image data, a pixel value corresponding to a light ray having the same light-ray information as the light-ray information connecting the viewpoint P to the object.

Figure 25:
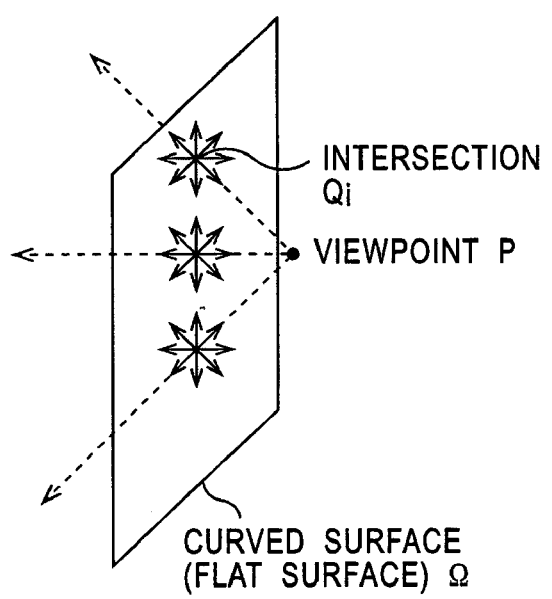
FIG. 25 is a diagram showing the principles for converting original image data into presentation image data as viewed from a user.

The shape of the curved surface Ω shown in FIG. 24 is not particularly limited, and may be an arbitrary shape. Thus, the curved surface Ω may be a flat surface, as shown in FIG. 25.

The curved surface Ω may be either an open curved surface or a closed curved surface. If the curved surface Ω is an open curved surface, however, the viewpoint P must be taken such that a straight line connecting the viewpoint P to an arbitrary point on the object crosses the curved surface Ω.

Furthermore, if the curved surface Ω is a closed curved surface surrounding the object, the following can be said from the principles described above.

If light-ray information of light rays (trajectories of light rays and pixel values corresponding to the light rays) in all directions have been obtained for all points on the curved closed surface surrounding the object, an image as viewed from any point outside the closed curved surface can be reconstructed.

Although image data of an object captured with arbitrary points on the curved surface Ω as viewpoints are obtained in the case described above, a viewpoint for imaging an object need not reside on the curved surface Ω. For example, if the curved surface Ω is a closed curved surface surrounding the object, in order to allow reconstruction of an image as viewed from any point outside the closed curved surface, in principle, it suffices if light-ray information of all directions for any point on the closed curved surface exists. The light-ray information may relate to an image captured with a point on the closed curved surface as a viewpoint or an image captured with a point not on the closed curved surface as a viewpoint. This also applies to a case where the curved surface Ω is an open curved surface.

As described above, the data converter 30 shown in FIG. 5, using light-ray information directed to a user's viewpoint among light-ray information crossing the predetermined curved surface Ω when original image data stored in the image database 2 was captured, reconstructs image data for presentation (image data as viewed from the user's viewpoint), thereby converting original image data into presentation image data.

More specifically, the data converter 30 shown in FIG. 5 sets a virtual screen on which an image as viewed from a user's viewpoint is displayed (virtual screen) between the user's viewpoint and an object, and detects a light ray having the same trajectory as a straight line connecting the user's viewpoint and a pixel on the virtual screen. Furthermore, the data converter 30 uses a pixel value corresponding to the light ray detected as a pixel value of the pixel on the virtual screen, and performs the processing described above for all the pixel values on the virtual screen, thereby reconstructing image data as viewed from the user's viewpoint (presentation image data) on the virtual screen.

Thus, for example, when presentation image data as viewed from an arbitrary point outside the closed curved surface surrounding the object is to be reconstructed, it suffices if light-ray information of all directions at all the points on the closed curved surface exists. In theory, points on the closed curved surface and directions at the points are infinite, so that points on the closed curved surface and directions at the points are actually limited to finite numbers.

When presentation image data with as viewed from a viewpoint at an arbitrary point outside the closed curved surface is reconstructed using light-ray information of all directions at all the points on the closed curved surface, if the viewpoint is on the closed curved surface, presentation image data can be reconstructed simply using light-ray information of a light ray that passes through a point on the closed curved surface that coincides with the viewpoint.

On the other hand, if the viewpoint is not on the closed curved surface, intersections of the closed curved surface and straight lines connecting the viewpoint to all the pixels on the virtual screen set for the viewpoint must be calculated. In this case, it sometimes becomes difficult to display presentation image data in real time, for example, depending on the performance of the CPU 12 of the computer 1 (FIG. 3) as an image processing apparatus.

Thus, in the data converter 30, the image-data converter 31 converts original image data stored in the image database 2 into intermediate data, which is image data in a predetermined format composed of pixel values corresponding to light rays incident on relevant pixels, and the intermediate-data converter 32 converts the intermediate data into presentation image data as viewed from a user's viewpoint, allowing the presentation image data to be displayed in real time.

That is, the image-data converter 31 generates intermediate data that is image data in which pixel values at intersections of light rays incident on predetermined pixels constituting original image data and a plane perpendicular to the light rays and passing a predetermined point are used as pixel values of the predetermined pixels of the original image data.

Thus, for example, assuming that the curved surface $\Omega$ is a closed curved surface forming a spherical surface and considering a light ray in a certain direction at a point on the spherical surface, the image-data converter 31 assumes a pixel at a point $P_x$ that the subject light ray passes on a plane $\alpha$ passing through a predetermined point, e.g. the origin, and perpendicular to the subject light ray, and sets the pixel value thereof as a pixel value corresponding to the subject light ray. Similarly, the image-data converter 31 sets pixels on the plane $\alpha$ and pixel values thereof for light rays in the same direction at points on the spherical surface other than the point Q, whereby image data composed of pixel values corresponding to light rays in the same direction is formed on the plane $\alpha$.

Figure 26:
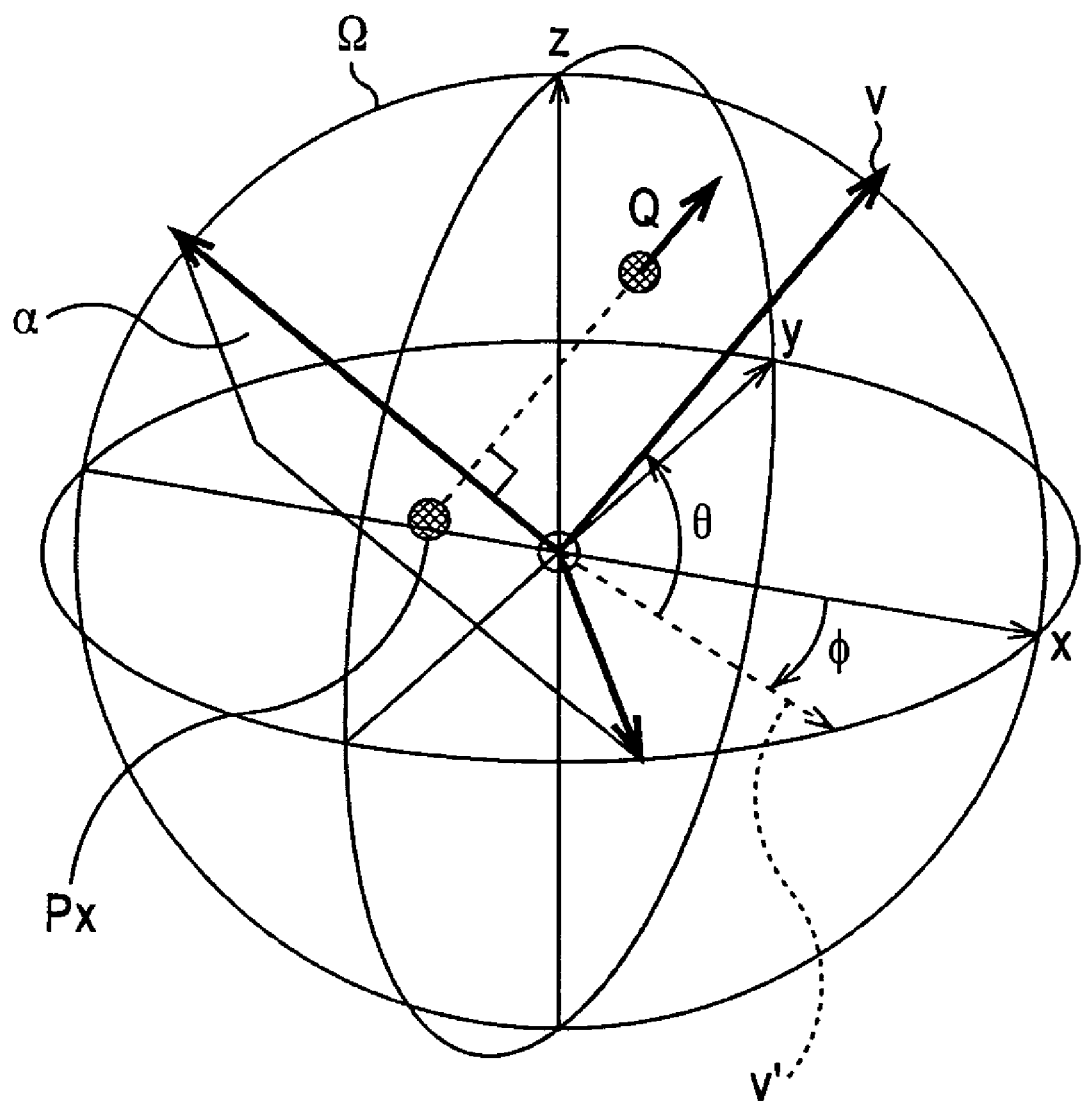
FIG. 26 is a diagram showing a method for converting original image data into intermediate data.

Now, referring to FIG. 26, a three-dimensional coordinate system with the center of the spherical surface as the origin will be considered, and a vector passing the origin and in the same direction as a light ray in a direction at the point Q on the spherical surface will be referred to as a vector v. Furthermore, a vector obtained by projecting the vector v onto the xy plane in the three-dimensional coordinate system will be referred to as a vector v', an angle $\theta$ made by the vector v and the vector v' will be referred to as a latitude, and an angle $\phi$ made by the x axis and the vector v' will be referred to as a latitude. The direction of the vector v is defined by the latitude $\theta$ and the longitude $\phi$.

On the plane $\alpha$ described above, image data composed of pixel values at positions corresponding to light rays in the same direction as the vector v is formed. The image data formed on the plane $\alpha$ is image data as viewed from an infinite distance in the direction of the vector v as a viewpoint.

Similarly, the image-data converter 31 constructs image data for planes passing through the origin and perpendicular to vectors v defined by various values of the latitude $\theta$ and the longitude $\phi$, and outputs the image data as intermediate data.

Next, an image-data conversion process executed in step S1 shown in FIG. 6 by the image-data converter 31 shown in FIG. 5, i.e., a process for converting original image data into intermediate data, will be described with reference to a flowchart shown in FIG. 27 and FIG. 28.

First, in step S21, the image-data converter 31 selects a subject imaging point $P_c$ from among viewpoints of the camera 41 (hereinafter also referred to as imaging points when appropriate) for the capture of original image data stored in the image database 2.

More specifically, in the image generating apparatus described with reference to FIG. 7, original image data is captured with the camera 41 fixed while moving an object. Relatively, this is equivalent to capturing original image data with the object fixed while moving the camera 41. That is, the original image data is captured by imaging an object while changing the viewpoint of the camera 41 (imaging point), so that a large number of imaging points exists. In step S21, an arbitrary imaging point that has not been considered as a subject imaging point is selected as a subject imaging point $P_c$ from among the large number of imaging points.

In the image database 2, as well as the frames of original image data, information representing the position of an object and the position and the direction of the optical axis of the camera 41 during the capture of the original image data is stored, as described earlier. Based on this information, for each of the frames of the original image data, the image-data converter 31 calculates imaging points corresponding to the positions of the camera 41 in a case where the position (including the attitude) of the object is fixed, for example, in the imaging coordinate system, and selects therefrom a subject imaging point $P_c$ that has not yet been considered as a subject imaging point.

Then, the process proceeds to step S22, in which the image-data converter 31 sets a virtual screen for the subject imaging point $P_c$, and selects a subject pixel $P_s$ that has not yet been considered as a subject pixel from among pixels on the virtual screen.

Figure 28:
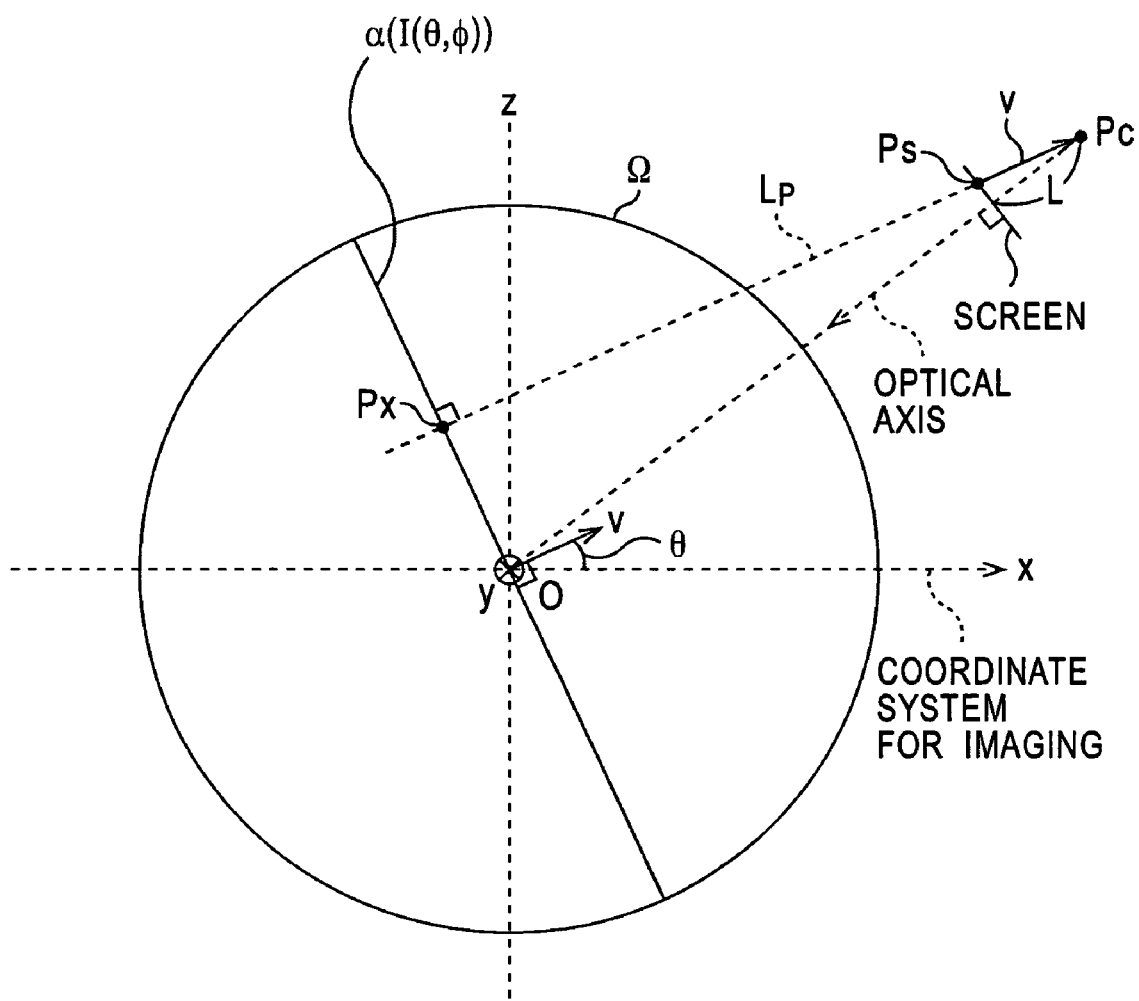
FIG. 28 is a diagram showing an image-data conversion process for converting original image data into intermediate data.

More specifically, referring to FIG. 28, the image-data converter 31 sets a virtual screen for the subject imaging point $P_c$, the virtual screen being a rectangular plane perpendicular to the optical axis of the camera 41, and distant by a predetermined distance L from the subject imaging point in the direction of the optical axis of the camera 41. Then, the image-data converter 31 selects a subject pixel $P_s$ that has not yet been considered as a subject pixel from among the pixels on the virtual screen, for example, in the order of raster scanning.

In the image-data converter 31, the direction of the optical axis of the camera 41 at the subject imaging point is recognized based on the information stored in the image database 2.

It is assumed that the numbers of pixels on the virtual screen in the horizontal and vertical directions coincide with the numbers of pixels in the horizontal and vertical directions of the frames of the original image data captured from the subject imaging point $P_c$, and that the original image data captured from the subject imaging point $P_c$ is displayed on the virtual screen.

After the processing in step S22, the process proceeds to step S23, in which the image-data converter 31 calculates a vector v with the subject pixel $P_s$ as the initial point and the subject imaging point $P_c$ as the terminal point. The process then proceeds to step S24.

In the embodiment shown in FIG. 28, the vector v is a vector in the xz plane in the imaging coordinate system, and has a direction of an angle $\theta$ in the direction of the z axis from the xy plane. That is, in the embodiment shown in FIG. 28, the vector v is a vector having a latitude $\theta$ and a longitude of 0 degrees.

In the embodiment shown in FIG. 28, the optical axis of the camera 41 at the subject imaging point $P_c$ passes through the origin of the imaging coordinate system. However, the optical axis of the camera 41 need not necessarily pass through the origin of the imaging coordinate system.

In FIG. 28, as the curved surface $\Omega$ surrounding an object, a spherical surface centered at the origin, forming a closed curved surface, is shown.

In step S24, the image-data converter 31 calculates a plane $\alpha$ that is perpendicular to the vector v and that passes through a predetermined point, e.g., the origin, on the imaging coordinate system. The process then proceeds to step S25.

The plane $\alpha$ need not necessarily pass through the origin.

In step S25, the image-data converter 31 calculates the latitude $\theta$ and longitude $\phi$ of the vector calculated in step S23, i.e., the latitude $\theta$ as an angle formed by the vector v and the xy plane and the longitude $\phi$ as an angle formed by the vector v and the xz plane. The process then proceeds to step S26.

The latitude $\theta$ and the longitude $\phi$ of the vector v can also be considered as the latitude $\theta$ and the longitude $\phi$ of the normal direction of the plane $\alpha$ calculated in step S24. Thus, the plane $\alpha$ passing through the origin as the predetermined point can be defined by the latitude θ and the longitude φ thereof, so that the plane α defined by the latitude θ and the longitude φ will hereinafter also be denoted as a plane I(θ, φ) when appropriate.

Regarding the sign of the latitude θ, the positive side and the negative side of the z axis will be considered as positive and negative, respectively. Also, regarding the sign of the longitude φ, the positive side and the negative side of the y axis will be considered as positive and negative, respectively.

In step S26, the image-data converter 31 calculates a straight line $L_p$ connecting the subject imaging point $P_c$ and the subject pixel $P_s$, as shown in FIG. 28. In step 26, the image-data converter 31 calculates an intersection $P_x$ of the straight line $L_p$ and the plane α (I(θ, φ)) calculated in step S24. The process then proceeds to step S27, in which the image-data converter 31 calculates coordinates $(X_α, y_α)$ of the point $P_x$ on the plane α.

The coordinates $(X_α, y_α)$ of the point $P_x$ on the plane α can be calculated as follows.

Now, assuming a two-dimensional coordinate system on the plane α, unit vectors in the directions of the x axis and the y axis in the imaging coordinate system will be denoted as $v_x$ and $v_y$, respectively.

In this case, the x coordinate $x_α$ and the y coordinate $y_α$ of the point $P_x$ can be obtained by calculating $v_x \cdot OP_s$ (or $v_x \cdot OP_c$) and $v_y \cdot OP_s$ (or $v_y \cdot OP_c$), respectively. "·" represents inner product, and $OP_s$ ($OP_c$) denotes a vector with the origin of the imaging coordinate system as the initial point and the subject pixel $P_s$ (subject imaging point $P_c$) as the terminal point.

The unit vector $v_x$ is, for example, a vector that satisfies equations $v_x \cdot v = 0$ and $v_x \cdot Z_v = 0$ and that has a length of 1. The unit vector $v_y$ is a vector that satisfies equations $v_y \cdot v = 0$ and $v_y \cdot v_x = 0$ and that has a length of 1. The vector $Z_v$ denotes a unit vector in the direction of the z axis in the imaging coordinate system (=(0, 0, 1)).

If the optical axis of the camera 41 from the subject imaging point $P_c$ does not pass through the origin of the imaging coordinate system, the coordinates $(X_α, y_α)$ of the point $P_x$ must be offset, for example, by the coordinates of the intersection of the optical axis and the plane α in the two-dimensional coordinate system on the plane α.

That is, when the coordinates $(X_α, y_α)$ of the point $P_x$ on the plane α has been calculated as described above, the coordinates $(X_α, y_α)$ of the point $P_x$ is represented with respect to an origin at the intersection of the plane α and the optical axis of the camera 41 from the subject imaging point $P_c$. Thus, regarding light rays in the same direction and passing through the imaging point, for which the optical axis intersects the plane α at different points, two-dimensional coordinate systems with origins at different positions are defined on the same plane α.

Thus, in order to fix the origins of two-dimensional coordinate systems defined on the same plane α at, for example, the origin of the imaging coordinate system, when the optical axis of the camera 41 from the subject imaging point $P_c$ does not pass through the origin of the imaging coordinate system, in step S27, the image-data converter 31 offsets the coordinates of the point $P_x$ by the coordinates of the intersection of the optical axis and the plane α in the two-dimensional coordinate system on the plane α.

More specifically, the image-data converter 31 adds together coordinates $(x_α', y_α')$ and $(x_{α0}, y_{α0})$ to finally calculate $(x_α'+x_{α0}, y_α'+y_{α0})$ as the coordinates $(X_α, y_α)$ of the point $P_x$ on the plane α, where $(x_α', y_α')$ denotes the coordinates of the point $P_x$ calculated as described above and $(x_{α0}, y_{α0})$ denotes the coordinates of the intersection of the optical axis of the camera 41 from the subject imaging point $P_c$ and the plane α in the two-dimensional coordinate system on the plane α.

The process then proceeds to step S28, in which the image-data converter 31 sets the pixel value of the subject pixel $P_s$ among the pixels constituting the original image data on the virtual screen as the pixel value of a pixel at the position of the point $P_x$ on the plane α. That is, letting the pixel value of the pixel at the point $P_x$ on the plane α be denoted as I(θ, φ) $(X_α, y_α)$ using I(θ, φ) representing the plane α and $(X_α, y_α)$ representing the coordinates of the point $P_x$ on the plane α, in step S28, the image-data converter 31 sets the pixel value of the subject pixel $P_s$ in the pixel value I(θ, φ) $(X_α, y_α)$ of the pixel at the position of the point $P_x$ on the plane α. Thus, the subject pixel $P_s$ is orthogonally projected onto the plane I(θ, φ) that is perpendicular to the vector v, and the pixel value of the subject pixel $P_s$ is set as the pixel value I(θ, φ) $(X_α, y_α)$ of the pixel at the position of the point $P_x$ $(=(X_α, y_α))$ on the plane I(θ, φ) as determined by the orthogonal projection. The pixel value I(θ, φ) $(X_α, y_α)$ of the pixel $P_x$, determined by orthogonally projecting the subject pixel $P_s$ onto the plane I(θ, φ), is intermediate data.

Then, the process proceeds to step S29, in which the image-data converter 31 determines whether all the pixels (constituting the original image data) on the virtual screen set for the subject imaging point $P_c$ have been considered as subject pixels. If it is determined that a pixel that has not yet been considered as a subject pixel exists, the process returns to step S22, and then the same process is repeated.

On the other hand, if it is determined in step S29 that all the pixels on the virtual screen have been considered as subject pixels, the process proceeds to step S30, in which the image-data converter 31 determines whether imaging points of all the frames of the original image data stored in the image database 2 have been considered as subject imaging points.

If it is determined in step S30 that an imaging point that has not yet been considered as a subject imaging point exists among the imaging points of the frames of the original image data stored in the image database 2, the process returns to step S21, and then the same process is repeated.

On the other hand, if it is determined in step S30 that all the imaging points of the frames of the original image data stored in the image database 2 have been considered as subject imaging points, the process is exited.

By the image-data conversion process described above, ideally, on planes I(θ, φ) defined by latitudes θ and longitude φ having various values, image data of an object as viewed from infinite distances in the directions defined by the latitudes θ and the longitudes φ is generated, and the image data is supplied to and stored in the intermediate database 3 as intermediate data.

Figure 27:
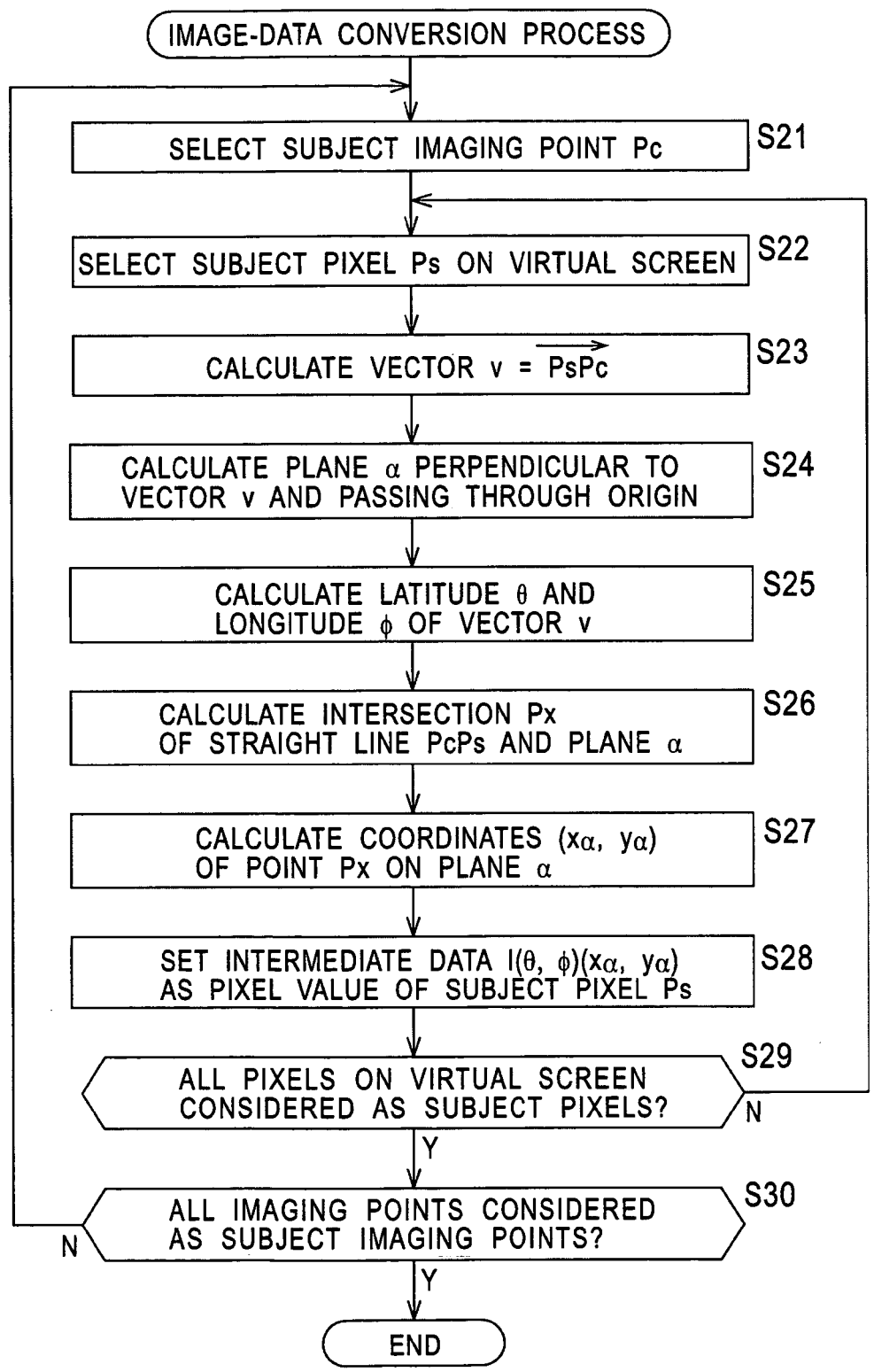
FIG. 27 is a flowchart showing an image-data conversion process for converting original image data into intermediate data.

FIGS. 29A and 29B schematically show a format of the intermediate data generated by the image-data conversion process shown in FIG. 27.

The intermediate data generated by the image-data conversion process shown in FIG. 27 is image data reflecting on the planes I(θ, φ) an object as viewed from infinite distances in the directions defined by the latitudes θ and the longitudes φ thereof, so that intermediate data exists for each value of latitude θ and longitude φ. Thus, the intermediate data can be represented by a table segmented by values of the latitude θ and the longitude φ (hereinafter referred to as a latitude-longitude table when appropriate), as shown in FIG. 29A.

In the embodiment shown in FIG. 29A, for each of the planes I(θ, φ) with the latitude θ varying in a range of −90 degrees to 90 degrees by steps of one degree and the longitude φ varying in a range of −180 degrees to 179 degrees by steps of one degree, image data of an object as viewed from an infinite distance in the direction defined by the latitude θ and the longitude φ is registered in the corresponding cell of the latitude-longitude table. The step sizes of the latitude θ and the longitude φ are not particularly limited. Furthermore, the step sizes of the latitude θ and the longitude φ may be either constant or variable. Furthermore, if the latitude θ and the longitude φ are allowed to take on only integer values, when the latitude θ and the longitude φ are calculated in the image-data conversion process shown in FIG. 27, fractional parts are rounded up, rounded down, or rounded off.

In each of the cells of the latitude-longitude table shown in FIG. 29A, image data of an object as viewed from an infinite distance in the direction defined by the latitude θ and the longitude φ corresponding to the cell, i.e., the pixel values of the pixels of the original image data orthogonally projected onto the plane I(θ, φ), are registered for the respective values of the x coordinate $x_\alpha$ and y coordinate $y_\alpha$ of the two-dimensional coordinate system defined on the plane I(θ, φ). That is, in each of the cells of the latitude-longitude table shown in FIG. 29A, a table segmented by the values of x coordinate $x_\alpha$ and y coordinate $y_\alpha$ of the two-dimensional coordinate system defined on the plane I(θ, φ) (hereinafter referred to as a pixel-value table when appropriate) is registered. In each of the cells of the pixel-value table, a pixel value $p(x_\alpha, y_\alpha)$ of a pixel of original image data, orthogonally projected to a point defined by an x coordinate $x_\alpha$ and a y coordinate $y_\alpha$ corresponding to the cell, is registered.

In FIG. 29B, $x_1$ and $y_1$ denote minimum x coordinate and y coordinate of a point to which a pixel of the original image data is orthogonally projected on the plane I(θ, φ), respectively. $x_2$ and $y_2$ denote maximum x coordinate and y coordinate of a point to which a pixel of the original image data is orthogonally projected on the plane I(θ, φ), respectively. Although the step sizes of x coordinate and y coordinate are one in FIG. 29B, similarly to the step sizes of the latitude θ and the longitude φ, the step sizes are not particularly limited.

Figure 30:
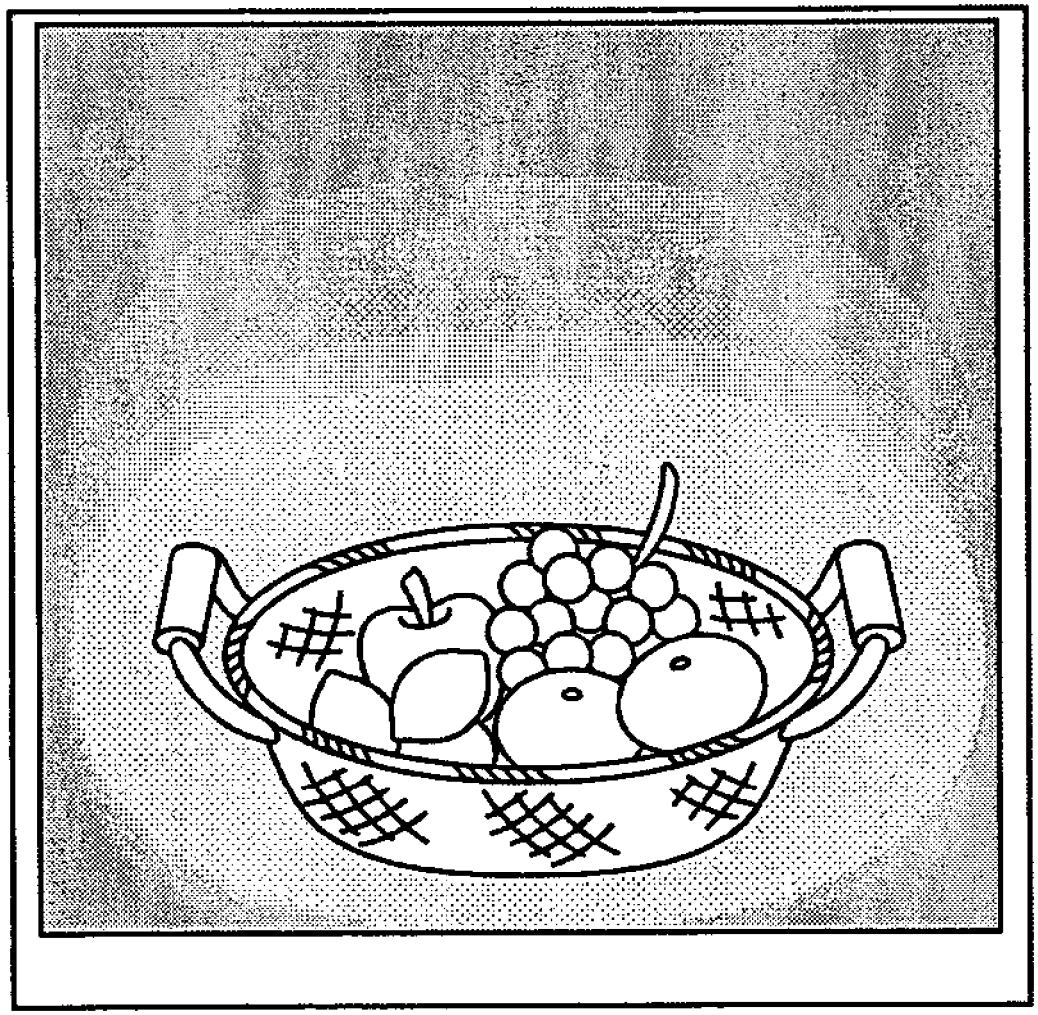
FIG. 30 is a diagram showing image data serving as intermediate data.

FIG. 30 is a schematic diagram of image data of an object as viewed from an infinite distance, registered in each of the cells of the latitude-longitude table shown in FIG. 29A. In the embodiment shown in FIG. 30, the object is a basket containing fruits.

Image data as viewed from an infinite distance, registered in each of the cells of the latitude-longitude table shown in FIG. 29A, has the same characteristics as image data captured by a camera disposed at an infinite distance. Thus, image processing that is the same as image processing (e.g., edge enhancement, noise removal) executed on image data captured by a camera, based on the characteristics thereof (e.g., correlation), can be applied.

Image data composed of pixel values in the pixel-value table (FIG. 29B) registered in each of the cells of the latitude-longitude table shown in FIG. 29A is composed of pixel values of pixels of the original image data orthogonally projected onto a plane I(θ, φ) defined by a latitude θ and a longitude φ corresponding to the cell, so that a pixel value is sometimes missing, depending on original image data stored in the image database 2.

More specifically, a range where pixels of original image data is orthogonally projected onto the plane I(θ, φ) (hereinafter referred to as an effective range when appropriate) is defined by x coordinates from $x_1$ to $x_2$ and y coordinates from $y_1$ to $y_2$. Pixel values in this range are registered in the pixel-value table. However, the pixels of the original image data are not necessarily projected orthogonally to all the points on the plane I(θ, φ) (e.g., all the points represented by integer values of x coordinate in the range of $x_1$ to $x_2$ and integer values of y coordinate in the range of $y_1$ to $y_2$), and pixels of original data orthogonally projected are sometimes missing for some points.

Thus, pixel values do not always exist for all the pixels in the effective range of the plane I(θ, φ). In that case, pixel values of some pixels of image data in the effective range, i.e., image data composed of pixel values in the pixel-value table (FIG. 29B) associated with the plane I(θ, φ), are missing, for example, as shown in FIG. 31A.

Figure 31B:
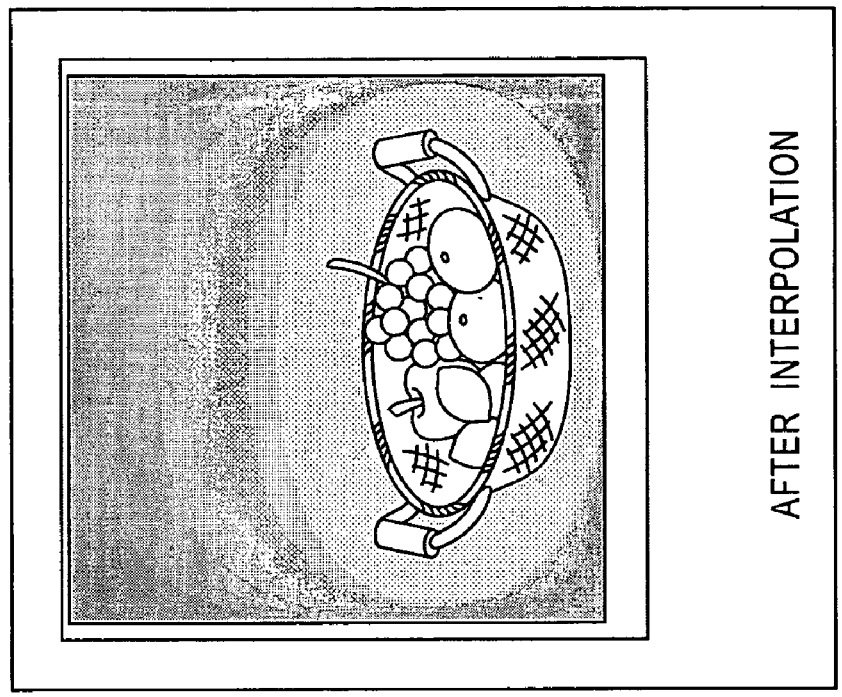
FIG. 31B is a diagram showing interpolation of image data that serves as intermediate data.
Figure 31A:
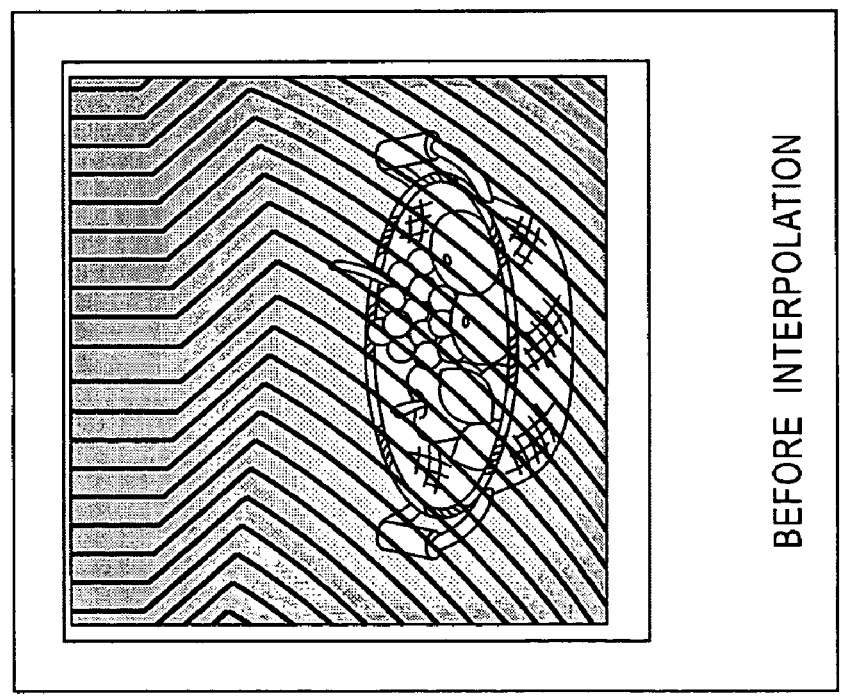
FIG. 31A is a diagram showing interpolation of image data that serves as intermediate data.

In the embodiment shown in FIG. 31A, pixel values are missing in a stripe pattern indicated in black.

If pixel values are missing in the effective range of the plane I(θ, φ), i.e., in the pixel-value table, a pixel-value interpolation process of interpolating the pixel values is executed. Through the pixel-value interpolation process, (an image composed of pixel values registered in) the pixel-value table in which some pixel values are missing as shown in FIG. 31A is converted into a pixel-value table in which no pixel values are missing as shown in FIG. 31B.

The pixel-value interpolation process for the pixel-value table can be executed, for example, as follows.

For example, when a pixel value $I(θ, φ)(x_\alpha, y_\alpha)$ at a point $(x_\alpha, y_\alpha)$ in the effective range of the plane I(θ, φ) is missing, if a pixel value $I(θ', φ')(x_\alpha, y_\alpha)$ at a point having the same coordinates as the point $(x_\alpha, y_\alpha)$ in the effective range of the plane I(θ', φ') with a slight deviation in latitude or longitude exists, the missing pixel value $I(θ, φ)(x_\alpha, y_\alpha)$ can be interpolated using pixel value $I(θ', φ')(x_\alpha, y_\alpha)$ on the plane I(θ', φ').

If the latitude takes on only integer values, θ' is, for example, θ±1 or θ±2.

The pixel-value interpolation process described above can be executed after completion of the image-data conversion process shown in FIG. 27, for example, by the image-data converter 31.

Now, the pixel-value interpolation process executed by the image-data converter 31 will be described with reference to a flowchart shown in FIG. 32. For simplicity of description, it is assumed that the latitude θ, the longitude φ, and the x coordinate $x_\alpha$ and the y coordinate $y_\alpha$ in the effective range of the plane I(θ, φ) take on only integer values.

In the pixel-value interpolation process, first, in step S41, the image-data converter 31 sets initial values in a variable θ representing the latitude and a variable φ representing the longitude, and also sets initial values in a variable $x_\alpha$ and a variable $y_\alpha$ representing x coordinate and y coordinate on the plane I(θ, φ). For example, −90 degrees in set in θ, −180 degrees is set in φ, $x_1$ is set in $x_\alpha$, and $y_1$ is set in $y_\alpha$ as initial values.

The process then proceeds to step S42, in which the image-data converter 31 determines whether a pixel value has been set in intermediate data $I(θ, φ)(x_\alpha, y_\alpha)$.

Whether a pixel value has been set in the intermediate data $I(θ, φ)(x_\alpha, y_\alpha)$ is determined by setting initial values that are impossible as pixel values in an array variable $I(θ, φ)(x_\alpha, y_\alpha)$ as intermediate data before executing the image-data conversion process shown in FIG. 27, and by determining whether the value is set in $I(θ, φ)(x_\alpha, y_\alpha)$.

If it is determined in step S42 that a pixel value has been set in the intermediate data $I(θ, φ)(x_\alpha, y_\alpha)$, that is, if a pixel value is not missing, steps S43 and S44 are skipped, and the process proceeds to step S45.

On the other hand, if it is determined in step S42 that a pixel value has not been set in the intermediate data $I(θ, φ)(x_\alpha, y_\alpha)$, that is, if a pixel value is missing, the process proceeds to step S43. In step S43, the image-data converter 31 searches for a point with a pixel value set among points $(x_\alpha, y_\alpha)$ on planes $I(\theta', \phi')$ defined by latitudes $\theta'$ in a range of $(\theta-\Delta\theta)<\theta'<(\theta+\Delta\theta)$ and longitudes $\phi'$ in a range of $(\phi-\Delta\phi)<\phi'<(\phi+\Delta\phi)$.

As $\Delta\theta$ and $\Delta\phi$, for example, small integer values are used.

The process then proceeds to step S44. In step S44, the image-data converter 31 sets the value (pixel value) of the intermediate data $I(\theta', \phi')$ $(x_\alpha, y_\alpha)$ with the pixel value set, found in step S43, in the intermediate data $I(\theta, \phi)$ $(x_\alpha, y_\alpha)$ of the missing pixel value. The process then proceeds to step S45.

If a plurality of points with pixel values set are found among points $(x\alpha, y\alpha)$ on the planes $I(\theta', \phi')$ defined by latitudes $\theta'$ in a range of $(\theta-\Delta\theta)<\theta'<(\theta+\Delta\theta)$ and longitudes $\phi'$ in a range of $(\phi-\Delta\phi)<\phi'<(\phi+\Delta\phi)$, in step S44, the image-data converter 31 selects therefrom, for example, a point for which the sum of squares of the absolute value of the difference in the latitude $|\theta-\theta'|$ and the absolute value of the difference in the longitude $|\phi-\phi'|$ is smallest, setting the value of $I(\theta', \phi')$ $(x_\alpha, y_\alpha)$ selected in $I(\theta, \phi)$ $(x_\alpha, y_\alpha)$. That is, the image-data converter 31 sets data on a plane $I(\theta', \phi')$ approximate to the plane $I(\theta, \phi)$ as the value of the missing pixel.

On the other hand, if a point with a pixel value set is not found in step S43 among points $(x_\alpha, y_\alpha)$ on the planes $I(\theta', \phi')$ defined by latitudes $\theta'$ in a range of $(\theta-\Delta\theta)<\theta'<(\theta+\Delta\theta)$ and longitudes $\phi'$ in a range of $(\phi-\Delta\phi)<\phi'<(\phi+\Delta\phi)$, in step S44, the image-data converter 31 searches for a point closest to the point $(x_\alpha, y_\alpha)$ among points with pixel values set on $I(\theta, \phi)$, setting the pixel value having been set for the point in the point $(x_\alpha, y_\alpha)$.

In the pixel-value interpolation process, pixel values are interpolated for points $(x_\alpha, y_\alpha)$ with pixel values not set on the plane $I(\theta, \phi)$. Thus, as the process progresses, it is possible that pixel values at points for which pixel values have been interpolated causes further interpolation of pixel values at other points. In order to prevent this, for example, interpolation flags indicating that interpolation has been performed are set to points for which pixel values have been interpolated, inhibiting interpolation by using pixel values at points with interpolation flags set (exempting the pixel values from the searching in step S43).

In step S45, the image-data converter 31 determines whether the variable $y_\alpha$ representing the y coordinate on the plane $I(\theta, \phi)$ is equal to the maximum value $y_2$ thereof. If it is determined in step S45 that the y coordinate $y_\alpha$ is not equal to the maximum value $y_2$, the process proceeds to step S46, in which the image-data converter 31 increments the y coordinate $y_\alpha$ by one. The process then returns to step S42, and then the same process is repeated.

On the other hand, if it is determined in step S45 that the y coordinate $y_\alpha$ equals the maximum value $y_2$, the process proceeds to step S47, in which the image-data converter 31 resets the y coordinate $y_\alpha$ to the minimum value $y_1$ thereof. The process then proceeds to step S48.

In step S48, the image-data converter 31 determines whether the variable $x_\alpha$ representing the x coordinate on the plane $I(\theta, \phi)$ is equal to the maximum value $x_2$ thereof. If it is determined in step S48 that the x coordinate $x_\alpha$ is not equal to the maximum value $x_2$, the process proceeds to step S49, in which the image-data converter 31 increments the x coordinate $x_\alpha$ by one. The process then returns to step S42, and then the same process is repeated.

On the other hand, if it is determined in step S48 that the x coordinate $x_\alpha$ is equal to the maximum value $x_2$, the process proceeds to step S50, in which the image-data converter 31 resets the x coordinate $x_\alpha$ to the minimum value $x_1$ thereof. The process then proceeds to step S51.

In step S51, the image-data converter 31 determines whether the variable $\phi$ representing longitude is equal to 179 degrees, i.e., the maximum value thereof. If it is determined in step S51 that the longitude $\phi$ is not equal to the maximum value, i.e., 179 degrees, the process proceeds to step S52, in which the image-data converter 31 increments the longitude $\phi$ by one. The process then returns to step S42, and then the same process is repeated.

On the other hand, if it is determined in step S51 that the longitude $\phi$ is equal to the maximum value, i.e., 179 degrees, the process proceeds to step S53, in which the image-data converter 31 resets the longitude $\phi$ to the minimum value, i.e., −180 degrees. The process then proceeds to step S54.

In step S54, the image-data converter 31 determines whether the variable $\theta$ representing latitude is equal to 90 degrees, i.e., the maximum value thereof. If it is determined in step S54 that the latitude $\theta$ is not equal to the maximum value, i.e., 90 degrees, the process proceeds to step S55, in which the image-data converter 31 increments the latitude $\theta$ by one. The process then returns to step S42, and then the same process is repeated.

On the other hand, if it is determined in step S54 that the latitude $\theta$ is equal to the maximum value, i.e., 90 degrees, the process is exited.

Although the pixel-value interpolation process is executed by the image-data converter 31 herein, alternatively, for example, the pixel-value interpolation process may be executed by the intermediate-data converter 32 (FIG. 5) after completion of the image-data conversion process shown in FIG. 27.

Figure 32:
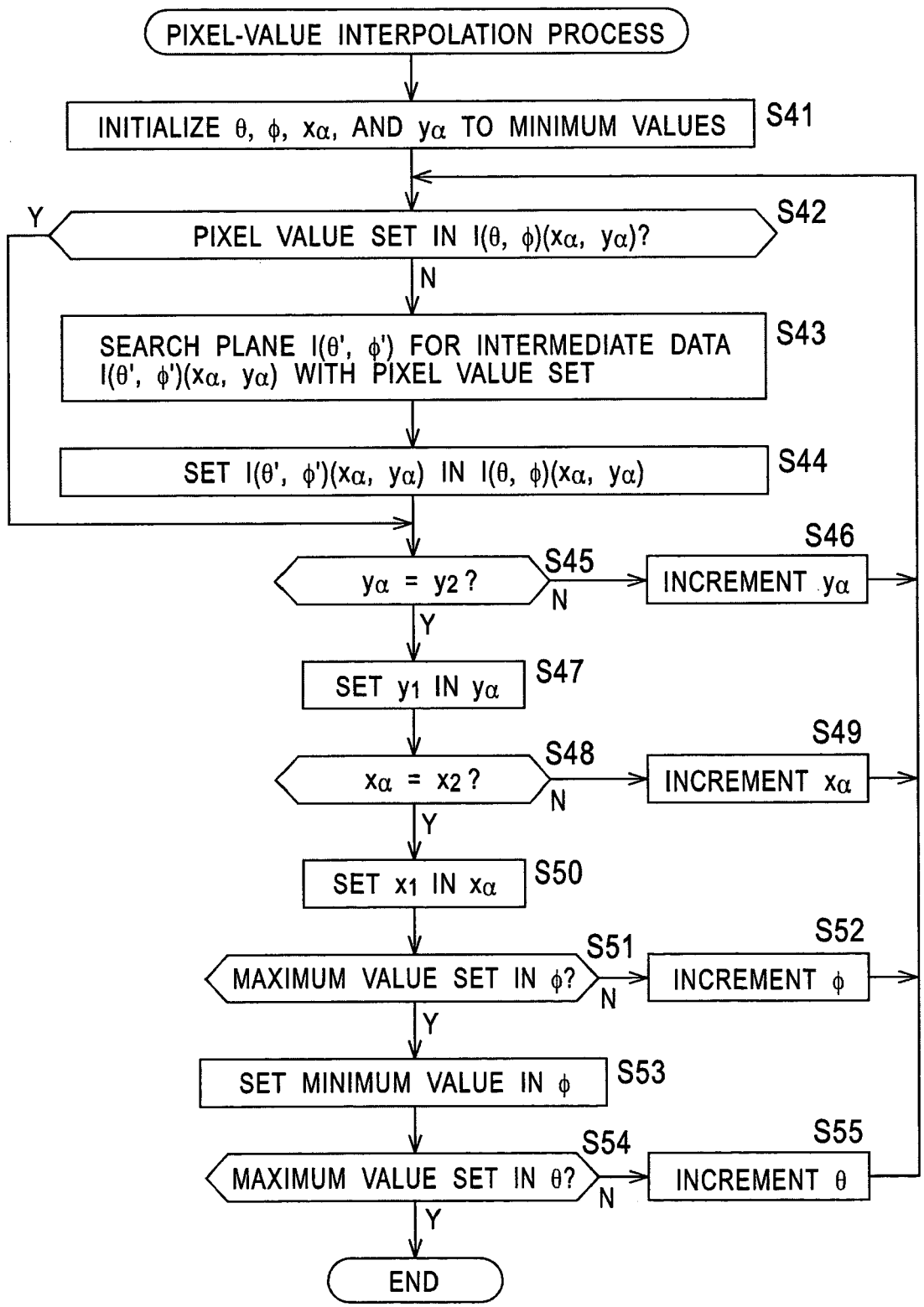
FIG. 32 is a flowchart showing a pixel-value interpolation process for interpolating image data that serves as intermediate data.

In the pixel-value interpolation process shown in FIG. 32, the pixel value of a point with a pixel value not set is interpolated using the pixel value set for another point as it is. Thus, assuming that true values of image data formed on the plane $I(\theta, \phi)$ exist, basically, image data obtained by the pixel-value interpolation process does not coincide with the true values.

However, it is desired that image data as close to the true values as possible, if not exactly the same, be obtained.

As a method for converting image data obtained by the pixel-value interpolation process shown in FIG. 32 into image data that is as close as possible to real values, for example, the applicant has proposed earlier a classification-adaptation process.

The classification-adaptation process includes a classification process and an adaptation process. The classification process classifies data based on the characteristics of the data, and the adaptation process is executed on a class-by-class basis.

The adaptation process will be described in the context of an example where an image of a low quality (hereinafter referred to as low-quality image when appropriate) is converted into an image of a high quality (hereinafter referred to as high-quality image when appropriate).

Image data obtained by the pixel-value interpolation process shown in FIG. 32 can be considered as low-quality image of a lower quality compared with true values, and true values can be considered as high-quality image of a higher quality compared with image data obtained by the pixel-value interpolation process shown in FIG. 32.

In the adaptation process, by a linear combination of pixels constituting a low-quality image (hereinafter referred to as low-quality pixels when appropriate) and predetermined tap coefficients, predictive values of pixels of a high-quality image obtained by improving the picture quality of the low-quality image are calculated, whereby an image in which the picture quality of the low-quality image has been improved is obtained.

More specifically, for example, a case will be considered where, with a high-quality image as teacher data and a low-quality image obtained by degrading the picture quality of the high-quality image as student data, predictive values E[y] of pixel values y of pixels constituting the high-quality image (hereinafter referred to as high-quality pixels when appropriate) are calculated by a linear first-order combination model defined by a linear combination of a group of pixel values $x_1$, $x_2$, ... of several low-quality pixels and predetermined tap coefficients $w_1$, $w_2$, .... In this case, the predictive values E[y] can be expressed by the following equation:

$$E[y]=w_1 x_1 + w_2 x_2 + \ldots \quad (19)$$

In order to generalize equation (19), a matrix W composed of a set of tap coefficients $w_j$, a matrix X composed of a set of student data $x_{ij}$, and a matrix Y' composed of a set of predictive values $E[y_j]$ will be defined as in the following equations:

$$X = \begin{pmatrix} x_{11} & x_{12} & \cdots & x_{1J} \\ x_{21} & x_{22} & \cdots & x_{2J} \\ \cdots & \cdots & \cdots & \cdots \\ x_{I1} & x_{I2} & \cdots & x_{IJ} \end{pmatrix} \quad (20)$$

$$W = \begin{pmatrix} w_1 \\ w_2 \\ \cdots \\ w_J \end{pmatrix}, \quad Y' = \begin{pmatrix} E[y_1] \\ E[y_2] \\ \cdots \\ E[y_I] \end{pmatrix}$$

In this case, the following observation equation holds:

$$XW=Y' \quad (21)$$

The component $x_{ij}$ of the matrix X is the j-th student data among the i-th set of student data (the set of student data used for prediction of the i-th teacher data). The component $w_j$ of the matrix W is a tap coefficient multiplied by the j-th student data among the set of student data. $y_i$ is the i-th teacher data, and thus $E[y_i]$ represents a predictive value of the i-th teacher data. Y in the left-hand side of equation (19) refers to the component $y_i$ of the matrix Y with the suffix i omitted, and $x_1$, $x_2$, ... in the right-hand side of equation (19) refer to the components $x_{ij}$ of the matrix X with the suffix i omitted.

A case will be considered where the least-square method is applied to the observation equation in equation (21) to calculate predictive values E[y] approximate to the pixel values y of high-quality pixels. First, a matrix Y composed of a set of true pixel values y of high-quality pixels constituting teacher data, and a matrix E composed of a set of errors e of the predictive values E[y] relative to the pixel values y of the high-quality pixels, will be defined as in the following equations:

$$E = \begin{pmatrix} e_1 \\ e_2 \\ \cdots \\ e_I \end{pmatrix}, \quad Y = \begin{pmatrix} y_1 \\ y_2 \\ \cdots \\ y_I \end{pmatrix} \quad (22)$$

In this case, from equation (21), the following residual equation holds:

$$XW = Y + E \quad (23)$$

In the least-square method, for example, square errors expressed by the following equation are used as a criterion for evaluating tap coefficients $w_j$ for calculating predictive values E[y] approximate to the pixel values y of the high-quality pixels:

$$\sum_{i=1}^{I} e_i^2 \quad (24)$$

The tap coefficients $w_j$ for calculating the predictive values E[y] approximate to the pixel values y of the high-quality pixels can be obtained by minimizing the square errors in equations (24).

Thus, tap coefficients with respect to which the square errors in equation (24) are differentiated to become zero, i.e., tap coefficients $w_j$ that satisfy the following equation, are optimal values for calculating the predictive values E[y] approximate to the pixel values y of the high-quality pixels:

$$e_1 \frac{\partial e_1}{\partial w_j} + e_2 \frac{\partial e_2}{\partial w_j} + \cdots + e_I \frac{\partial e_I}{\partial w_j} = 0 \quad (j=1, 2, \cdots, J) \quad (25)$$

Thus, first, differentiating equation (23) with respect to the tap coefficients $w_j$ yields the following equation:

$$\frac{\partial e_i}{\partial w_1} = x_{i1}, \quad \frac{\partial e_i}{\partial w_2} = x_{i2}, \cdots, \frac{\partial e_i}{\partial w_J} = x_{iJ}, (i=1, 2, \cdots, I) \quad (26)$$

From equations (25) and (26), equation (27) is derived:

$$\sum_{i=1}^{I} e_i x_{i1} = 0, \sum_{i=1}^{I} e_i x_{i2} = 0, \cdots \sum_{i=1}^{I} e_i x_{iJ} = 0 \quad (27)$$

Furthermore, considering the relationship among the student data $x_{ij}$, the tap coefficients $w_j$, the teacher data $y_i$, and the residuals (errors) $e_i$ in the residual equation in equation (23), from equation (27), the following normal equations are derived:

$$\begin{cases} \left(\sum_{i=1}^{I} x_{i1} x_{i1}\right) w_1 + \left(\sum_{i=1}^{I} x_{i1} x_{i2}\right) w_2 + \cdots + \left(\sum_{i=1}^{I} x_{i1} x_{iJ}\right) w_J = \left(\sum_{i=1}^{I} x_{i1} y_i\right) \\ \left(\sum_{i=1}^{I} x_{i2} x_{i1}\right) w_1 + \left(\sum_{i=1}^{I} x_{i2} x_{i2}\right) w_2 + \cdots + \left(\sum_{i=1}^{I} x_{i2} x_{iJ}\right) w_J = \left(\sum_{i=1}^{I} x_{i2} y_i\right) \\ \cdots \\ \left(\sum_{i=1}^{I} x_{iJ} x_{i1}\right) w_1 + \left(\sum_{i=1}^{I} x_{iJ} x_{i2}\right) w_2 + \cdots + \left(\sum_{i=1}^{I} x_{iJ} x_{iJ}\right) w_J = \left(\sum_{i=1}^{I} x_{iJ} y_i\right) \end{cases} \quad (28)$$

Now, the vector W is defined as expressed in equation (20), and a matrix (covariance matrix) A and a vector v are defined by the following equations:

$$A = \begin{pmatrix} \sum_{i=1}^{I} x_{i1} x_{i1} & \sum_{i=1}^{I} x_{i1} x_{i2} & \cdots & \sum_{i=1}^{I} x_{i1} x_{iJ} \\ \sum_{i=1}^{I} x_{i2} x_{i1} & \sum_{i=1}^{I} x_{i2} x_{i2} & \cdots & \sum_{i=1}^{I} x_{i2} x_{iJ} \\ \cdots & \cdots & \cdots & \cdots \\ \sum_{i=1}^{I} x_{iJ} x_{i1} & \sum_{i=1}^{I} x_{iJ} x_{i2} & \cdots & \sum_{i=1}^{I} x_{iJ} x_{iJ} \end{pmatrix} \quad (29)$$

-continued $$v = \begin{pmatrix} \sum_{i=1}^{I} x_{i1} y_i \\ \sum_{i=1}^{I} x_{i2} y_i \\ \vdots \\ \sum_{i=1}^{I} x_{iJ} y_i \end{pmatrix}$$

In this case, the normal equations expressed in equations (28) can be expressed by the following equation:

$$AW=v \qquad (30)$$

The same number of normal equations in equations (28), equivalent to equation (30), as the number J of the tap coefficients $w_j$ to be calculated can be derived by providing a certain number of sets of student data $x_{ij}$ and teacher data $y_i$. Thus, optimal tap coefficient $w_j$ can be calculated by solving equation (30) for the vector W (note, however, that solving equation (30) requires that the matrix A in equation (30) be regular). Equation (30) can be solved, for example, by the sweep-out method (Gauss-Jordan elimination).

As described above, in the adaptation process, learning is performed using student data and teacher data to calculate optimal tap coefficients $w_j$, and predictive values E[y] approximate to teacher data y is calculated according to equation (19) using the tap coefficients $w_j$.

The adaptation process differs from simple interpolation in that components included in a high-quality image are reproduced. More specifically, equation (19) by itself appears as, for example, simple interpolation using a so-called interpolation filter. However, since tap coefficients w corresponding to the tap coefficients of the interpolation filter are obtained by learning using teacher data y, components included in a high-quality image can be reproduced. Thus, the adaptation process can be considered to have the effect of creating an image.

Figure 33:
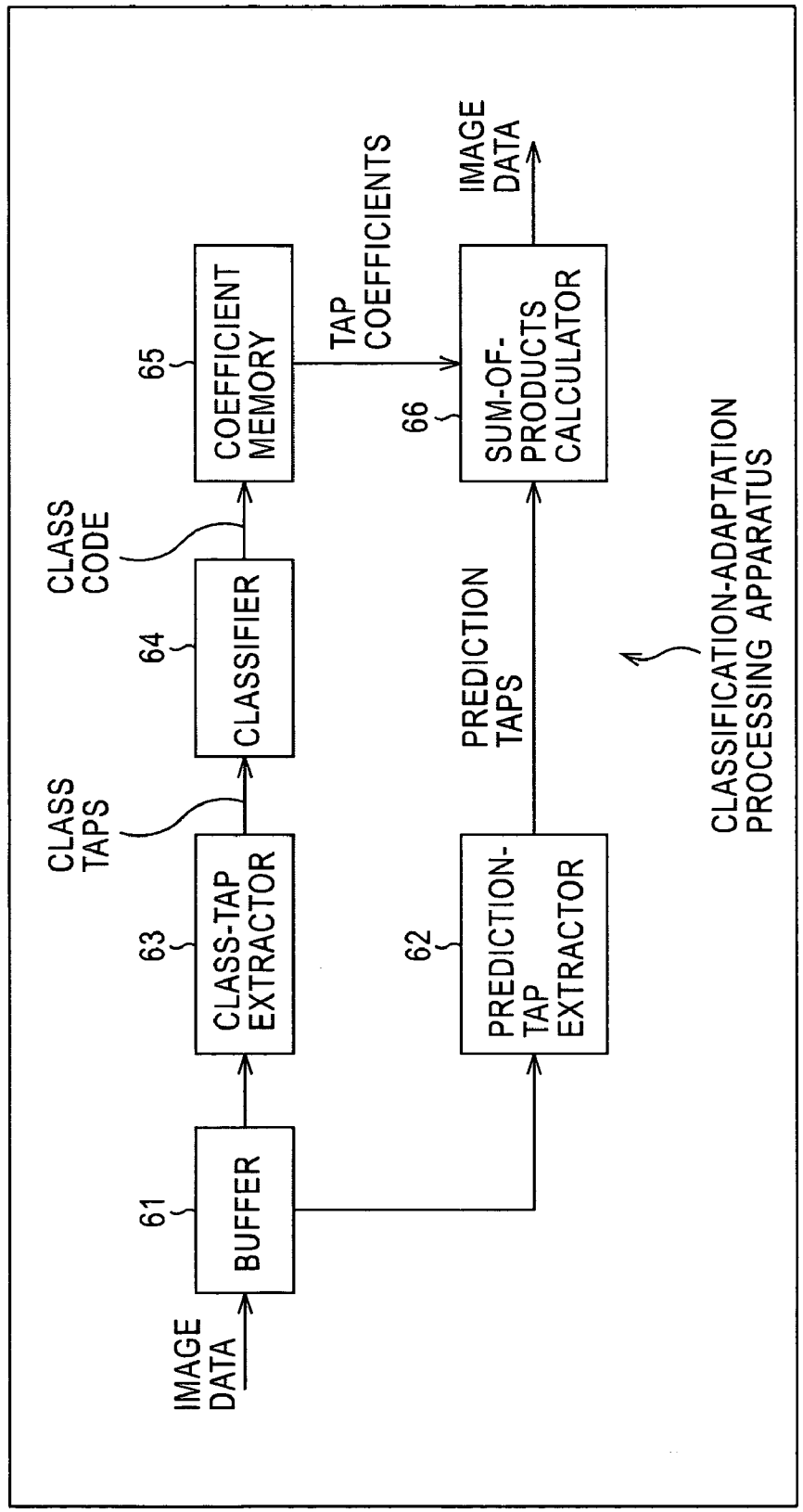
FIG. 33 is a block diagram showing an example configuration of a classification-adaptation processing apparatus for executing a classification-adaptation process.

FIG. 33 shows an example configuration of a classification-adaptation processing apparatus for executing the classification-adaptation process described above.

The classification-adaptation processing apparatus is included, for example, in the image-data converter 31 or the intermediate-data converter 32 shown in FIG. 5, allowing execution of the classification-adaptation process on intermediate data for which the pixel-value interpolation process shown in FIG. 32 has been executed. Alternatively, the classification-adaptation processing apparatus may be provided separately from the image-data converter 31 and the intermediate-data converter 32 shown in FIG. 5, allowing execution of the classification-adaptation process on intermediate data stored in the intermediate database 3, for which the pixel-value interpolation process shown in FIG. 32 has been executed.

Intermediate data for which the pixel-value interpolation process has been executed, which is low-quality image data, is supplied to a buffer 61, and the buffer 61 temporarily stores the low-quality image data supplied thereto.

A prediction-tap extractor 62 considers pixels of high-quality image data (high-quality pixels) composed of true values of intermediate data to be calculated by a sum-of-products calculator 66 which will be described later, sequentially as subject pixels. The prediction-tap extractor 62 extracts pixels of low-quality image data (low-quality pixels) used for prediction of the subject pixels, and uses the pixels as prediction taps.

That is, the prediction-tap extractor 62 reads, for example, several low-quality pixels in the vicinity of a position corresponding to the subject pixel from the buffer 61, as prediction taps.

After obtaining the prediction taps for the subject pixel, the prediction-tap extractor 62 supplies the prediction taps for the subject pixel to the sum-of-products calculator 66.

The prediction-tap extractor 62 extracts several low-quality pixels in the vicinity of the position of the subject pixel, for example, in the plane $I(\theta, \phi)$ of the intermediate data, i.e., low-quality image data, corresponding to the plane of the subject pixel, as prediction taps. Alternatively, the prediction-tap extractor 62 may extract, as prediction taps, several low-quality pixels in the vicinity of the position of the subject pixel in the plane $I(\theta', \phi')$ with a slight deviation in latitude $\theta$ or longitude $\phi$ with respect to the plane $I(\theta, \phi)$.

A class-tap extractor 63 extracts low-quality pixels for classifying the subject pixel into one of several classes from the buffer 61, and uses the low-quality pixels as class taps.

For simplicity of description, for example, it is assumed herein that the prediction taps obtained by the prediction-tap extractor 62 and the class taps obtained by the class-tap extractor 63 have the same tap structure. However, the prediction taps and the class taps may have independent (separate) tap structures.

The class taps for the subject pixel, obtained by the class-tap extractor 63, are supplied to a classifier 64. The classifier 64 classifies the subject pixel based on the class taps supplied from the class-tap extractor 63, and outputs a class code corresponding to the class determined.

The classification may be executed by, for example, ADRC (adaptive dynamic range coding).

In a method based on ADRC, the pixel values of pixels constituting class taps are ADRC-processed, and a class of the subject pixel is determined according to a resulting ADRC code.

In K-bit ADRC, for example, a maximum value MAX and a minimum value MIN of pixel values constituting class taps are detected, DR=MAX−MIN is used as a local dynamic range of a set, and pixels constituting class taps are requantized into K bits. That is, the minimum value MIN is subtracted from each of the pixel values of the pixels constituting class taps, and the resulting values are divided by $DR/2^K$ (quantized). A bit sequence in which the K bits of pixel values of the pixels constituting class taps, obtained as described above, are arranged in a predetermined order is output as an ADRC code. Thus, for example, if class taps are processed by one-bit ADRC, the minimum value MIN is subtracted from the pixel values of the pixels constituting the class taps, and the resulting values are divided by the average of the maximum value MAX and the minimum value MINI, whereby the pixel value of each of the pixels is represented by one bit (binarized). Then, a bit sequent in which the one-bit pixel values are arranged in a predetermined order is output as an ADRC code.

Alternatively, for example, the classifier 64 may output a pattern of distribution of levels of pixels (pixel-value distribution) constituting class taps as it is as a class code. In that case, if the class taps are composed of N pixels and if K bits are assigned to each of the pixels, the number of possible class codes output by the classifier 64 is $(2^N)^K$, which becomes huge exponentially as the number of bits K for pixel increases.

Thus, the classifier 64 preferably performs classification after compressing the amount of information of class taps by the ADRC process described above, vector quantization, or the like.

The class code output from the classifier 64 is supplied to a coefficient memory 65 as an address.

The coefficient memory 65 stores tap coefficients obtained by a learning process executed by a learning apparatus described later, and it outputs to the sum-of-products calculator 66 tap coefficients stored at an address associated with the class code output from the classifier 64.

The sum-of-products calculator 66 receives the prediction taps output from the prediction-tap extractor 62 and the tap coefficients output from the coefficient memory 65, performs the linear predictive calculation (sum-of-products calculation) expressed in equation (19) using the prediction taps and the tap coefficients, and outputs the result as the pixel value of the high-quality pixel being considered as the subject pixel.

Figure 34:
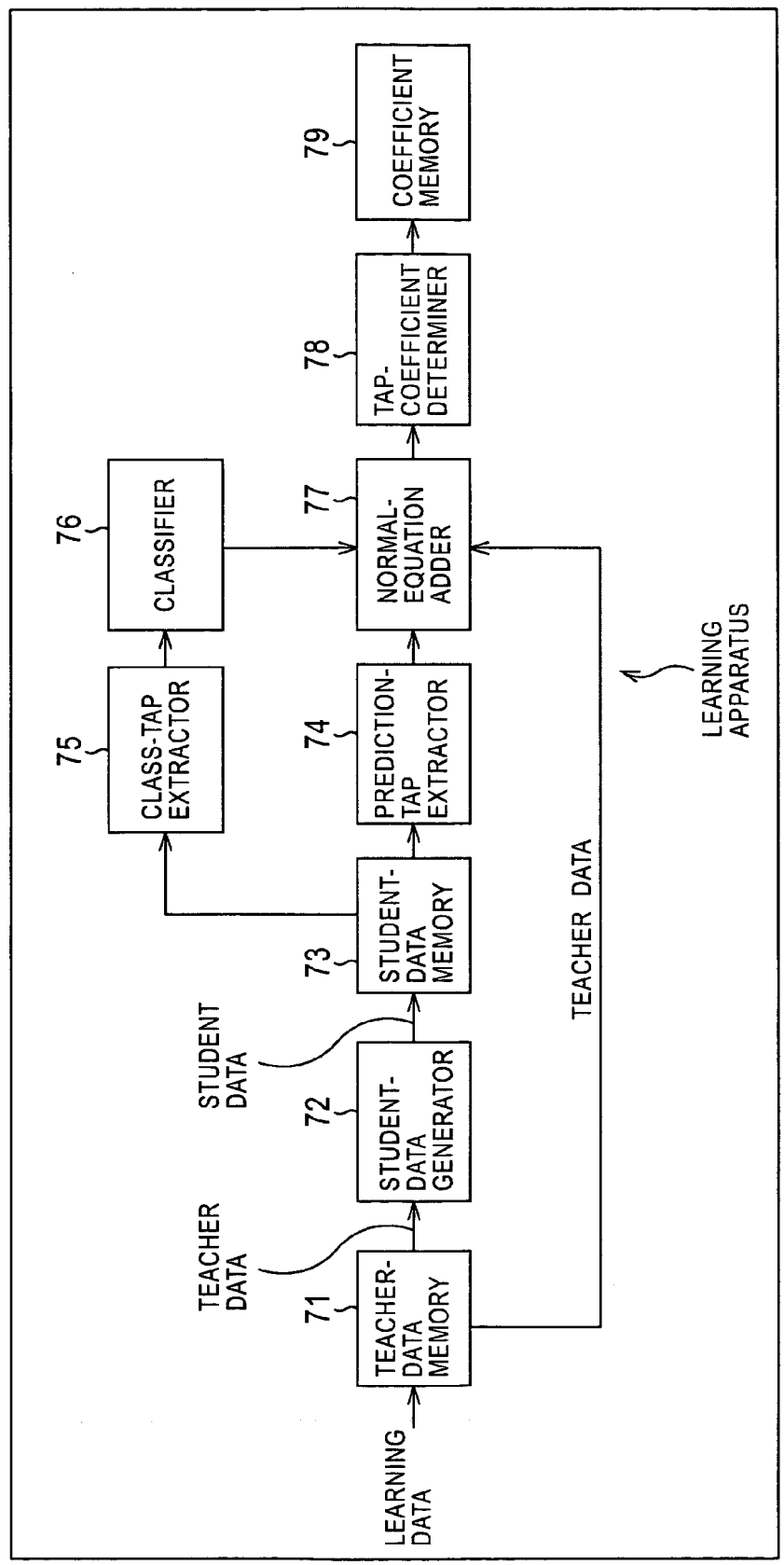
FIG. 34 is a block diagram of a learning apparatus for learning tap coefficients used in the classification-adaptation process.

FIG. 34 shows an example configuration, according to an embodiment, of a learning apparatus for learning tap coefficients to be stored in the coefficient memory 65 shown in FIG. 33.

A teacher-data memory 71 receives learning data that is used for learning. As the learning data, high-quality image data composed of true values of intermediate data is used herein. For example, the image-data conversion process shown in FIG. 27 is executed on image data captured from a plurality of viewpoints, generating intermediate data with no pixel values missing, which is used as learning data.

The teacher-data memory 71 stores the high-quality image data that serves as learning data, as teacher data that serves as a teacher in learning. A student-data generator 72 generates student data that serves as a student in learning, from the teacher data stored in the teacher-data memory 71.

More specifically, the student-data generator 72 omits pixel values of image data serving as teacher data stored in the teacher-data memory 71, and executes the pixel-value interpolation process shown in FIG. 32 on the image data with some pixel values omitted. Then, the student-data generator 72 supplies the low-quality image data obtained by the pixel-value interpolation process to a student-data memory 73 as student data, where the student data is stored.

When student data has been obtained from teacher data stored in the teacher-data memory 71 and the student data has been stored in the student-data memory 73, a prediction-tap extractor 74 considers the teacher data stored in the teacher-data memory 71 sequentially as subject pixels, and extracts student data used for prediction of the subject pixel from the student-data memory 73, thereby forming prediction taps having the same tap structure as the prediction taps formed by the prediction-tap extractor 62.

The prediction taps obtained by the prediction-tap extractor 74 in the manner described above are supplied to a normal-equation adder 77.

A class-tap extractor 75 extracts student data used for classification of the subject pixel from the student-data memory 73, forming class taps having the same structure as in the case of the class-tap extractor 63 shown in FIG. 33, and supplies the class taps to a classifier 76.

The classifier 76, upon receiving the class taps for the subject pixel from the class-tap extractor 75, performs the same classification using the class taps as the classifier 64 shown in FIG. 33, and supplies a class code representing a class of the subject pixel to the normal-equation adder 77.

The normal-equation adder 77 reads teacher data of the subject pixel from the teacher-data memory 71, and performs summation of student data constituting the class taps from the prediction-tap extractor 74 and the teacher data of the subject pixel, for each class supplied from the classifier 76.

That is, the normal-equation adder 77, for each class corresponding to a class code supplied from the classifier 76, using the prediction taps (student data), performs multiplication of student data ($x_{in}x_{im}$) serving as components of the matrix A in equation (29) and summation ($\Sigma$).

Furthermore, the normal-equation adder 77, for each class corresponding to a class code supplied from the classifier 76, performs multiplication of student data and teacher data ($x_{in}y_i$) serving as components of the vector v in equation (29) and summation ($\Sigma$).

The normal-equation adder 77 performs the summation considering all the teacher data stored in the teacher-data memory 71 as subject pixels, thereby forming normal equations shown in FIG. (30) for each class.

Then, a tap-coefficient determiner solves the normal equations generated for each class by the normal-equation adder 77, thereby obtaining tap coefficients for each class, and supplies the tap coefficients to an address, associated with the class, of a coefficient memory 79. Thus, the coefficient memory 79 stores tap coefficients for each class, supplied from the tap-coefficient determiner 78.

The format of the intermediate data shown in FIGS. 29A and 29B is such that for each direction of a light ray incident on pixels constituting original image data (each direction defined by a latitude $\theta$ and a longitude $\phi$), a pixel value corresponding to a light ray in a direction perpendicular to a plane is represented. Alternatively, intermediate data may have, for example, a format shown in FIGS. 35A and 35B.

That is, in the format shown in FIGS. 29A and 29B, intermediate data is represented by the latitude-longitude table (FIG. 29A) segmented by values of latitude $\theta$ and longitude $\phi$. Furthermore, in each of the cells of the latitude-longitude table, a pixel-value table is registered, in which pixel values of pixels of original image data orthogonally projected onto the plane I($\theta$, $\phi$) defined by a latitude $\theta$ and a longitude $\phi$ corresponding to the cell are arranged correspondingly to x coordinates $x_\alpha$ and y coordinates $y_\alpha$ of the two-dimensional coordinate system defined on the plane I($\theta$, $\phi$)

On the other hand, in the format of intermediate data shown in FIGS. 35A and 35B, for respective points on the plane perpendicular to the direction of light rays incident on pixels constituting the original image data, pixel values corresponding to the light rays are represented for each direction perpendicular to the plane.

More specifically, in the format shown in FIGS. 35A and 35B, intermediate data is represented by a table segmented by values of x coordinates $x_\alpha$ and y coordinates $y_\alpha$ defined on the plane I($\theta$, $\phi$) to which pixel values of pixels of original image data are orthogonally projected (hereinafter referred to as a coordinate table when appropriate), as shown in FIG. 35A. Furthermore, in each of the cells of the coordinate table, a table in which pixel values of the original image data orthogonally projected to points defined by an x coordinate $x_\alpha$ and a y coordinate $y_\alpha$ corresponding to the cell are arranged for each value of latitude $\theta$ and longitude $\phi$ defining the plane I($\theta$, $\phi$) to which the pixel values are orthogonally projected (this table will hereinafter be referred to as a pixel-value table) is registered.

In the format shown in FIGS. 35A and 35B, in each of the cells of the coordinate table, pixel values of the original image data orthogonally projected to points having the same coordinates on planes having respective values of latitude $\theta$ and longitude $\phi$ are arranged. Thus, the format is advantageous to the format shown in FIGS. 29A and 29B when the pixel-value interpolation process shown in FIG. 32 is executed.

More specifically, in the pixel-value interpolation process shown in FIG. 32, if a pixel value I($\theta$, $\phi$) ($x_\alpha$, $y_\alpha$) at a point ($x_\alpha$, $y_\alpha$) on the plane I($\theta$, $\phi$) is missing, the missing pixel value I ($\theta$, $\phi$) ($x_\alpha$, $y_\alpha$) is interpolated using a pixel value I($\theta'$, $\phi'$) ($x_\alpha$, $y_\alpha$) at a point that is on the plane I($\theta'$, $\phi'$) with a slight deviation in latitude or longitude and that has the same coordinates as the point ($x_\alpha$, $y_\alpha$).

Thus, in the intermediate data of the format shown in FIGS. 29A and 29B, in order to execute the pixel-value interpolation process, the pixel value I($\theta'$, $\phi'$) ($x_\alpha$, $y_\alpha$) must be read from a cell corresponding to the plane I($\theta'$, $\phi'$) that is different from a cell corresponding to the plane I($\theta$, $\phi$) with missing pixel values in the latitude-longitude table (FIG. 29A).

On the other hand, in the case of the intermediate data of the format shown in FIGS. 35A and 35B, pixel values at points of the same coordinates ($x_\alpha$, $y_\alpha$) on planes I($\theta$, $\phi$) with respective values of latitude $\theta$ and longitude $\phi$ are registered in a single cell. Thus, the pixel value I($\theta'$, $\phi'$) ($x_\alpha$, $y_\alpha$) can be read from the same cell corresponding to the point ($x_\alpha$, $y_\alpha$) on the plane I($\theta$, $\phi$) with missing pixel values. That is, in this case, in the coordinate table (FIG. 35A), a cell that is separate from the cell corresponding to the point ($x_\alpha$, $y_\alpha$) on the plane I($\theta$, $\phi$) with missing pixel values need not be accessed.

Next, an intermediate-data conversion process executed in step S3 shown in FIG. 6 by the intermediate-data converter 32 shown in FIG. 5, i.e., a process of converting intermediate data into image data as viewed from a user's viewpoint (presentation image data), will be described with reference to a flowchart shown in FIG. 36 and FIG. 37.

First, in step S61, the intermediate-data converter 32 sets a virtual screen for the user's viewpoint $P_c$ set in step S2 shown in FIG. 6, the virtual screen being a rectangular plane perpendicular to the user's line of sight and distant by a predetermined distance L from the user's viewpoint $P_c$ in the viewing direction.

In this embodiment, for simplicity of description, in the image-data conversion process described with reference to FIG. 27, processing is executed based on the imaging coordinate system having an origin at a point on an object (e.g., the center of gravity).

Furthermore, in the intermediate-data conversion process, a three-dimensional coordinate system for displaying an image on the display 6 (FIG. 2) in accordance with a user's viewpoint is assumed. Now, let the three-dimensional coordinate system be referred to as a display coordinate system, and an origin thereof is taken, for example, at a center point of the display screen of the display 6 (the intersection of diagonal lines of the display screen). The user's line of sight is directed from the viewpoint $P_c$ to, for example, the origin of the display coordinate system.

The process then proceeds to step S62, in which the intermediate-data converter 32 selects a subject pixel Ps that has not yet been selected as a subject pixel from among pixels on the virtual screen set for the user's viewpoint $P_c$.

After the processing in step S62, the process proceeds to step S63, in which the intermediate-data converter 32 calculates a vector v with the subject pixel $P_s$ as an initial point and the user's viewpoint $P_c$ as a terminal point. The process then proceeds to step S64.

Figure 37:
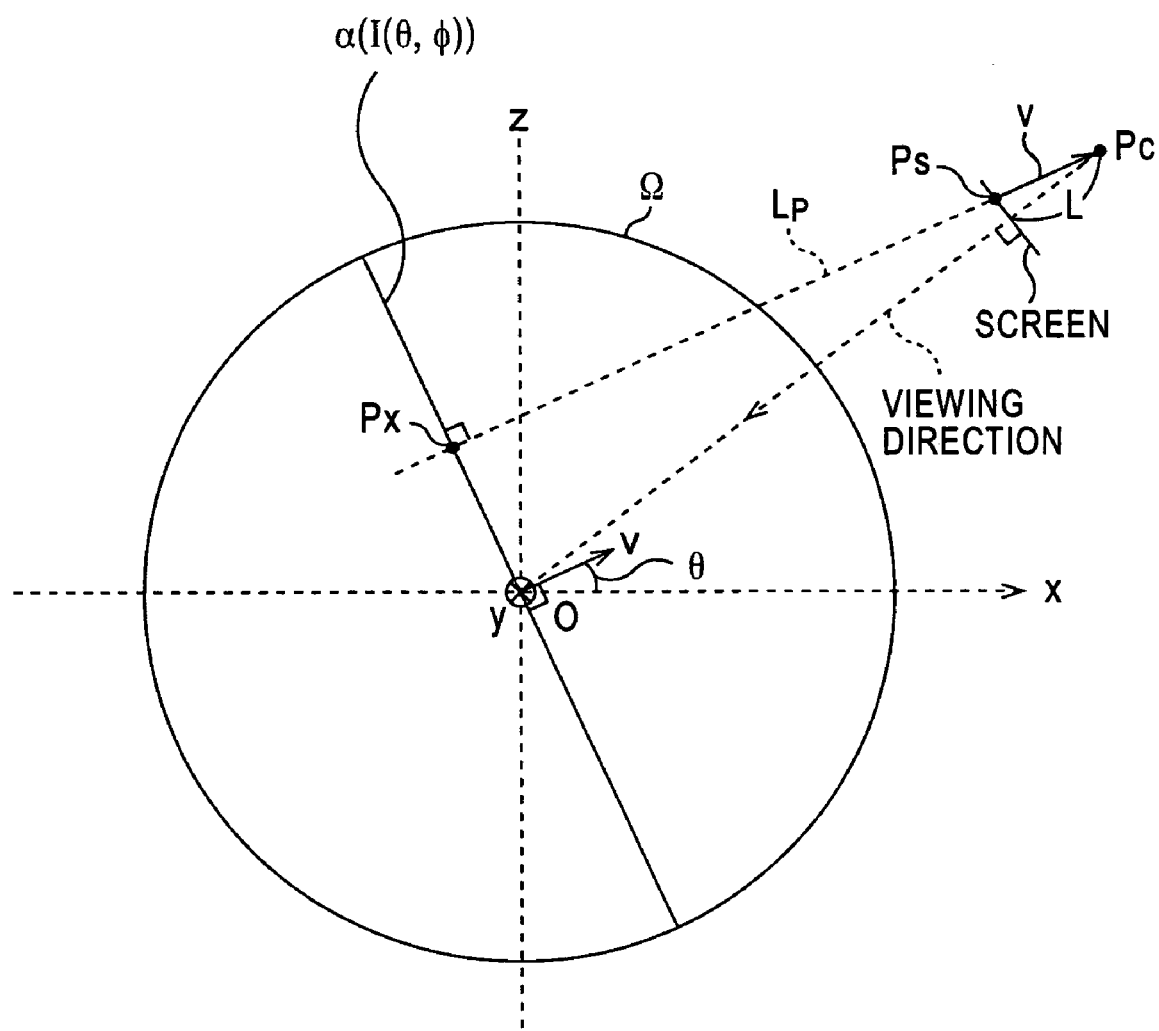
FIG. 37 is a diagram showing an intermediate-data conversion process for converting intermediate data into presentation image data.

In the embodiment shown in FIG. 37, the vector v is a vector in the xz plane, and has a direction of an angle $\theta$ from the xy plane in the direction of the z axis. That is, in the embodiment shown in FIG. 37, the vector v has a latitude $\theta$ and a longitude of 0 degrees.

Furthermore, in the embodiment shown in FIG. 37, the user's viewing direction passes through the origin of the display coordinate system from the user's viewpoint $P_c$, as described earlier. However, the user's viewing direction need not necessarily pass through the origin of the display coordinate system. That is, the user's viewing angle may be a direction that can be detected in some way.

In FIG. 37, as the curved surface $\Omega$ surrounding the object, a spherical surface forming a closed curved surface is shown, similarly to the case of FIG. 28.

In step S64, the intermediate-data converter 32 calculates a plane $\alpha$ perpendicular to the vector v and passing through the origin as a predetermined point on the display coordinate system. The process then proceeds to step S65.

The plane $\alpha$ need not necessarily pass through the origin.

In step S65, the intermediate-data converter 32 calculates the latitude $\theta$ and the longitude $\phi$ of the vector v calculated in step S63, i.e., the latitude $\theta$ corresponding to an angle formed by the vector v and the xy plane and the longitude $\phi$ corresponding to an angle formed by the vector v and the xz plane.

The latitude $\theta$ and the longitude $\phi$ of the vector v are equivalent to the latitude $\theta$ and the longitude $\phi$ of the normal direction of the plane $\alpha$ calculated in step S64. Since a plane $\alpha$ passing through the origin as a predetermined point can be defined by the latitude $\theta$ and the longitude $\phi$ thereof, the plane $\alpha$ defined by the latitude $\theta$ and the longitude $\phi$ will hereinafter be denoted as a plane I($\theta$, $\phi$) when appropriate, similarly to the case of the image-data conversion process.

In step S66, the intermediate-data converter 32 calculates a straight line $L_p$ connecting the user's viewpoint $P_c$ and the subject pixel $P_s$, as shown in FIG. 37. Furthermore, in step S66, the intermediate-data converter 32 calculates an intersection $P_x$ of the straight line $L_p$ and the plane $\alpha$ (I($\theta$, $\phi$)) calculated in step S64. The process then proceeds to step S67, in which the intermediate-data converter 32 calculates coordinates ($x_\alpha$, $y_\alpha$) of the point $P_x$ on the two-dimensional coordinate system on the plane $\alpha$.

The coordinates ($x_\alpha$, $y_\alpha$) of the point $P_x$ on the plane $\alpha$ can be calculated similarly to the case of step S27 shown in FIG. 27.

If the viewing direction from the user's viewpoint does not pass through the origin of the display coordinate system, the coordinates ($x_\alpha$, $y_\alpha$) of the point $P_x$ must be offset by the coordinates of the intersection of the straight line in the viewing angle and the plane $\alpha$ in the two-dimensional coordinate system on the plane $\alpha$, similarly to the case of step S27 shown in FIG. 27.

The process then proceeds to step S68, in which the intermediate-data converter 32 sets a pixel value of a pixel at the position of the point $P_x$ on the plane $\alpha$ as a pixel value of the subject pixel $P_s$ on the virtual screen. More specifically, if the plane $\alpha$ is a plane I($\theta$, $\phi$) defined by a latitude $\theta$ and a longitude $\phi$, and if the coordinates of the point $P_x$ on the plane $\alpha$ is ($x_\alpha$, $y_\alpha$), the intermediate-data converter 32 reads a pixel value I($\theta$, $\phi$) ($x_\alpha$, $y_\alpha$) from the intermediate database, and sets the pixel value I($\theta$, $\phi$) ($x_\alpha$, $y_\alpha$) as a pixel value of the subject pixel $P_s$.

The process then proceeds to step S69, in which the intermediate-data converter 32 determines whether all the pixels on the virtual screen set for the user's viewpoint $P_c$ have been considered as subject pixels. If it is determined that a pixel that has not yet been considered as a subject pixel exists, the process returns to step S62, and then the same process is repeated.

On the other hand, if it is determined in step S69 that all the pixels on the virtual screen have been considered as subject pixels, that is, if image data as viewed from the user's viewpoint has been formed on the virtual screen, the process is exited.

Presentation image data obtained in the manner described above is displayed on the display 6 in step S4 described earlier with reference to FIG. 6.

Thus, the display 6 displays image data of an object as viewed from a user's viewpoint.

As described above, original image data is converted into presentation image data as viewed from a user's viewpoint, using light-ray information representing trajectories of light rays for the capture of the original image data and representing pixel values corresponding to the light rays. Thus, even a real image actually captured can be changed in accordance with the user's viewpoint. That is, when the user moves his/her viewpoint, the display 6 displays an image corresponding to an object as perceived by the vision of the user when the user is observing the object in the real world.

More specifically, for example, when the user has moved his/her viewpoint to the left or to the right as facing the display 6, the display 6 displays an image in which a left side surface or a right side surface of the object that has been displayed before the user moved his/her viewpoint is viewable. As another example, if the user has moved his/her viewpoint in a direction toward or away from the display 6, the display 6 displays an image in which an object that has been displayed before the user moved his/her viewpoint is larger or smaller.

Thus, the user is allowed to enjoy a sense that the object to be imaged actually existed there.

Furthermore, with the image processing apparatus 1 shown in FIG. 5, for example, by executing the image processing shown in FIG. 6 on image data of the cosmic space, image data of a microstructure such as molecules, or the like as original image data, an interface that allows the user to intuitively grasp structures that cannot be recognized normally recognized can be provided.

Furthermore, in the image processing apparatus 1 shown in FIG. 5, original image data is converted into intermediate data corresponding to an object as viewed from infinite distances in various directions. Thus, presentation image data in accordance with a user's viewpoint can be readily generated from the intermediate data.

Figure 36:
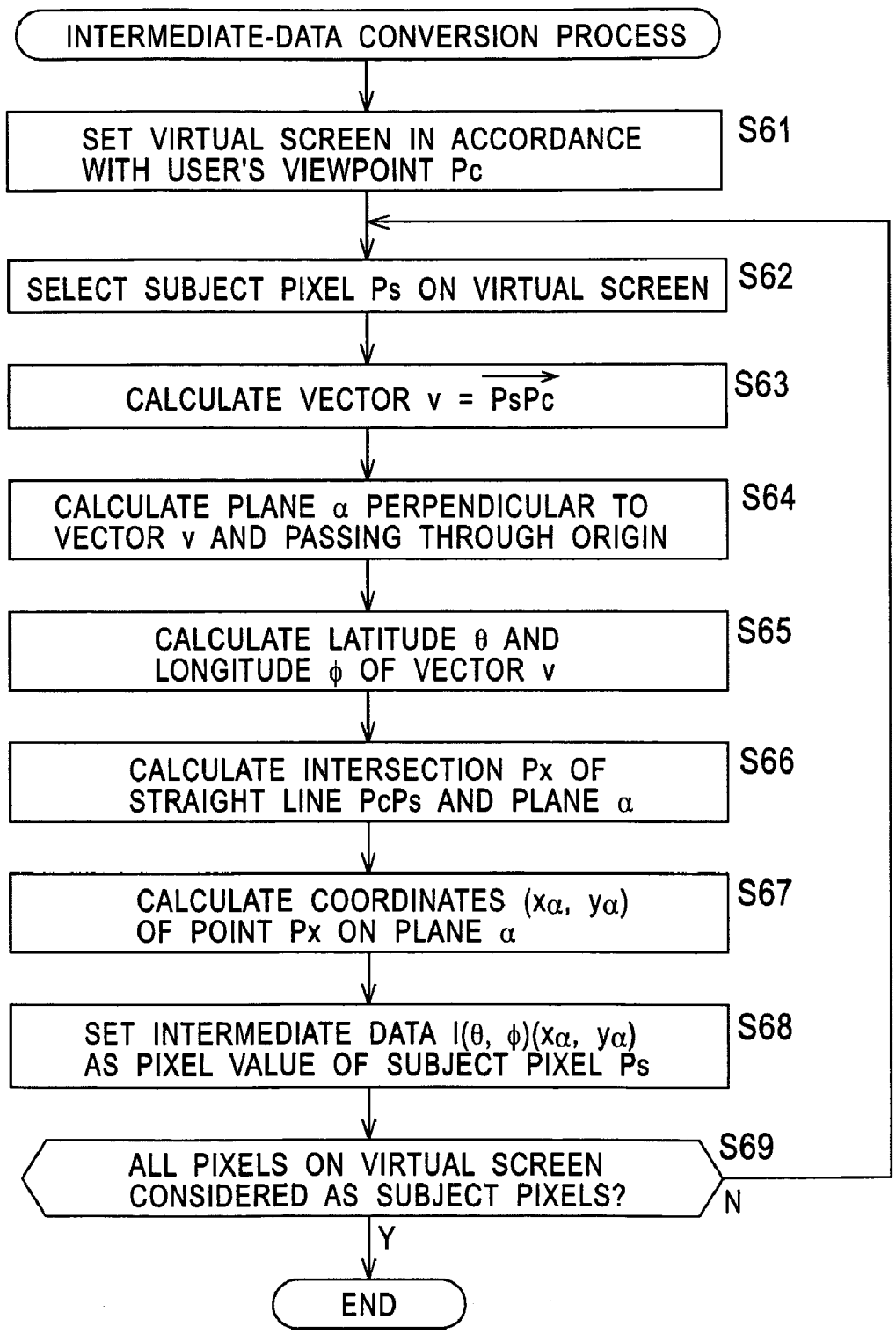
FIG. 36 is a flowchart showing an intermediate-data conversion process for converting intermediate data into presentation image data.

Intermediate data for another object may be generated independently so that images of the separate objects may be combined when generating presentation image data in the intermediate-data conversion process shown in FIG. 36.

Furthermore, it is possible to carry out editing such as deleting a portion of the intermediate data or adding image data such as other intermediate data to a portion of the intermediate data before executing thereon the intermediate-data conversion process shown in FIG. 36.

Images that can be processed by the image processing apparatus 1 shown in FIG. 5 are not limited to real images actually captured.

In the case described above, a user's position is detected and a user's viewpoint is set (a user's viewpoint is assumed) at the position before the intermediate-data conversion process shown in FIG. 36 is executed. However, in the image processing apparatus shown in FIG. 5, a user's viewpoint can be set at any virtual point.

A virtual user's viewpoint can be set, for example, by sequentially moving over the circumference of a circle drawn on a predetermined plane and having a predetermined radius, centered at, for example, the origin of the display coordinate system. In this case, the display 6 displays an image as captured while panning around the object.

Alternatively, for example, a user's viewpoint can be set so as to move unidirectionally, for example, on a straight line passing through the origin of the display coordinate system.

In that case, the display 6 displays an image as captured while coming closer to the object or going away from the object.

Furthermore, in the case described above, original image data of an object as image from a large number of viewpoints is obtained by moving a still object by a motion base system or a turntable system. However, in the image processing apparatus 1 shown in FIG. 5, an image of a moving object can also be processed. This can be achieved, for example, by capturing image data of a moving object simultaneously from a plurality of viewpoints by a plurality of cameras, generating intermediate data on a frame-by-frame basis for the frames of image data captured respectively by the plurality of cameras, and generating presentation image data for display using the intermediate data of the frames. Other methods may also be used.

Figure 38:
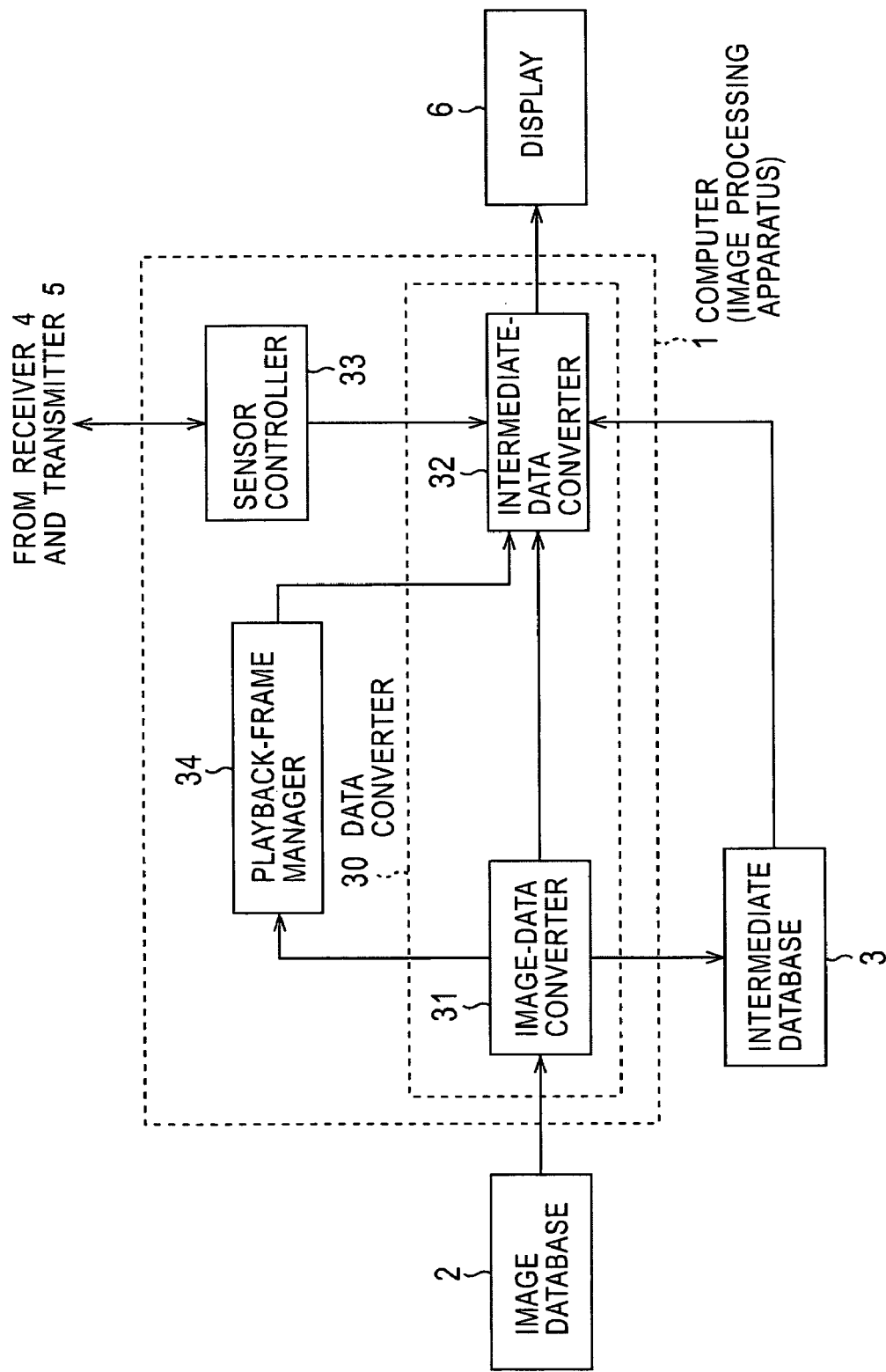
FIG. 38 is a block diagram showing a second example of the functional configuration of the computer 1 as an image processing apparatus.

FIG. 38 shows another example of the functional configuration of an image processing apparatus implemented by execution of programs by the computer 1 shown in FIG. 3. In the figure, parts corresponding to those in FIG. 5 are designated by the same numerals, and descriptions thereof will hereinafter be omitted as appropriate. That is, the image processing apparatus shown in FIG. 38 is configured substantially the same as that shown in FIG. 5, except in that a playback-frame manager 34 is additionally provided.

In the embodiment shown in FIG. 38, however, the image database 2 stored image data captured with a camera being moved linearly. That is, the image database 2 stores a movie scene captured with a camera being linearly moved at a constant velocity, image data captured by a camera from a window of an automobile or train running at a constant velocity, or the like.

Thus, in the embodiment shown in FIG. 38, the playback-frame manager 34 is provided in order to manage frames of image data that is displayed on the display 6. More specifically, the playback-frame manager 34 receives the number of frames (or fields) of original image data having been converted into intermediate data from the image-data converter 31, and instructs the intermediate-data converter 32 to display a frame of presentation image data on the display 6.

In the embodiment shown in FIG. 38, it suffices for the image data stored in the image database to be equivalent to image data captured while moving a camera linearly. Thus, the image data may be, for example, image data captured with a camera fixed while linearly moving an object.

In the image processing apparatus 1 shown in FIG. 38, by the same principles as in the embodiment shown in FIG. 5, original image data stored in the image database 2 is converted into image data as viewed from a user's viewpoint (presentation image data).

Figure 39A:
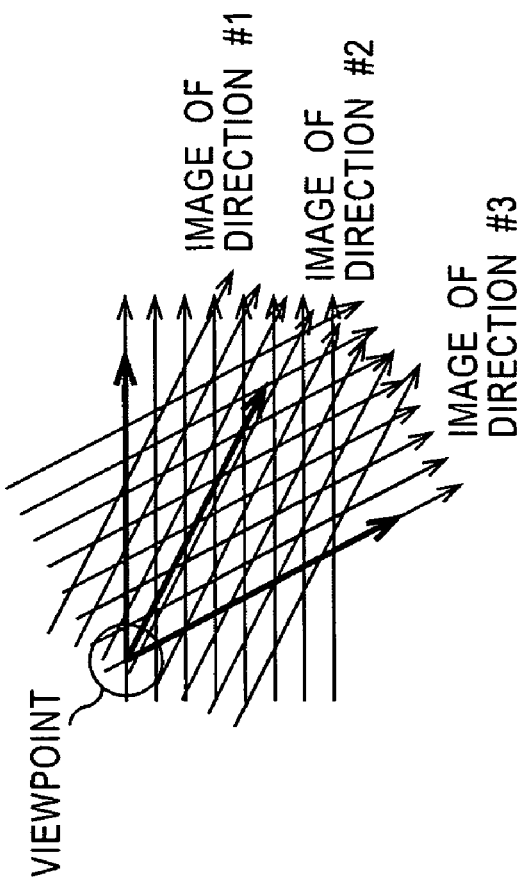
FIG. 39A is a diagram showing the principles for converting original image data into presentation image data.

More specifically, the original image data stored in the image database 2 is, for example, image data captured with a camera fixed on a train that is moving linearly at a constant velocity, that is, image data captured with the camera's viewpoint being moved in the traveling direction of the train. Thus, the original image data includes pixel values corresponding to light rays in respective directions of the longitudes of the Earth, as shown in FIG. 39A. FIG. 39A shows light rays in three directions #1 to #3.

Figure 39B:
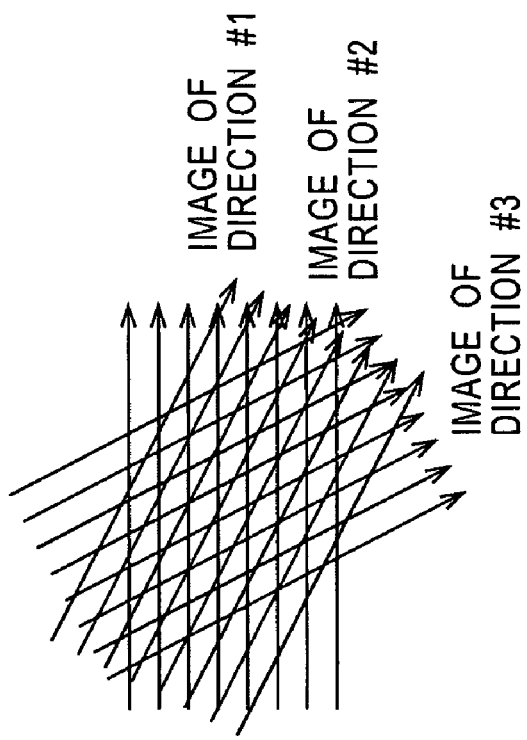
FIG. 39B is a diagram showing the principles for converting original image data into presentation image data.

On the other hand, image data of an object as viewed from a viewpoint is composed of pixel values corresponding to light rays directed from the object to the viewpoint. Now, assuming that light rays go straight without being attenuated, presentation image data that is image data of an object as viewed from a viewpoint on a straight line that is parallel to the trajectory of travel of the train can be obtained by reconstructing image data composed of pixel values corresponding to light rays directed from the object to the viewpoint as shown in FIG. 39B, from the original image data including pixel values corresponding to the light rays in the respective directions as shown in FIG. 39A.

In the image processing apparatus shown in FIG. 38, according to the above principles, original image data is converted into image data as viewed from a user's viewpoint on a straight line that is parallel to the traveling trajectory of the train (presentation image data).

Since the original image data stored in the image database 2 herein is image data captured with the camera's viewpoint being moved in the traveling direction of the train, presentation image data obtained by the image processing apparatus shown in FIG. 38 is limited to image data that can be constructed from light-ray information captured for the original image data described above. That is, presentation image data obtained by the image processing apparatus 1 shown in FIG. 38 does not reflect (cannot reflect) movement of a user's viewpoint in a direction that is perpendicular to the plane on which the train travels.

Next, image processing by the image processing apparatus (computer) 1 shown in FIG. 38 will be described with reference to a flowchart shown in FIG. 40.

First, in step S81, the image-data converter 31 reads original image data from in the image database 2, and converts the original image data into intermediate data. Furthermore, in step S81, the image-data converter 31 supplies the intermediate data to the intermediate database 3, where the intermediate data is stored. The process then proceeds to step S82.

In step S82, the image-data converter 31 supplies to the playback-frame manager 34 the number of frames $F_{num}$ of the original image data converted into intermediate data in step S81, whereby the playback-frame manager 34 obtains the number of frames $F_{num}$.

Then, the process proceeds to step S83, in which the playback-frame manager 34 initializes a variable n representing a frame to be played back, for example, to 1. The playback-frame manager 34 then supplies the variable n to the intermediate-data converter 32 as frame information representing a frame to be processed. The process then proceeds to step S84.

In step S84, the sensor controller 33 detects a user's position from an output of the receiver 4 (FIG. 2), sets the user's position as a user's viewpoint, and supplies it to the intermediate-data converter 32.

The process then proceeds to step S85, in which the intermediate-data converter 32 recognizes that the n-th frame is to be processed, based no the frame information supplied from the playback-frame manager 34. Furthermore, the intermediate-data converter 32 converts the intermediate data into presentation image data of the n-th frame that is being processed, based on the user's viewpoint supplied from the sensor controller 33. The process then proceeds to step S86.

In step S86, the intermediate-data converter 32 supplies the presentation image data of the n-th frame to the display 6, where the presentation image data is displayed. The process then proceeds to step S87.

In step S87, the playback-frame manager 34 determines whether the variable n is equal to the total number of frames $F_{num}$ of the original image data. If it is determined in step S87 that the variable n is not equal to the total number of frames $F_{num}$, the process proceeds to step S88. In step S88, the CPU 12 (FIG. 3) determines, for example, whether the user has operated the input unit 17 (FIG. 3) so as to exit the image processing. If it is determined in step S88 that the input unit 17 has not been operated so as to exit the image processing, the process proceeds to step S89. In step S89, the playback-frame manager 34 increments the variable n by one, and supplies corresponding frame information to the intermediate-data converter 32. The process then returns to step S84, and then the same process is repeated.

On the other hand, if it is determined in step S87 that the variable n is equal to the total number of frames $F_{num}$, or if it is determined in step S88 that the input unit 17 has been operated so as to exit the image processing, the process is exited.

Figure 40:
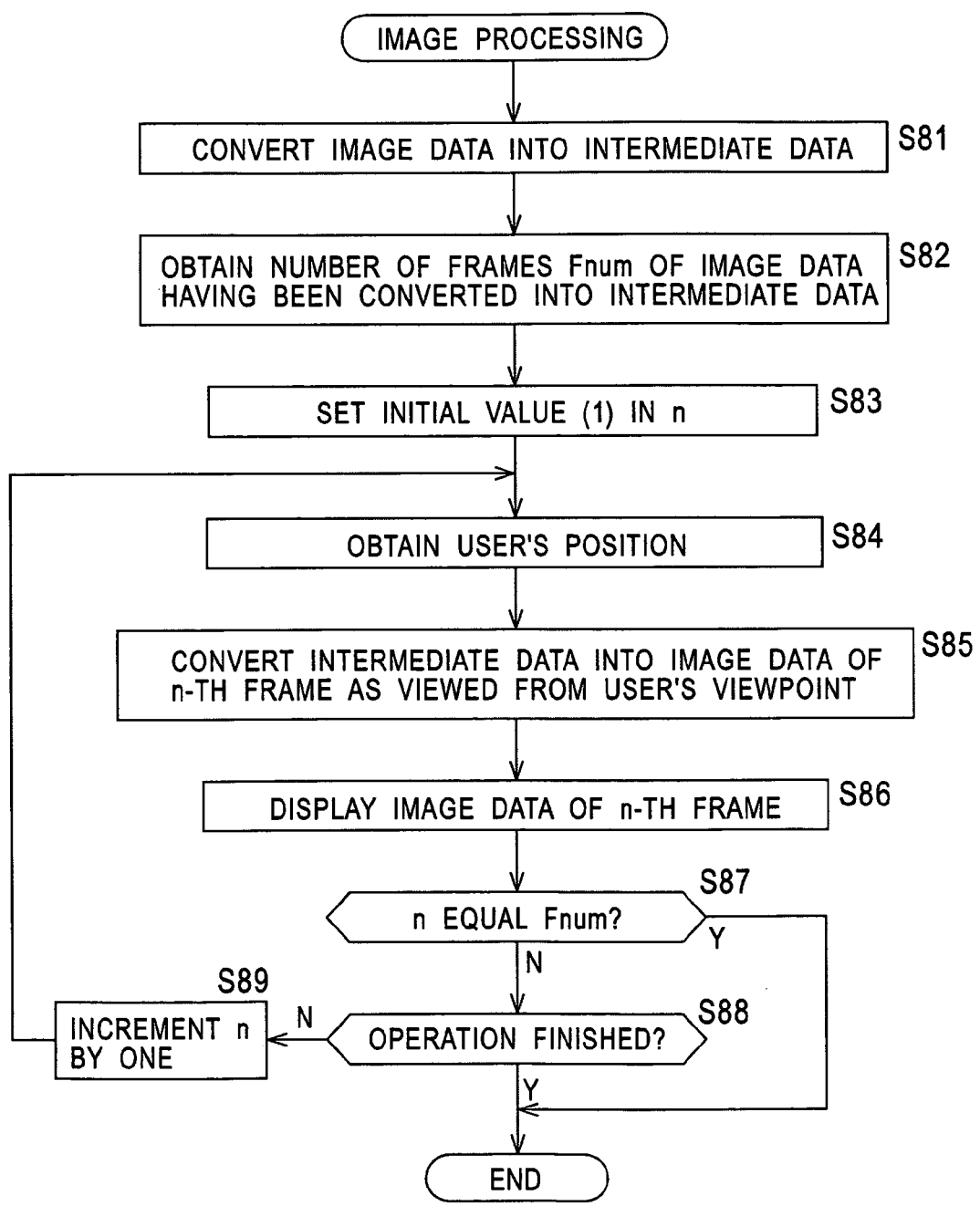
FIG. 40 is a flowchart for explaining image processing executed by the image processing apparatus.

If the image processing shown in FIG. 40 has been executed in the past whereby intermediate data obtained by converting the original image data stored in the image database 2 has already been stored in the intermediate database 3, processing in steps S81 and S82 can be skipped.

Next, processing executed by (the image-data converter 31 and the intermediate-data converter 32 constituting) the data converter 30 in the embodiment shown in FIG. 38 will be described.

Figure 41:
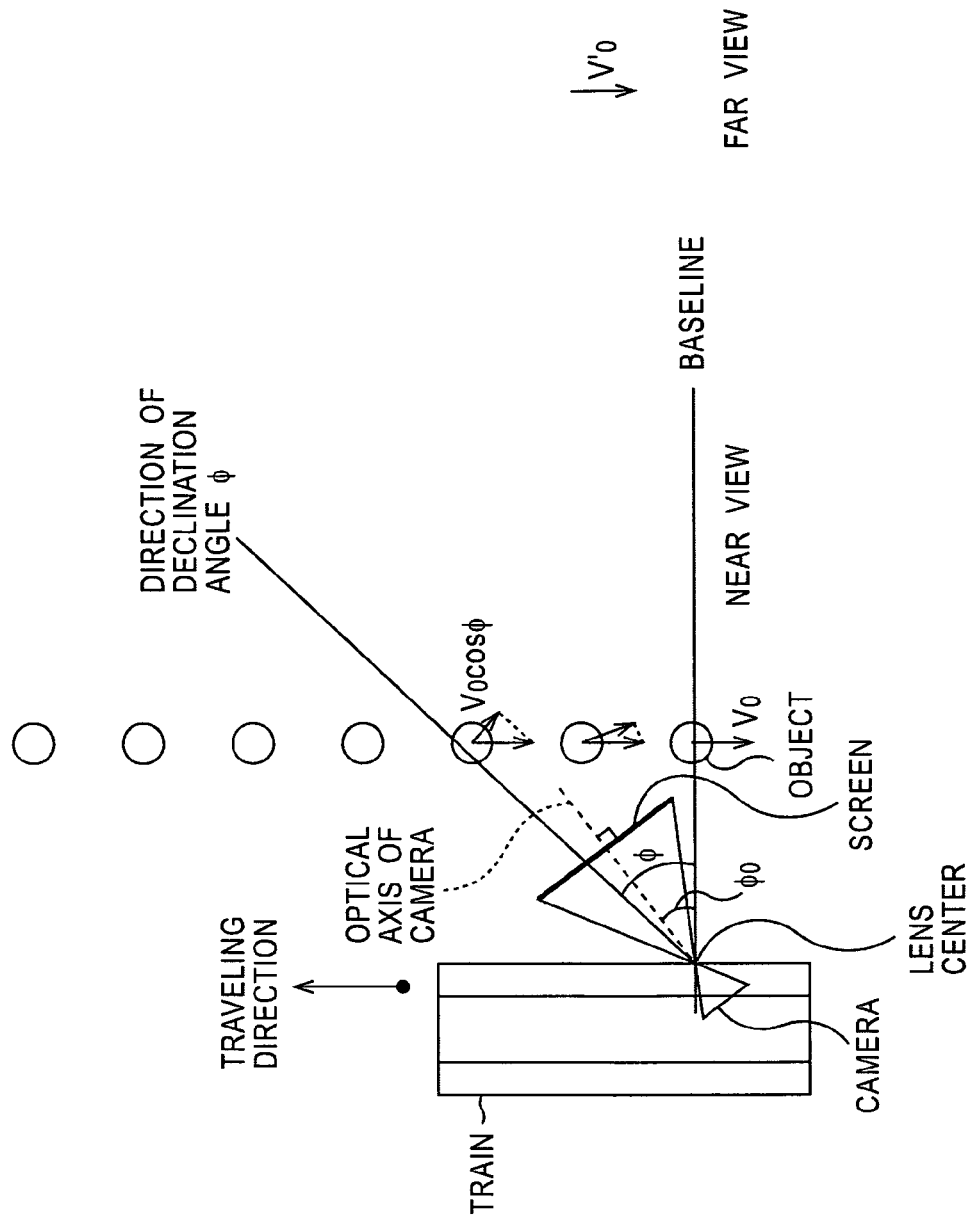
FIG. 41 is a diagram showing a method for the capture of original image data stored in the image database 2.

It is assumed that original image data stored in the image database 2 is captured, for example, by a camera fixed on a window of a train that is substantially moving linearly at a constant velocity, as shown in FIG. 41. In the example shown in FIG. 41, a near view (an object that is relatively near to the camera, such as a tree) and a far view (scenery that is far from the camera, such as the sky) are captured by the camera.

In FIG. 41, the camera is fixed such that a direction that is perpendicular to the traveling direction of the train is the baseline and a direction that is tilted counterclockwise by an angle $\phi_0$ with respect to the baseline is the direction of optical axis on the plane where the train travels (or a plane that is parallel to the plane). The angle made counterclockwise from the lens center of the camera fixed on the train with respect to the baseline on the plane where the train travels will hereinafter be referred to as a declination angle when appropriate. The declination angle corresponds to the longitude described earlier.

That is, since the train is assumed herein to travel linearly on the plane, considering the plane as a plane on the equator of the Earth, the viewpoint of the camera fixed on the plane does not move in the latitudinal direction and only moves in the longitudinal direction. Thus, in original image data captured by such a camera, basically, of the latitude and longitude described earlier, it suffices to consider only longitude, and latitude can be neglected.

In FIG. 41, a plurality of objects (e.g., trees) to be imaged exists to the right side as viewed in the traveling direction of the train, and the plurality of objects to be imaged exists along the traveling direction of the train. Thus, in the embodiment shown in FIG. 41, the plurality of objects to be imaged exists equidistantly with respect to the traveling trajectory of the train.

In this case, an object in the direction of an angle (declination angle) $\phi$ with respect to the baseline as viewed from the camera is $V_0 \cos \phi$, where V0 denotes the velocity of an object on the baseline passing the optical center of the camera as viewed from the camera.

Thus, in image data captured by the camera, that is, in image data displayed on a virtual screen that is perpendicular to the optical axis of the camera, an object displayed on the right side moves faster than an object displayed on the left side.

Figure 42:
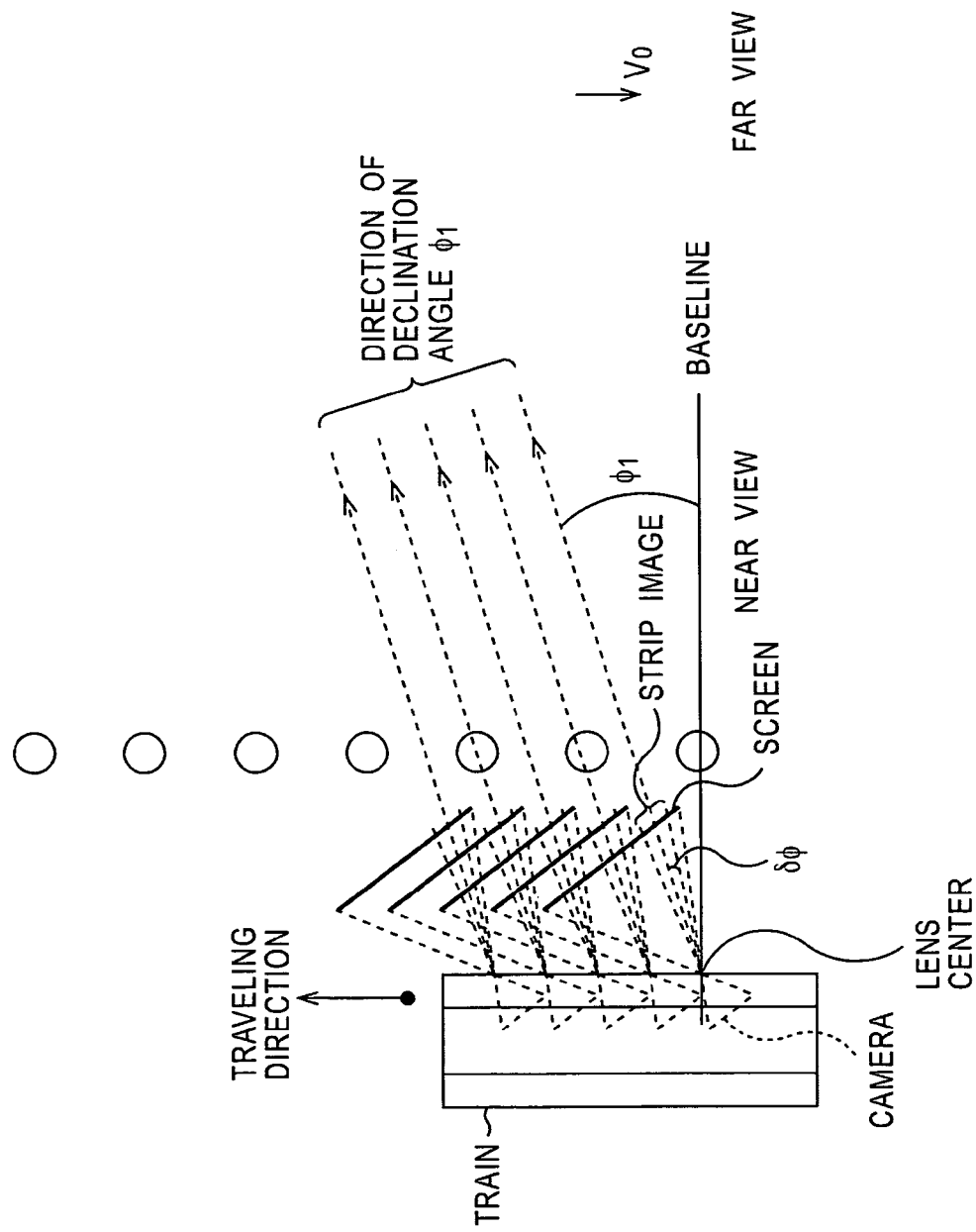
FIG. 42 is a diagram showing how original image data is captured with a camera being moved.

In FIG. 41, the train is traveling upward as viewed in the figure. Thus, image data captured by a camera fixed on a window of the train is, for example, as shown in FIG. 42.

That is, in this case, since the train is moving linearly at a constant velocity, the camera fixed on the train also moves linearly at a constant velocity. Thus, the camera captures image data of frames with the lens center thereof being moved at regular intervals in the traveling direction of the train.

In image data of frames captured by the camera, regarding a direction with a declination angle $\phi_1$, a pixel value corresponding to a light ray in the direction of the declination angle $\phi_1$ exists in each of the frames of the image data. Thus, by collecting pixel values corresponding to light rays in the direction of the declination angle $\phi_1$, intermediate data that is image data as viewed from an infinite distance in the direction of the declination angle $\phi_1$ can be generated.

More specifically, intermediate data that is image data as viewed from an infinite distance in the direction of the declination angle $\phi_1$ can be generated by extracting an array of pixels on a column in the direction of the declination angle $\phi_1$ (pixels arrayed in the perpendicular direction in the direction of the declination angle $\phi_1$) from image data of the frames captured by the camera, and arranging the pixel values of the pixels of one column extracted from the frames in the order of frames sequentially from right to left.

When image data (intermediate data) as viewed from an infinite distance in the direction of the declination angle $\phi_1$ by extracting and arranging pixels on the column in the direction of the declination angle $\phi_1$ from the frames of the image data captured by the camera, in some cases, pixels are missing for an interval corresponding to a moving distance of the camera during one frame.

More specifically, if a moving distance that the camera moves during one frame exceeds the horizontal length of one pixel, a gap exceeding one pixel occurs between a pixel on a column in the direction of the declination angle $\phi_1$ in a frame of image data and a pixel in the direction of the declination angle $\phi_1$ in the next frame of image data. Image data that serves as intermediate data also includes such gaps.

Thus, in order to prevent occurrence of such gaps, pixels can be extracted from the frames of the image data captured by the camera with a certain width in the row direction (horizontal direction).

That is, from the frames of image data captured by the camera, for example, pixels on a plurality of columns in directions in a range of a small angle $\pm\delta\phi$ with respect to the declination angle $\phi_1$ may be extracted, as shown in FIG. 42. Now, a strip-like image composed of pixels on a plurality of columns in directions in a range of the small angle $\pm\delta\phi$ with respect to the declination angle $\phi_1$ will be referred to as a strip image for the declination angle $\phi_1$. Intermediate data that is image data as viewed from an infinite distance in the direction of the declination angle $\phi_1$ is generated (reconstructed) by extracting strip images for the declination angle $\phi_1$ from the frames of image data captured by the camera, and arranging the strip images in the order of the frames from right to left.

Figure 43:
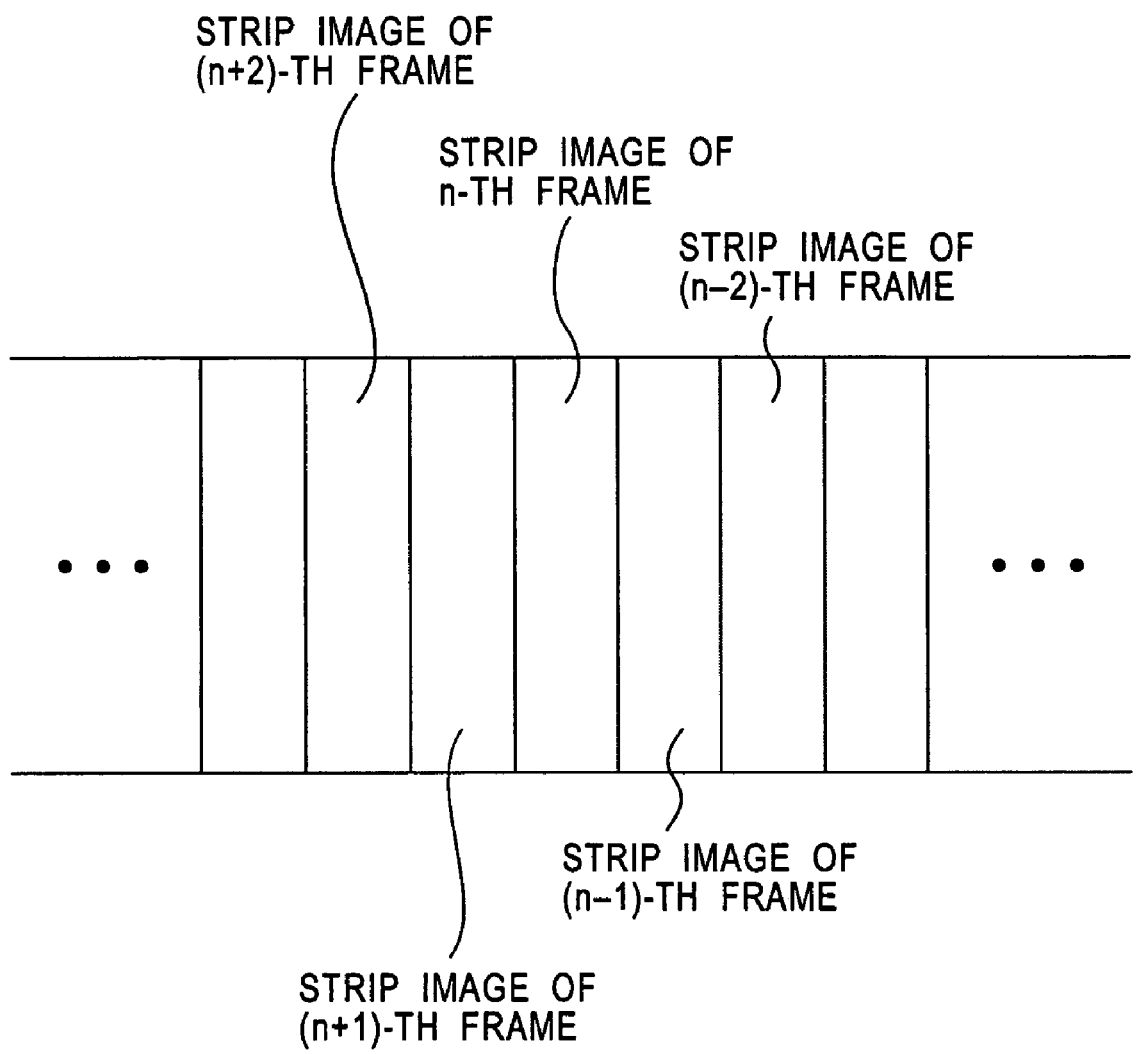
FIG. 43 is a diagram showing intermediate data composed of strip images.
Figure 44:
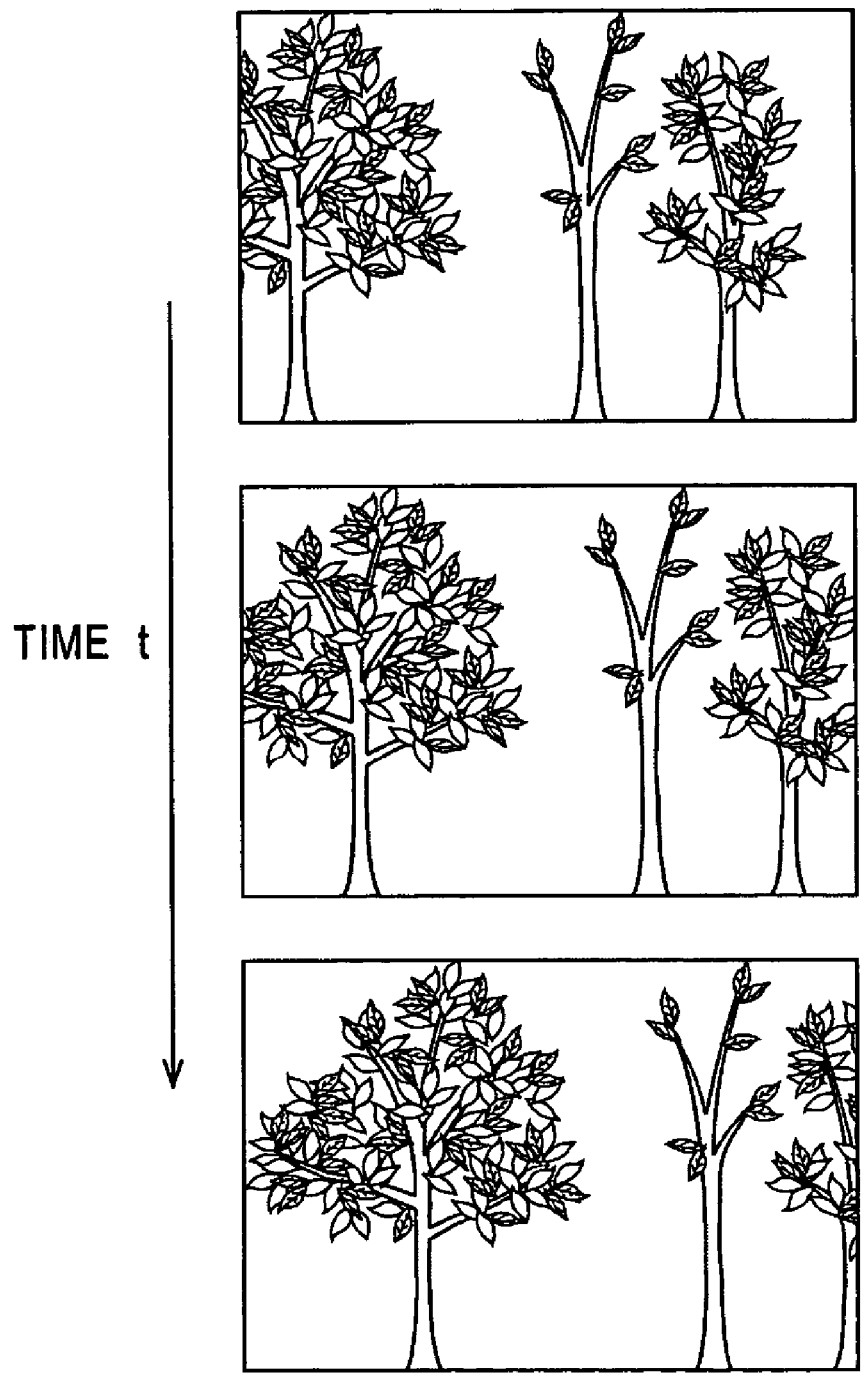
FIG. 44 is a diagram showing an example of original image data.

The length in the column direction (vertical direction) of the intermediate data shown in FIG. 43 is determined by the number of rows (the number of pixels in the column direction) of the image data captured by the camera, and the length in the row direction (horizontal direction) depends on the number of frames of the image data captured by the camera.

In the image-data converter 31 of the data converter shown in FIG. 38, intermediate data as viewed from an infinite distance in the direction of each declination angle is generated in the manner described above.

That is, for example, if image data captured by the camera fixed on the train is such that the scenery including trees moves from left to right on the screen, for example, intermediate data shown in FIGS. 45A to 45E is generated.

Figure 45A:
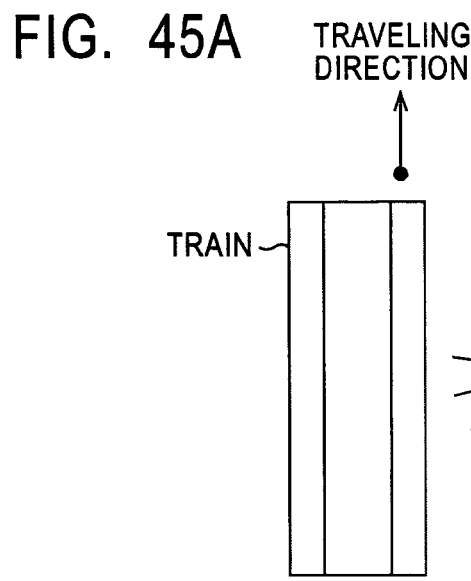
FIG. 45A is a diagram showing an example of image data that serves as intermediate data.
Figure 45B:
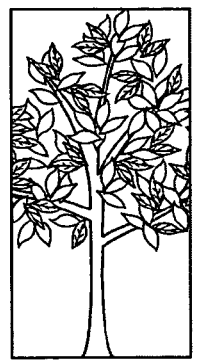
FIG. 45B is a diagram showing an example of image data that serves as intermediate data.
Figure 45C:
FIG. 45C is a diagram showing an example of image data that serves as intermediate data.
Figure 45D:
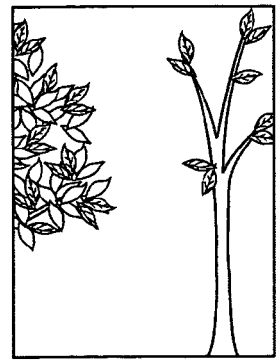
FIG. 45D is a diagram showing an example of image data that serves as intermediate data.
Figure 45E:
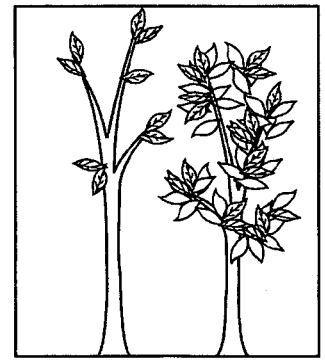
FIG. 45E is a diagram showing an example of image data that serves as intermediate data.

FIGS. 45A to 45E show intermediate data that is image data as viewed from infinite distances in four directions #1 to #4 shown in FIG. 45A. That is, FIGS. 45B to 45E show intermediate data that are image data as viewed from the infinite distances in the directions #1 to #4 in FIG. 45A, respectively.

Next, an image-data conversion process executed by the image-data converter 31 shown in FIG. 38 in step S81 shown in FIG. 40, i.e., a process of converting original image data into intermediate data, will be described with reference to a flowchart shown in FIG. 46 and FIG. 47.

First, in step S101, the image-data converter 31 sets an initial value, e.g., one, in the variable $F_{num}$ for counting the number of frames of original image data stored in the image database 2. The process then proceeds to step S102.

In step S102, a subject imaging point $P_c$ is selected from camera's viewpoints (imaging points) from which the original image data stored in the image database 2 was captured.

Figure 47:
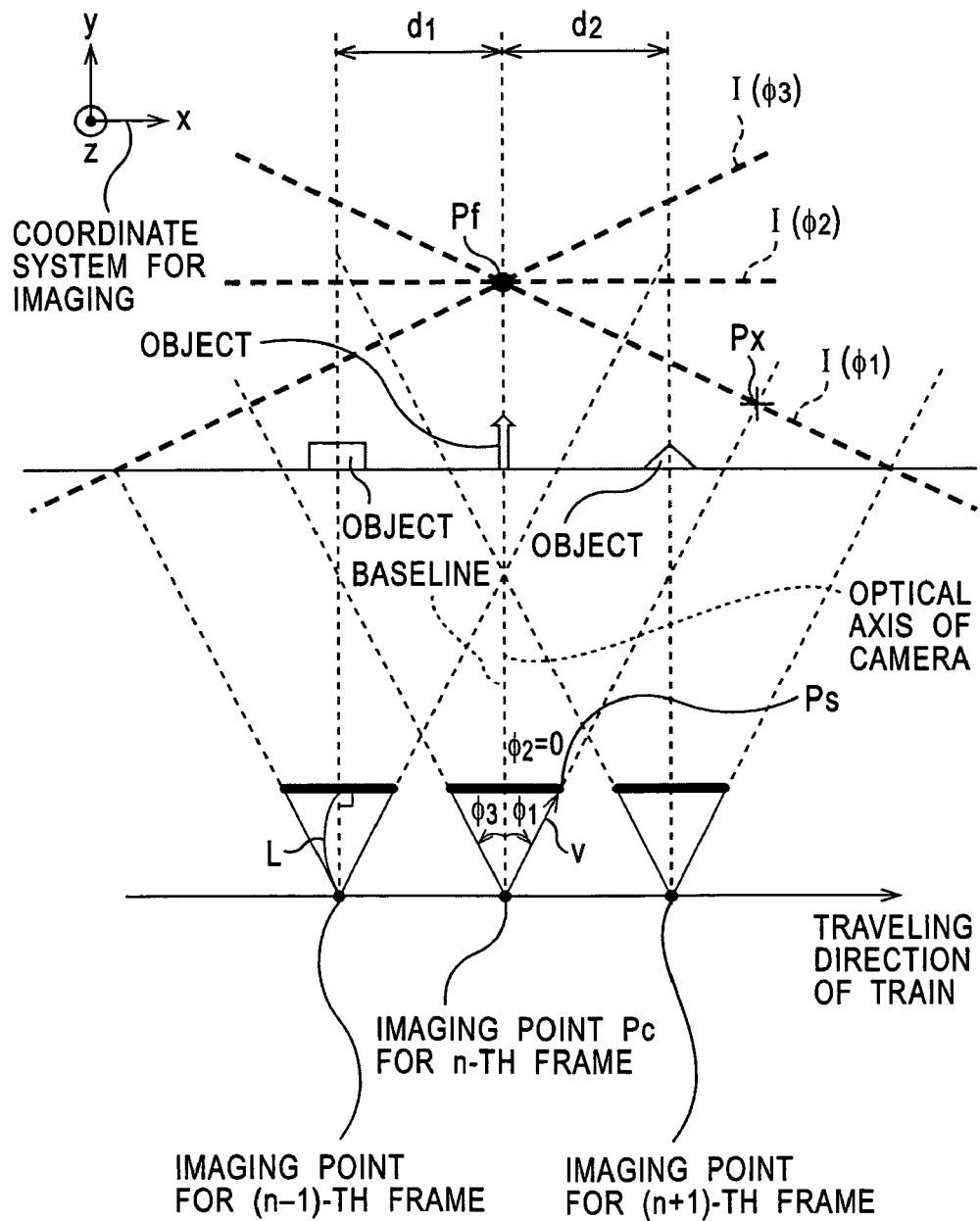
FIG. 47 is a diagram showing an image-data conversion process for converting original image data into intermediate data.

More specifically, in the embodiment shown in FIG. 38, since the original image data stored in the image database 2 is captured by a camera fixed on a train that is moving linearly at a constant velocity, a large number of imaging points exists on a straight line along the traveling direction of the train, as shown in FIG. 47. In step S102, from among the large number of imaging points, an imaging point from which the $F_{num}$-th frame of the original image data was captured by the camera is selected as a subject imaging point $P_c$. In FIG. 38, imaging points for three frames, namely, the (n−1)-th frame, the n-th frame, and the (n+1)-th frame, respectively, are shown.

In the embodiment shown in FIG. 38, in the image database 2, in addition to original image data captured by the camera fixed on the train, similarly to the case of the original image data captured by the image generating apparatus shown in FIG. 7, imaging points of the camera fixed on the train in the imaging coordinate system, which is a three-dimensional coordinate system predefined in the real world, are stored. In this case, in step S102, the image-data converter 31 reads an imaging point for the $F_{num}$-th frame of the image data from the image database 2 as a subject imaging point $P_c$. In FIG. 47, as the imaging coordinate system, the x axis is taken in a leftward direction, the y axis is taken in an upward direction, and the z axis is taken in the direction perpendicularly out of the sheet.

The process then proceeds to step S103. In step S103, the image-data converter 31 sets a virtual screen for the subject imaging point $P_c$, and selects, as a subject column, a pixel column that has not yet been selected as a subject column from among pixel columns in the vertical direction on the virtual screen.

More specifically, the image-data converter 31 sets a virtual screen for the subject imaging point $P_c$, the virtual screen being a rectangular plane that is distant by a predetermined distance L from the subject imaging point $P_c$ in the direction of the optical axis of the camera and that is perpendicular to the optical axis of the camera fixed on the train. Then, the image-data converter 31 selects, as a subject column, a pixel column that has not yet been selected as a subject column from the pixels on the virtual screen, for example, in order of left to right.

In FIG. 47, the optical axis of the camera coincides with the baseline, that is, the optical axis of the camera is in the direction of 0 degrees with respect to the baseline. However, the optical axis of the camera may be in the direction of an arbitrary declination angle $\theta_0$ with respect to the baseline. Although the optical axis of the camera may be in the direction of any declination angle $\theta_0$ with respect to the baseline, it is assumed herein that the declination angle $\theta_0$ is recognized in advance by the data converter 30.

When a subject column has been selected in step S103, the process proceeds to step S104, in which the image-data converter 31 selects, for example, an uppermost pixel of the pixels constituting the subject column, as a subject pixel $P_s$.

The subject pixel $P_s$ is not limited to the uppermost pixel of the pixels constituting the subject column, and a pixel on an arbitrary row may be selected as a subject pixel.

When the subject pixel Ps has been selected in step S104, the process proceeds to step S105, in which the image-data converter 31 calculates a vector v with the subject imaging point $P_c$ as an initial point and the subject pixel $P_s$ as a terminal point. The process then proceeds to step S106.

In step S106, the image-data converter 31 calculates a plane α that is perpendicular to the vector v calculated in step S105 and that passes a predetermined point $P_f$ on the imaging coordinate system, as shown in FIG. 47. The process then proceeds to step S107.

In step S107, the image-data converter 31 calculates the declination angle φ of the vector v calculated in step S105 with respect to the baseline. The process then proceeds to step S108. That is, in principle, the latitude and the longitude of the vector v must be calculated, similarly to the embodiment shown in FIG. 27. Since original image data is captured herein by a camera that moves only in the longitudinal direction as described earlier, it suffices to consider only the longitude and the latitude can be neglected. Thus, in step S107, the declination angle φ with respect to the baseline, which corresponds to the longitude of the vector v, is calculated.

The declination angle φ of the vector v can also be considered as the declination angle φ of a normal line of the plane α calculated in step S106. The direction of the normal line of the plane α is defined by latitude and longitude; however, latitude can be neglected herein as described earlier (latitude may be fixed to an arbitrary value). Thus, since the plane α passing the predetermined point $P_f$ can be identified by a declination angle φ corresponding to the longitude of a normal line thereof, the plane α defined by the declination angle φ will hereinafter referred to as I(φ) when appropriate.

As for the sign of the declination angle φ, the counterclockwise direction in the plane where the train travels (the xy plane in the embodiment shown in FIG. 47) with the imaging point as a center will be considered as positive.

In step S108, the image-data converter 31 calculates a straight line $L_p$ connecting the subject imaging point $P_c$ and the subject pixel $P_s$, as shown in FIG. 47. Furthermore, in step S108, the image-data converter 31 calculates an intersection $P_x$ of the straight line $L_p$ and the plane α (I(φ)) calculated in step S106. The process then proceeds to step S109, in which the image-data converter 31 calculates the coordinates $(x_\alpha, y_\alpha)$ of the point $P_x$ on the plane α.

In step S109, on the plane I(φ), a two-dimensional coordinate system is defined such that the predetermined point $P_f$ that the plane I(φ) always passes is the origin and axes obtained by mapping the x and y axes of the imaging coordinate system onto the plane I(φ) are the x and y axes, and the coordinates $(x_\alpha, y_\alpha)$ of the point $P_x$ in the two-dimensional coordinate system is calculated. The two-dimensional coordinate system defined on the plane I(φ) is not limited to the two-dimensional coordinate system described above.

The process then proceeds to step S110, the image-data converter 31 projects the subject column of the $F_{num}$-th frame of the original image data on the virtual screen onto the plane I(φ).

Now, the pixel value of the pixel at the position of the point Px on the plane I(φ) will be denoted as I(φ) $(x_\alpha, y_\alpha)$ by the plane I(φ) and $(x_\alpha, y_\alpha)$ representing the coordinates of the point $P_x$ on the plane I(φ), and it is assumed that the subject column is composed of N pixels. In this case, the image-data converter 31 sets the pixel value of the pixel on the first row in the subject pixel of the $F_{num}$-th frame of original image data on the virtual screen in the pixel value I(φ) $(x_\alpha, y_\alpha)$ on the plane I(φ), sets the pixel value of the pixel on the second row in the subject column in the pixel value I(φ) $(x_\alpha, y_\alpha+1)$ on the plane I(φ), . . . , and sets the pixel value of the pixel on the N-th row in the subject column in the pixel value I(φ) $(x_\alpha, y_\alpha+(N-1))$ on the plane I(φ).

The process then proceeds to step S111, in which the image-data converter 31 determines whether all the pixel columns of the original image data on the virtual screen set for the subject imaging point $P_c$ have been considered as subject columns. If it is determined that a pixel column that has not yet been considered as a subject column exists, the process returns to step S103, and then the same process is repeated.

On the other hand, if it is determined in step S111 that all the pixel columns on the virtual screen have been considered as subject columns, the process proceeds to step S112. In step S112, the image-data converter 31 determines whether original image data of the frame next to the $F_{num}$-th frame exists with reference to the image database 2. If it is determined in step S112 that original image data of the frame next to the $F_{num}$-th frame exists, the process proceeds to step S113, in which the image-data converter 31 increments the variable $F_{num}$ by one. The process then returns to step S102, and then the same process is repeated.

On the other hand, if it is determined in step S112 that original image data of the frame next to the $F_{num}$-th frame does not exist, that is, when all the frames of image data stored in the image database 2 have been orthogonally projected onto planes I(φ) of respective declination angles φ to obtain intermediate data, the process is exited.

The intermediate data obtained by the image-data conversion process described above is supplied from the image-data converter 31 to the intermediate database 3, where the intermediate data is stored.

Figure 46:
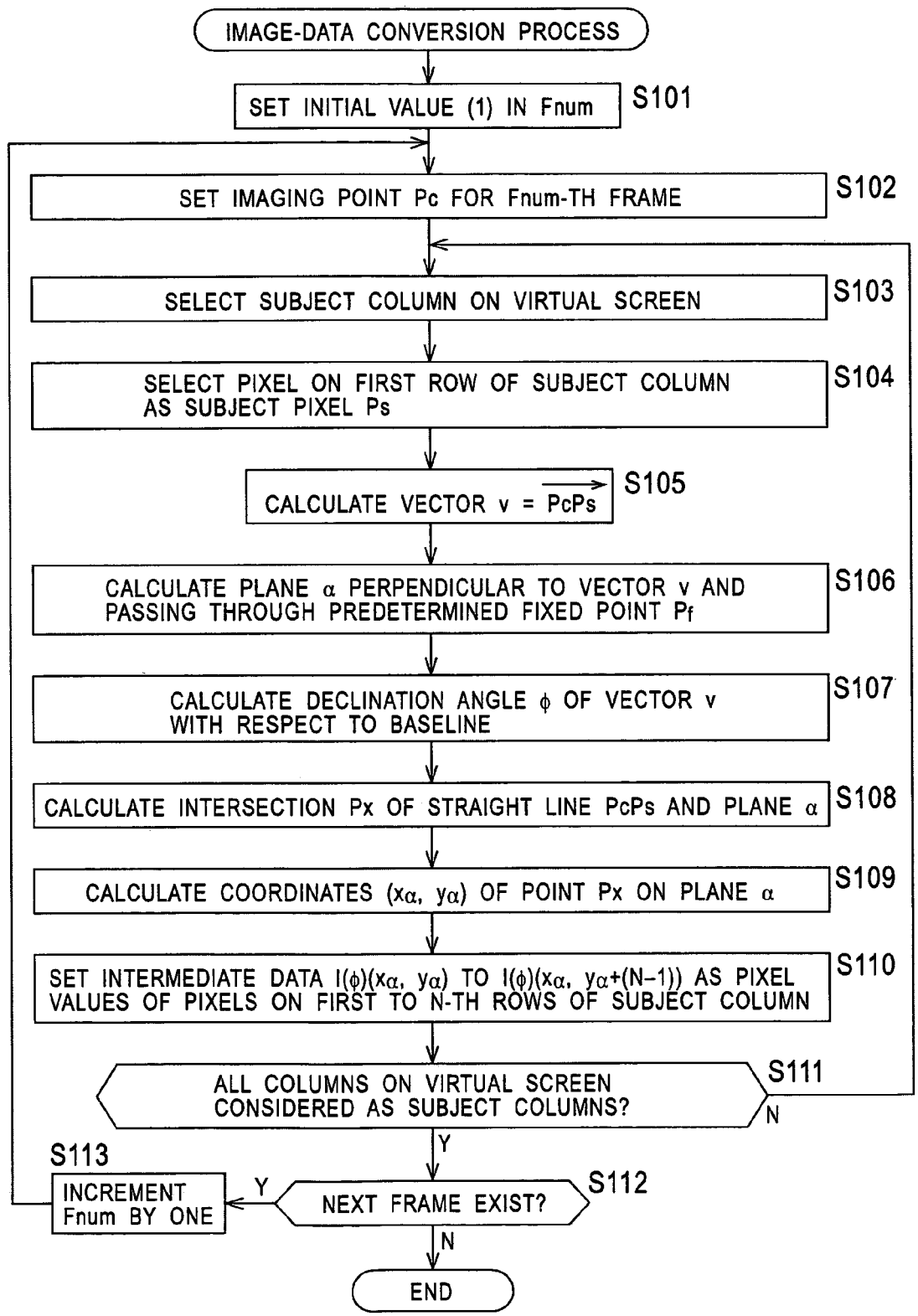
FIG. 46 is a flowchart showing an image-data conversion process for converting original image data into intermediate data.

The final number of frames $F_{num}$ of original image data obtained by the image-data conversion process shown in FIG. 46 is supplied from the image-data converter 31 to the playback-frame manager 34 in step S82, as described with reference to FIG. 40.

FIGS. 48A and 48B schematically show the format of intermediate data generated by the image-data conversion process shown in FIG. 46.

The intermediate data generated by the image-data conversion process shown in FIG. 46 is image data of an object as viewed from an infinite distance in a direction defined by a declination angle φ, and therefore exists for each value of the declination angle φ. Thus, the intermediate data can be represented by a table segmented by values of declination angle φ (hereinafter referred to as a declination-angle table when appropriate), as shown in FIG. 48A.

That is, the image-data conversion process shown in FIG. 46 is basically the same as the image-data conversion process shown in FIG. 27 in which the latitude is neglected, so that resulting intermediate data neglects the latitude in the latitude-longitude table shown in FIG. 29A, obtained by the image-data conversion process shown in FIG. 27. That is, the declination-angle table shown in FIG. 48A, obtained by the image-data conversion process shown in FIG. 46, lacks the axis in the latitudinal direction in the latitude-longitude table shown in FIG. 29A, and only has an axis in the direction of declination angle corresponding to the longitude.

In the embodiment shown in FIG. 48A, image data of an object as viewed from infinite distances in directions defined by respective values of the declination angle φ, for each plane I(φ) with the declination angle φ changing by steps of one degree from a minimum value $φ_{min}$ to a maximum value $φ_{max}$, is registered in each cell of the declination-angle table. Similarly to the latitude-longitude table shown in FIG. 29A, the step size of the declination angle φ is not particularly limited. The minimum value $φ_{min}$ and the maximum value $φ_{max}$ of the declination angle φ in the declination-angle table depend on the declination angle φ of the optical axis of the camera fixed on the train and the viewing angle in the horizontal direction of the camera.

In each cell of the declination-angle table shown in FIG. 48A, image data of an object as viewed from an infinite distance in a direction defined by a declination angle φ corresponding to the cell, i.e., a pixel value of a pixel of original image data projected (neglecting the latitude) onto the plane I(φ), is registered for each x coordinate $x_α$ and y coordinate $y_α$ in the two-dimensional coordinate system defined on the plane I(φ). That is, in each cell of the declination-angle table shown in FIG. 48A, for example, as shown in FIG. 48B, a table defined by values of x coordinate xα and y coordinate yα in the two-dimensional coordinate system defined on the plane I(φ) (pixel-value table) is registered. In each cell of the pixel-value table, a pixel value $p(x_α, y_α)$ of a pixel of original image data projected to a point defined by an x coordinate $x_α$ and a y coordinate $y_α$ corresponding to the cell is registered.

In FIG. 48B, similarly to the case of FIG. 29B, $x_1$ and $y_1$ denote minimum x coordinate and y coordinate among points corresponding to pixels of original image data as orthogonally projected onto the plane I(φ), respectively. Also, similarly to the case of FIG. 29B, $x_1$ and $y_1$ denote maximum x coordinate and y coordinate among points corresponding to pixels of original image data as orthogonally projected onto the plane I(φ), respectively.

As described earlier, when intermediate data that is image data as viewed from an infinite distance in the direction of a declination angle φ is generated by projecting pixels on a column in the direction of the declination angle φ onto the plane I(φ) from the frames of original image data captured by the camera fixed on the train, in the image data in the form of intermediate data, in some cases, pixels do not exist for an interval corresponding to a distance that the camera moves during one frame, that is, pixel values are missing.

Thus, in the image processing apparatus 1 shown in FIG. 38, similarly to the image processing apparatus 1 shown in FIG. 5, a pixel-value interpolation process may be executed.

The pixel-value interpolation process executed by the image processing apparatus 1 shown in FIG. 38 will be described with reference to a flowchart shown in FIG. 49. Similarly to the case shown in FIG. 32, the pixel-value interpolation process may be executed either by the image-data converter 31 or by the intermediate-data converter 32. The pixel-value interpolation process is herein described in the context of an example where the pixel-value interpolation process is executed by the image-data converter 31.

Figure 49:
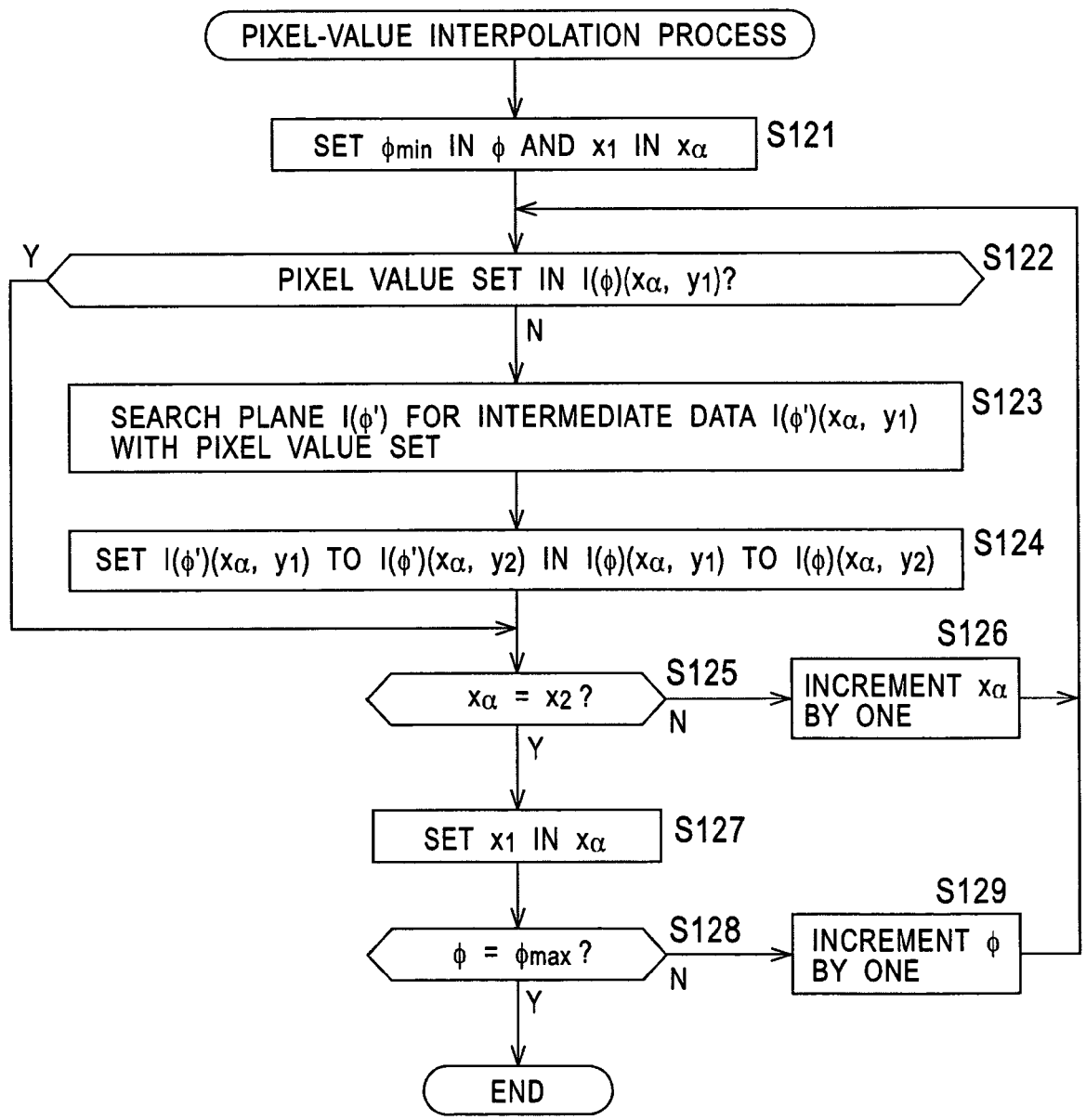
FIG. 49 is a flowchart showing a pixel-value interpolation process for interpolating image data that serves as intermediate data.

In the pixel-value interpolation process shown in FIG. 49, first, in step S121, the image-data converter 31 sets a initial value, e.g., a minimum value $φ_{min}$, to a variable φ representing a declination angle, and sets an initial value, e.g., a minimum value $x_1$, to a variable $x_α$ representing an x coordinate on the plane I(φ).

The process then proceeds to step S122, in which the image-data converter 31 determines whether a pixel value has been set in intermediate data I(φ) ($x_α$, $y_1$), similarly to step S42 shown in FIG. 32.

In the example described above, the subject for which whether a pixel value is set is determined (hereinafter referred to as a pixel-value determining subject) is intermediate data I(φ) ($x_α$, $y_1$), i.e., a pixel having coordinates ($x_α$, $y_1$) on the plane I(φ), the pixel-value determining subject may be any pixel having a y coordinate $y_α$ in a range of the minimum value $y_1$ to the maximum value $y_2$.

That is, in intermediate data obtained by the image-data conversion process described with reference to FIGS. 46 and 47, in step S110 shown in FIG. 46, pixel values of original image data are set at once to a column represented by coordinates ($x_α$, $y_1$) to ($x_α$, $y_2$) on the plane I(φ). Thus, if a pixel value is not set in one pixel in the column represented by coordinates ($x_α$, $y_1$) to ($x_α$, $y_2$) on the plane I(φ), pixel values are not set either in the other pixels of the column. Thus, the pixel-value determining subject may be any pixel having a y coordinate $y_α$ in a range of the minimum value $y_1$ to the maximum value $y_2$.

If it is determined in step S122 that a pixel value has been set in the intermediate data I(φ) ($x_α$, $y_1$), that is, if the pixel value is not missing, steps S123 and S124 are skipped, and the process proceeds to step S125.

If it is determined in step S122 that a pixel value has not been set in the intermediate data I(φ) ($x_α$, $y_1$), that is, if the pixel value is missing, the process proceeds to step S123. In step S123, the image-data converter 31 searches for a point with a pixel value set from among points ($x_α$, $y_1$) on the plane I(φ') defined by a declination angle θ' in a range of (φ−Δφ) <φ<(φ+Δφ).

Similarly to the case shown in FIG. 32, Δφ is, for example, a small positive integer value.

The process then proceeds to step S124. In step S124, the image-data converter 31 sets the pixel values I(φ') ($x_α$, $y_1$) to I(φ') ($x_α$, $y_2$) of the column of the intermediate data I(φ') ($x_α$, $y_1$) with pixel values set, found in step S123, in the pixel values I(φ) ($x_α$, $y_1$) to I(φ) ($x_α$, $y_2$) of the column of the intermediate data I(φ) ($x_α$, $y_1$). The process then proceeds to step S125. If the number of pixels in the vertical direction of a frame of original image data is N as described earlier, $y_2$ is represented by $y_1$+(N−1).

If a plurality of points with pixel values set is found in step S123 from among the points ($x_α$, $y_1$) on the plane I(φ') defined by a declination angle φ' in a range of (φ−Δφ)<φ<(φ+Δφ), in step S124, the image-data converter 31 selects therefrom, for example, a point with a smallest absolute value of difference in declination angle |φ−φ'|, and sets pixel values I(φ') ($x_α$, $y_1$) to I(φ') ($x_α$, $y_2$) on the column of the I(φ') ($x_α$, $y_1$) selected to pixel values I(φ) ($x_α$, $y_1$) to I(φ) ($x_α$, $y_2$), respectively.

If a pixel with a pixel value set is not found in step S123 from among the points ($x_α$, $y_1$) on the plane I(φ') defined by a declination angle φ' in a range of (φ−Δφ)<φ<(φ+Δφ), in step S124, the image data converter 31 searches for a pixel that is closest to the coordinates ($x_α$, $y_1$) from pixels with pixel values set on the plane I(θ, φ), and sets the pixel values of pixels on the column of the pixel in pixel values I(φ) ($x_α$, $y_1$) to I(φ) ($x_α$, $y_2$), respectively.

In the pixel-value interpolation process shown in FIG. 49, similarly to the case shown in FIG. 32, pixel values are interpolated at points ($x_α$, $y_α$) with pixel values not set on the plane I(θ, φ). Thus, it could occur that pixel values interpolated at some points causes interpolation of pixel values at other points as the process proceeds. In order to prevent this, for example, similarly to the case of FIG. 32, interpolation flags representing that interpolation has been executed to points at which pixel values have been interpolated, inhibiting use of pixel values at points with interpolation flags attached for interpolation (exempted from the searching in step S123).

In step S125, the image-data converter 31 determines whether the variable $x_α$ representing an x coordinate on the plane I(θ, φ) is equal to the maximum value $x_2$ thereof. If it is determined in step S125 that the x coordinate $x_α$ is not equal to the maximum value $x_2$, the process proceeds to step S126, in which the image-data converter 31 increments the x coordinate $x_\alpha$ by one. The process then returns to step S122, and then the same process is repeated.

On the other hand, if it is determined in step S125 that the x coordinate $x_\alpha$ is equal to the maximum value $x_2$, the process proceeds to step S127, in which the image-data converter 31 resets the x coordinate $x_\alpha$ to the minimum value x1 thereof. The process then proceeds to step S128.

In step S128, the image-data converter 31 determines whether the variable $\phi$ representing a declination angle is equal to the maximum value $\phi_{max}$ thereof. If it is determined in step S128 that the declination angle $\phi$ is not equal to the maximum value $\phi_{max}$, the process proceeds to step S129, in which the image-data converter 31 increments the declination angle $\phi$ by one degree. The process then returns to step S122, and the same process is repeated.

On the other hand, if it is determined in step S128 that the declination angle $\phi$ is equal to the maximum value $\phi_{max}$, the process is exited.

In the pixel-value interpolation process shown in FIG. 49, similarly to the case of FIG. 32, if pixel values $I(\phi)(x_\alpha, y_1)$ to $I(\phi)(x_\alpha, y_2)$ of a column on the plane $I(\theta, \phi)$ are missing, the missing pixel values $I(\phi)(x_\alpha, y_1)$ to $I(\phi)(x_\alpha, y_2)$ are interpolated using pixel values $I(\phi')(x_\alpha, y_1)$ to $I(\phi')(x_\alpha, y_2)$ of the same column on another plane $I(\phi')$ with pixel values set, that is most approximate in terms of the declination angle.

According to the pixel-value interpolation process shown in FIG. 49, as described with reference to FIG. 42, intermediate data that is obtained is the same as intermediate data obtained by extracting a strip image for the same direction of declination angle from each frame of original image data and arranging the strip images in order of the frames from right to left. Thus, in the image-data converter 31, when intermediate data is generated based on strip images as described with reference to FIG. 42, missing pixel values do not occur, so that the pixel-value interpolation process shown in FIG. 49 need not be executed.

On intermediate data obtained by the pixel-value interpolation process shown in FIG. 49, the classification-adaptation process described earlier, and other image processing can be executed.

The format of intermediate data may be the same format in the case of FIGS. 35A and 35B, as well as the format described with reference to FIGS. 48A and 48B.

Next, an intermediate-data conversion process executed in step S85 shown in FIG. 40 by the intermediate-data converter 32 shown in FIG. 38, i.e., a process of converting intermediate data into an n-th frame of image data as viewed from a user's viewpoint (presentation image data), will be described with reference to a flowchart shown in FIG. 50 and FIG. 51.

Figure 50:
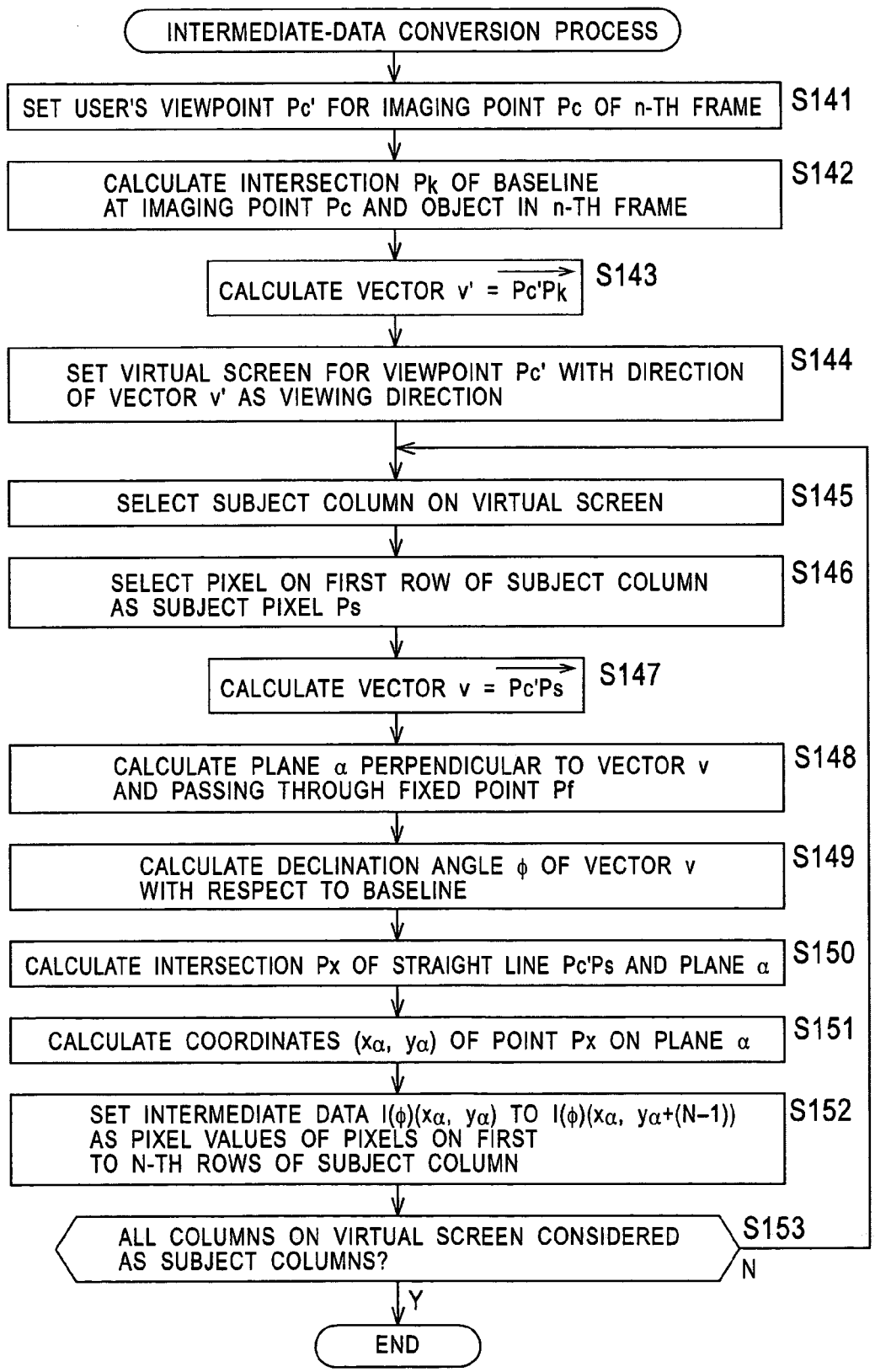
FIG. 50 is a flowchart showing an intermediate-data conversion process for converting intermediate data into presentation image data.

In the intermediate-data conversion process shown in FIG. 50, similarly to the case of FIG. 36, a display coordinate system, i.e., a three-dimensional display coordinate system for displaying an image in accordance with a user's viewpoint, is assumed on the display 6 (FIG. 2). As the display coordinate system, for example, the imaging coordinate system, used when converting original image data stored in the image database 2 into intermediate data, can be used.

First, in step S141, the intermediate-data converter 32 sets a user's viewpoint $P_c'$ for an imaging point $P_c$ in an n-th frame in the display coordinate system.

That is, in the intermediate-data conversion process shown in FIG. 50, processing is executed with reference to an imaging point Pc of a frame currently being processed. Thus, in step S141, a user's viewpoint $P_c'$ is set with reference to an imaging point $P_c$ of a frame that is currently being played back.

More specifically, the intermediate-data converter 32 receives a user's viewpoint in the real world from the sensor controller 33. The intermediate-data converter 32 calculates movement information representing movement of the user's viewpoint from the sensor controller 33 with respect to a predetermined point in the real world as a reference point for the user's viewpoint. The reference point for the user's viewpoint may be a typical position where the user views an image displayed on the display 6, for example, an arbitrary point in front of the display 6.

Figure 51:
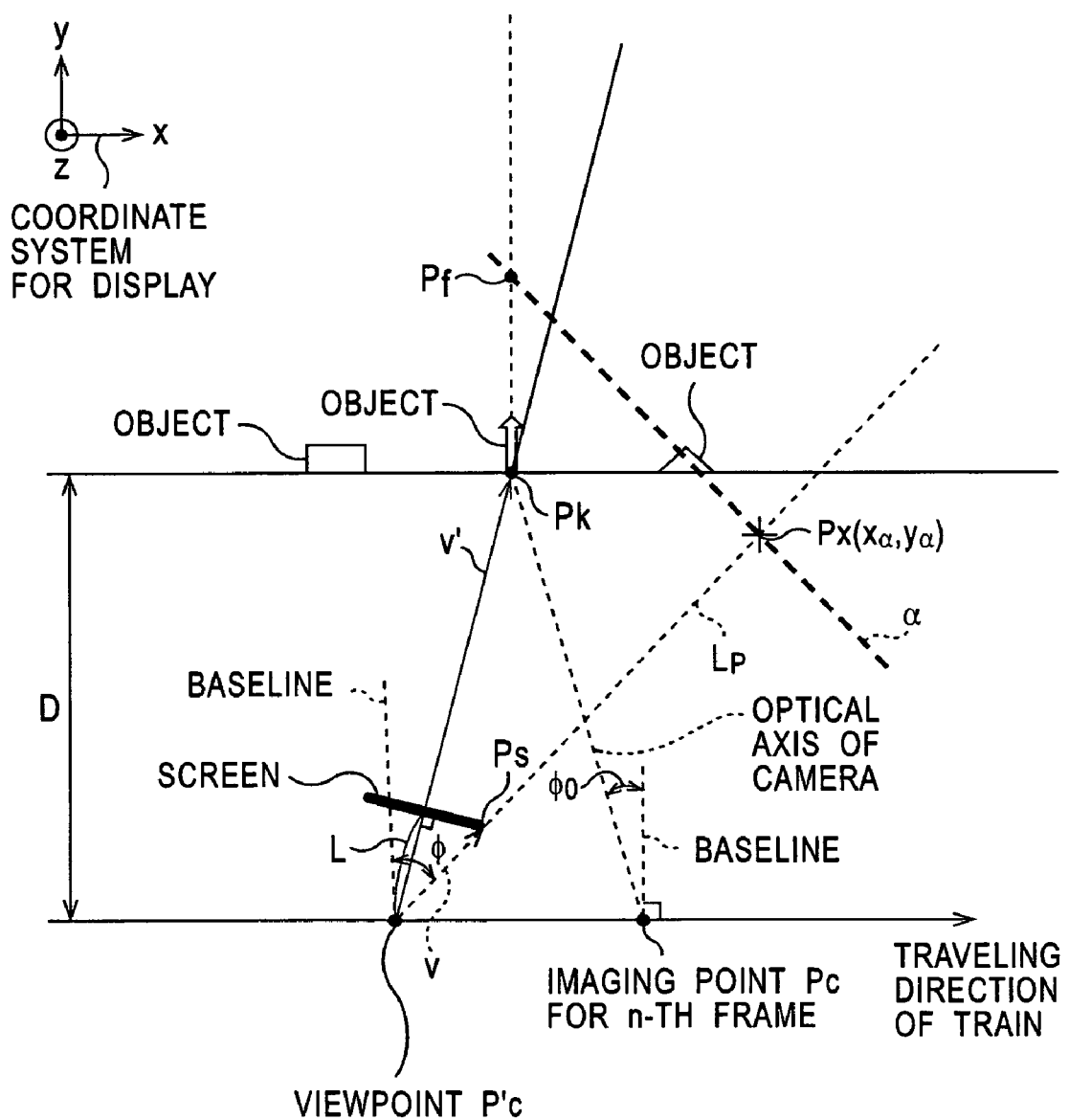
FIG. 51 is a diagram showing an intermediate-data conversion process for converting intermediate data into presentation image data.

Upon calculating the movement information, the intermediate-data converter 32 sets, as a user's viewpoint $P_c'$ for the imaging point $P_c$, a point shifted by the movement information from the imaging point $P_c$ in the n-th frame in the display coordinate system, as shown in FIG. 51.

In the intermediate-data conversion process shown in FIG. 50, similarly to the image-data conversion process shown in FIG. 46, the latitudinal direction is neglected. Thus, in the intermediate-data conversion process shown in FIG. 50, for example, as shown in FIG. 51, assuming a display coordinate system in which an x axis, a y axis, and a z axis are taken similarly to the imaging coordinate system shown in FIG. 47, components in the y axis direction and the z axis direction, which affect in the latitudinal direction, are neglected (e.g., considered as 0). This indicates that movement in the user's viewpoint is not recognized even if the user moves in the y axis direction or the z axis direction of the display coordinate system. This is because data corresponding to the movement in the user's viewpoint has not been generated. (If such data has been generated, components of movement in the z axis and y axis directions may be considered as valid.) That is, in order that movement in the user's viewpoint be recognized, the user must move at least in the x axis direction of the display coordinate system. In this embodiment, the x axis direction in the display coordinate system (and also in the imaging coordinate system) coincides with the direction of movement of the camera (the traveling direction of the train on which the camera is fixed).

The intermediate-data converter 32 sets a user's viewpoint $P_c'$ for the imaging point $P_c$ in the display coordinate system in the manner described above. The process then proceeds to step S142, in which the intermediate-data converter 32 calculates an intersection $P_k$ of the optical axis of the camera at the imaging point $P_c$ and an object displayed in the n-th frame, as shown in FIG. 51.

For simplicity of description, it is assumed herein that the distance D between the object and the traveling trajectory of the train on which the camera is fixed is constant and recognized in advance in the intermediate-data converter 32. It is also assumed that the declination angle $\phi_0$ of the optical axis of the camera at the imaging point $P_c$ is recognized in advance in the intermediate-data converter 32. In this case, the intersection $P_k$ of the optical axis of the camera at the imaging point $P_c$ and an object displayed in the n-th frame can be calculated from the imaging point $P_c$, the distance D, and the declination angle $\phi 0$ of the optical axis of the camera at the imaging point $P_c$.

The process then proceeds to step S143, in which the intermediate-data converter 32 calculates a vector v' with the user's viewpoint $P_c'$ as an initial point and the intersection $P_k$ as a terminal point. The process then proceeds to step S144, in which the intermediate-data converter 32 sets a virtual screen for the user's viewpoint $P_c'$ with the direction of the vector v' as a viewing angle, the virtual screen being perpendicular to the vector v' and distant by a distance L from the user's viewpoint $P_c'$. The process then proceeds to step S145. In step S145, the intermediate-data converter 32 selects, as a subject column, a pixel column that has not yet been selected as a subject column from among pixel columns in the vertical direction on the virtual screen set for the user's viewpoint $P_c'$.

When a subject column has been selected in step S145, the process proceeds to step S146, in which the intermediate-data converter 32 selects, for example, similarly to the case of step S104 in FIG. 46, an uppermost pixel among the pixels constituting the subject column, as a subject pixel $P_s$.

The subject pixel $P_s$ is not limited to an uppermost pixel among the pixels constituting the subject column, and a pixel on an arbitrary row can be selected as a subject pixel.

When a subject column has been selected in step S146, the process proceeds to step S147, in which the intermediate-data converter 32 calculates a vector v with the user's viewpoint $P_c'$ as an initial point and the subject pixel $P_s$ as a terminal point, as shown in FIG. 51. The process then proceeds to step S148.

In step S148, the intermediate-data converter 32 calculates a declination angle $\phi$ of the vector v calculated in step S147 with respect to the baseline, i.e., a declination angle $\phi$ of the normal line of the plane $\alpha$ calculated in step S148 with respect to the baseline. The process then proceeds to step S150.

In step S150, the intermediate-data converter 32 calculates a straight line $L_p$ connecting the user's viewpoint $P_c'$ and the subject pixel $P_s$, as shown in FIG. 51. Furthermore, in step S150, the intermediate-data converter 32 calculates an intersection $P_x$ of the straight line $L_p$ and the plane $\alpha$ calculated in step S151, i.e., the plane $I(\phi)$ with a declination angle $\phi$ calculated in step S148 of the normal line with respect to the baseline. The process then proceeds to step S151, in which the intermediate-data converter 32 calculates coordinates $(x_\alpha, y_\alpha)$ of the point $P_x$ on the plane $I(\phi)$.

The process then proceeds to step S152, in which the intermediate-data converter 32 sets pixel values on the column of the point $P_x$ on the plane $I(\phi)$ as respective pixel values of the pixels of the subject column on the virtual screen.

More specifically, assuming that the subject column on the virtual screen is composed of N pixels, the intermediate-data converter 32 the sets a pixel value $I(\theta, \phi)$ $(x_\alpha, y_\alpha)$ on the plane $I(\phi)$ as the pixel value of the pixel on the first row of the subject pixel on the virtual screen, a pixel value $I(\theta, \phi)$ $(x_\alpha, y_\alpha+1)$ on the plane $I(\phi)$ as the pixel value of the pixel on the second row of the subject pixel, . . . and a pixel value $I(\theta, \phi)$ $(x_\alpha, y_\alpha+(N-1))$ on the plane $I(\phi)$ as the pixel value of the pixel on the N-th row of the subject pixel.

The process then proceeds to step S153, in which the intermediate-data converter 32 determines whether all the pixel columns (pixel arrays in the vertical direction) on the virtual screen set for the user's viewpoint $P_c'$ have been considered as subject columns. If it is determined that a pixel column that has not yet been considered as a subject column exists, the process returns to step S145, and then the same process is repeated.

On the other hand, if it is determined in step S153 that all the pixel columns on the virtual screen have been considered as subject pixels, that is, when image data in the n-th frame as viewed from the user's viewpoint (presentation image data) has been formed on the virtual screen, the process is exited.

The presentation image data in the n-th frame, obtained in the manner described above, is displayed on the display 6 in step S86 described earlier with reference to FIG. 40.

Thus, the display 6 displays image data of an object as viewed from a user's viewpoint.

As described above, with the image processing apparatus 1 shown in FIG. 38, from original image data captured while moving a camera linearly substantially at a constant velocity, image data in accordance with a user's viewpoint can be readily generated, similarly to the image processing apparatus 1 shown in FIG. 5. That is, when the user has moved his/her viewpoint, an image corresponding to an object as perceived by the vision of the user when the user is observing the object in the real world can be displayed on the display 6.

In the image processing apparatus 1 shown in FIG. 38, in order to convert original image data into presentation image data as viewed from a user's viewpoint, various imaging conditions for the capture of the original image data by a camera are needed.

In order to convert original image data into presentation image data as viewed from a user's viewpoint, considering the image-data conversion process described with reference to FIG. 46 and the intermediate-data conversion process described with reference to FIG. 50, as imaging conditions, the distance D between the object and the traveling trajectory of the train on which the camera for capturing original image data is fixed (the distance between the camera and the object along a direction perpendicular to the moving direction of the camera, declination angle $\phi_0$ of the optical axis of the camera (direction of the optical axis) at the imaging point $P_c$, and the imaging point $P_c$ for each frame are needed.

In this embodiment, however, it is assumed that the train, and the camera fixed on the train, moves linearly at a constant velocity, regarding imaging points $P_c$ of respective frames, if an imaging point $P_c$ for a frame is known, an imaging point for another frame can be calculated from the velocity of the movement of the camera at a substantially constant velocity (moving velocity of the camera).

The above-described imaging conditions that are at least needed for converting original image data into presentation image data as viewed from a user's viewpoint will be referred to as minimum imaging conditions when appropriate.

The minimum imaging conditions can be obtained by a sensor or the like when the original image data is captured.

If the minimum imaging conditions are known in advance, in the image processing apparatus shown in FIG. 38, as described above, the original image data can be converted into presentation image data as viewed from a user's viewpoint.

On the other hand, if the minimum imaging conditions are not known, in order to convert original image data into presentation image data as viewed from a user's viewpoint, first, the minimum imaging conditions must be obtained.

Thus, in the computer 1 shown in FIG. 1, as well as a program for converting original image data stored in the image database 2 into presentation image data as viewed from a user's viewpoint, a program for executing image processing for obtaining the minimum imaging conditions from the original image data can also be stored.

Figure 52:
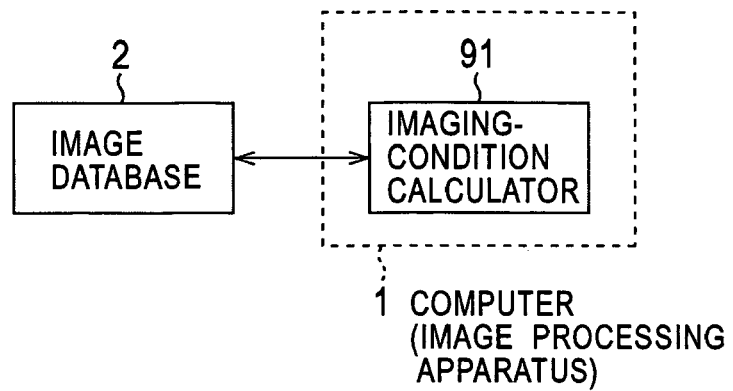
FIG. 52 is a block diagram showing a third example of the functional configuration of the computer 1 as an image processing apparatus.

FIG. 52 shows an example of the functional configuration of an image processing apparatus, implemented by execution of a program of image processing for calculating minimum imaging conditions by the computer 1 shown in FIG. 3.

In the embodiment shown in FIG. 52, the computer 1 as an image processing apparatus includes an imaging-condition calculator 91.

The imaging-condition calculator 91 reads original image data captured by a camera fixed on a train moving linearly at a constant velocity from the image database 2, calculates imaging conditions including a minimum imaging condition from the original image data, and supplies the imaging conditions to the image database 2, where the imaging conditions are stored.

More specifically, the imaging-condition calculator 91 calculates a moving distance of an object displayed in original image data on the virtual screen of the camera fixed on the train moving linearly at a constant velocity, and calculates imaging conditions including a minimum imaging condition using a distance from the camera's viewpoint (imaging point) to the virtual screen (viewpoint/virtual screen distance) and the moving distance of the object on the virtual screen.

Next, a method of calculating imaging conditions by the imaging-condition calculator 91 will be described with reference to FIG. 53.

Figure 53:
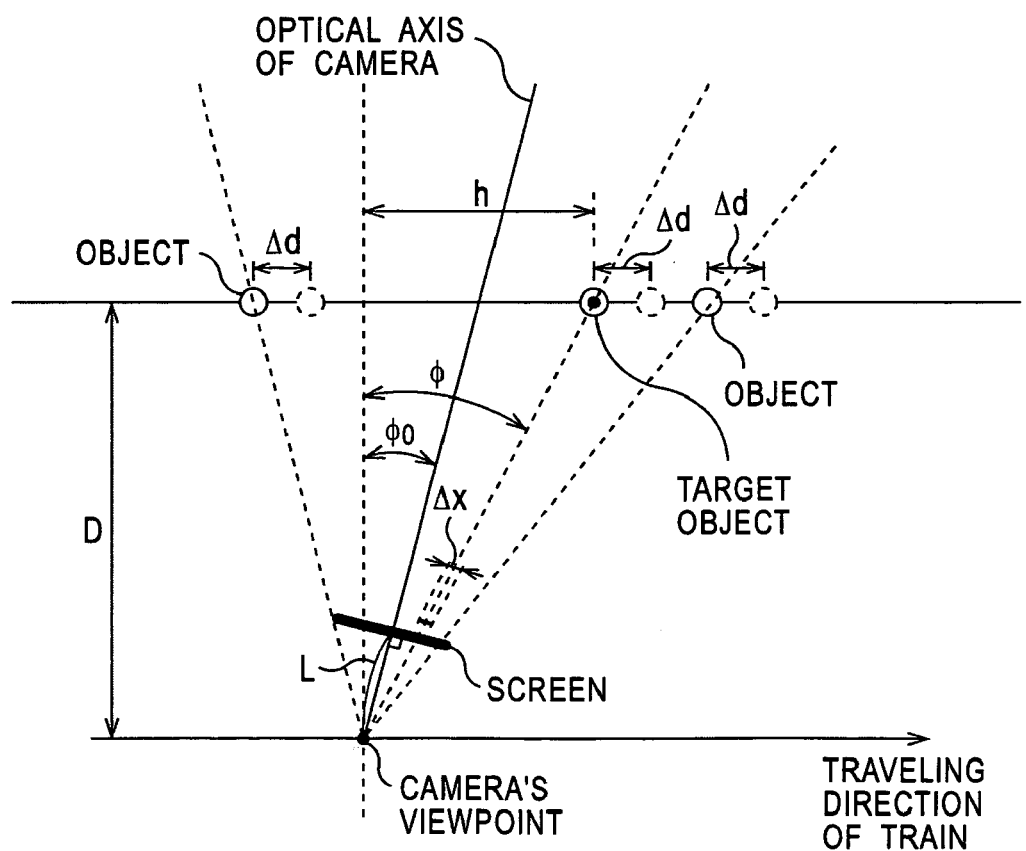
FIG. 53 is a diagram showing a method for calculating imaging conditions.

In FIG. 53, D denotes a distance D between a traveling trajectory of the train on which the camera fixed and a target object that is being considered (distance between the camera and the target object along a direction perpendicular to the moving direction of the camera), and h denotes a distance between the camera and the target object along the moving direction of the camera. L denotes the distance from the camera to the virtual screen, and $\phi_0$ denotes the declination angle of the optical axis of the camera. $\Delta d$ denotes a distance of movement of the target object relative to the camera per unit time, that is, the moving speed of the camera. $\Delta x$ denotes a distance of movement of the target object displayed in the original image data on the virtual screen of the camera per unit time, that is, the moving speed of the target object on the virtual screen.

In this case, the declination angle $\phi$ from the camera's viewpoint in the direction of the target object can be expressed by the following equation using the distances D and h:

$$\phi = \tan^{-1}\frac{h}{D} \tag{31}$$

The moving distance $\Delta x$ of the target object on the virtual screen can be expressed, for example, by the following equation:

$$\Delta x = L(\tan(\phi_+ - \phi_0) - \tan(\phi_- - \phi_0)) \tag{32}$$

In equation (32), $\phi_+$ and $\phi_-$ are given, for example, by the following equations:

$$\phi_+ = \tan^{-1}\frac{h + \frac{\Delta d}{2}}{D} \tag{33}$$

$$\phi_- = \tan^{-1}\frac{h - \frac{\Delta d}{2}}{D}$$

Assigning equations (33) into equation (32) yields the following equation:

$$\frac{\Delta x}{L} = \tan\left(\tan^{-1}\frac{h + \frac{\Delta d}{2}}{D} - \phi_0\right) - \tan\left(\tan^{-1}\frac{h - \frac{\Delta d}{2}}{D} - \phi_0\right) \tag{34}$$

A function f'(t) (derivative) of the function f(t) for the variable t differentiated with respect to the variable t can be expressed by the following equation:

$$f'(t) = \frac{f(t + \Delta t) - f(t)}{\Delta t} \tag{35}$$

Rearranging equation (35) yields the following equation:

$$\Delta t f'(t) = f(t + \Delta t) - f(t) \tag{36}$$

Now, let a function f(h/D) of a variable h/D be defined, for example, as in the following equation:

$$f\left(\frac{h}{D}\right) = \tan\left(\tan^{-1}\frac{h}{D} - \phi_0\right) \tag{37}$$

Equation (34) can be expressed, using the function f(h/D) in equation (37) by the following equation:

$$\frac{\Delta x}{L} = f\left(\frac{h}{D} + \frac{\frac{\Delta d}{2}}{D}\right) - f\left(\frac{h}{D} - \frac{\frac{\Delta d}{2}}{D}\right) \tag{38}$$

Equation (38) can be rearranged, using the relationship of equation (36), as in equation (39):

$$\frac{\Delta x}{L} = \frac{\Delta d}{D} f'\left(\frac{h}{D}\right) \tag{39}$$

Differentiating a function $g_2(g_1(t))$ having a function $g_1(t)$ of the variable t as a parameter with respect to the variable t yields the following equation:

$$\frac{dg_1(g_2(t))}{dt} = \frac{dg_1(g_2(t))}{dg_2(t)} \times \frac{dg_2(t)}{dt} \tag{40}$$

Derivatives of a function tan(t) and a function $\tan^{-1}(t)$ can be expressed by equations (41) and (42), respectively:

$$(\tan t)' = \frac{1}{\cos^2 t} \tag{41}$$

$$(\tan^{-1} t)' = \frac{1}{1 + t^2} \tag{42}$$

From equations (40) to (42), the derivative f'(h/D) of the function f(h/D) in equation (37) can be expressed by the following equation:

$$f'\left(\frac{h}{D}\right) = \frac{1}{\cos^2\left(\tan^{-1}\frac{h}{D} - \phi_0\right)} \times \frac{1}{1 + \left(\frac{h}{D}\right)^2} \tag{43}$$

From equation (43), equation (39) can be expressed as equation (44):

$$\frac{\Delta x}{L} = \frac{\Delta d}{D} \frac{1}{\cos^2\left(\tan^{-1}\frac{h}{D} - \phi_0\right) \cdot \left(1 + \left(\frac{h}{D}\right)^2\right)} \tag{44}$$

In equation (44), unknown variables are $\Delta d$, D, h, and $\phi_0$. In equation (44), $\Delta x$ denotes a moving distance of a target object displayed on the virtual screen, and can be calculated from pixels showing the target object on the virtual screen. Furthermore, in equation (44), L denotes the distance from the camera's viewpoint to the virtual screen, which can be set to an arbitrary value.

Thus, in principle, by calculating moving distances of four pixels on the virtual screen, the four unknown variables $\Delta d$, D, h, and $\phi_0$ in equation (44) can be estimated using the moving distances and the distance L from the camera's viewpoint to the virtual screen.

According to the method described with reference to FIG. 53, in addition to minimum imaging conditions including the distance D between the camera and the object along a direction perpendicular to the moving direction of the camera, the declination angle $\phi_0$ of the optical axis of the camera at the imaging point $P_c$, and the moving speed $\Delta d$ of the camera, imaging conditions including the distance h between the camera and the target object along the moving direction of the camera are calculated.

The imaging-condition calculator 91 shown in FIG. 52 calculates the imaging conditions $\Delta d$, D, h, and $\phi_0$ in the manner described above.

Figure 54:
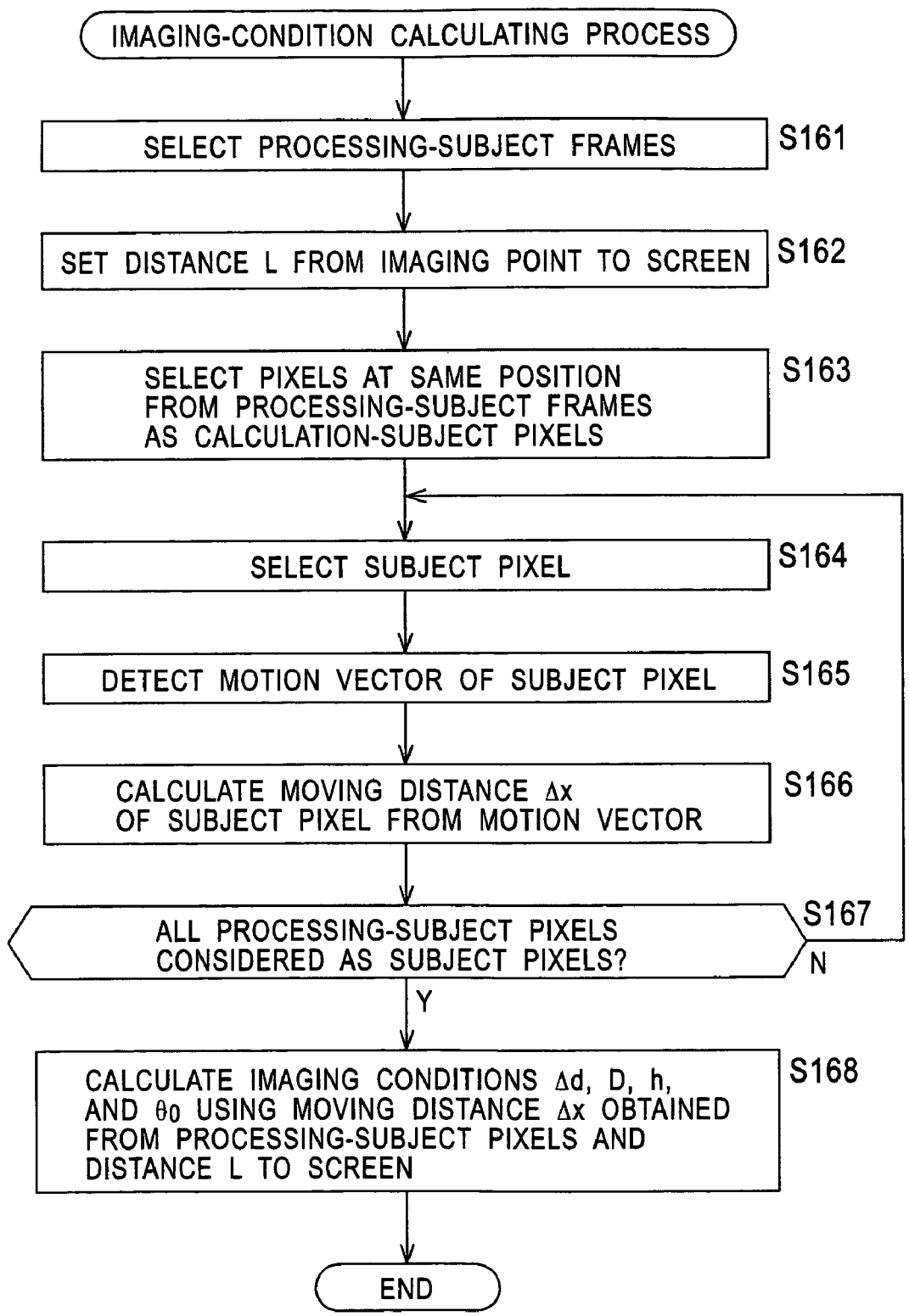
FIG. 54 is a flowchart showing an imaging-condition calculating process for estimating imaging conditions.

Now, a process executed by the imaging-condition calculator 91 shown in FIG. 52 (imaging-condition calculating process for estimating imaging conditions) will be described with reference to a flowchart shown in FIG. 54.

First, in step S161, the imaging-condition calculator 91 selects four or more frames that are to be considered in the imaging-condition calculating process as processing-subject frames, from among frames stored in the image database 2. The process then proceeds to step S162.

In step S162, the imaging-condition calculator 91 set a predetermined value as the distance L from the imaging point from which original image was captured to the screen. The process then proceeds to step S163.

In step S163, the imaging-condition calculator 91 selects pixels at the same position from the respective frames of the four or more frames of original image data selected as processing-subject frames in step S161, as calculation-subject pixels used for calculating imaging conditions.

The pixels at the same position of the respective processing-subject frames are herein selected as calculation-subject pixels in order that the distance h between the camera and the target object along the moving direction of the camera, shown in FIG. 53, be a constant value.

The process then proceeds to step S164, in which the imaging-condition calculator 91 selects, as a subject pixel, a pixel that has not yet been considered as a subject pixel from among the calculation-subject pixels. The process then proceeds to step S165.

In step S165, the imaging-condition calculator 91 detects a motion vector of the subject pixel. The process then proceeds to step S166, in which the imaging-condition calculator 91 calculates a moving distance $\Delta x$ of the subject pixel from the motion vector of the subject pixel. The process then proceeds to step S167.

In step S167, the imaging-condition calculator 91 determines whether all the calculation-subject pixels have been considered as subject pixels and moving distances $\Delta x$ have been calculated therefore. If it is determined that a calculation-subject pixel that has not yet been considered as a subject pixel exists, the process returns to step S164, and the same process is repeated.

On the other hand, if it is determined in step S167 that all calculation-subject pixels have been considered as subject pixels, the process proceeds to step S168. In step S168, the imaging-condition calculator 91 calculates imaging conditions $\Delta d$, D, h, and $\phi_0$ from equation (44), using the moving distances $\Delta x$ calculated respectively for the four or more pixels selected as calculation-subject pixels and the distance L from the imaging point from which original image data was captured to the screen, and stores the imaging conditions in the image database 2. The process is then exited.

In step S167, $\Delta d$, D, h, and $\phi_0$ that satisfy equation (44) for the moving directions $\Delta x$ calculated respectively for the four or more calculation-subject pixels and the distance L from the imaging point from which original image data was captured to the screen are calculated. $\Delta d$, D, h, and $\phi_0$ are calculated, for example, by sequentially changing the respective values and testing (checking) whether equation (44) is satisfied.

As described above, the moving distance $\Delta x$ of an object displayed in original image data on the virtual screen of the camera, captured with the camera being moved, is calculated, and imaging conditions $\Delta d$, D, h, and $\phi_0$ are calculated using the distance L from the viewpoint from which original image data was captured by the camera to the virtual screen and the moving distance $\Delta$. Thus, imaging conditions can be readily calculated from the original image data captured with the camera being moved.

Furthermore, using the imaging conditions, original image data can be converted into presentation image data as viewed from a user's viewpoint.

In this embodiment, the various processes described above are executed by the computer 1 executing programs. Alternatively, however, the various processes described above may be executed by special hardware.

Regarding acquisition of image data, data corresponding to intermediate data can be obtained by capturing an omnidirectional image of an object using a camera having a telecentric lens. In that case, work of complex conversion is not needed, so that intermediate data can be readily obtained.

INDUSTRIAL APPLICABILITY

As described above, according to the present invention, for example, even a real image actually captured can be readily changed in accordance with a user's viewpoint.

The invention claimed is:

1. An image processing apparatus for converting first image data into second image data comprising:
    setting means for setting a user's viewpoint at a designated position;
    converting means for converting intermediate data into second image data as viewed from the user's viewpoint, the intermediate data being image data based on pixel values corresponding to light rays incident on pixels of the first image data, using light-ray information representing trajectories of light rays for the capture of the first image data and representing pixel values corresponding to the light rays; and
    interpolating means for interpolating a missing pixel value of the intermediate data using at least one pixel value that is on adjacent planes, an adjacent plane associated with a different view point from the same designated position, the at least one pixel value having same coordinates as the missing pixel value,
    wherein each missing pixel that has an interpolated pixel value is excluded from being used in an interpolation process of another missing pixel.

2. An image processing apparatus according to claim 1, wherein the setting means detects a position of a user and sets the user's viewpoint at the detected position.

3. An image processing apparatus according to claim 1, wherein the first image data is image data of an image representing a designated object as imaged from a plurality of view points.

4. An image processing apparatus according to claim 1, wherein the first image data is captured by an imaging apparatus for capturing the first image data while moving the imaging apparatus linearly.

5. An image processing apparatus according to claim 1, wherein the converting means converts the first image data into the second image data using light-ray information that passes through a predetermined curved surface when the first image data is captured and light-ray information that coincides with light-ray information directed from the user's viewpoint to the predetermined curved surface.

6. An image processing apparatus according to claim 5, wherein the predetermined curved surface is either an open curved surface, or a closed curved surface surrounding a designated object.

7. An image processing apparatus according to claim 1, wherein the converting means comprises intermediate-data converting means for converting intermediate data into the second image data, and
wherein the intermediate data includes image data in a predetermined format and is composed of pixel values corresponding to light rays incident on pixels constituting the first image data.

8. An image processing apparatus according to claim 7, wherein the intermediate data is image data in which pixel values of predetermined pixels constituting the first image data are pixel values at intersections of light rays incident on the predetermined pixels and a plane perpendicular to the light rays and passing through a predetermined point.

9. An image processing apparatus according to claim 7, wherein the intermediate data is image data representing, for each direction of the light rays incident on the pixels constituting the first image data, pixel values corresponding to the light rays incident in a direction perpendicular to a plane that is perpendicular to a direction of the light rays, for respective points on the plane.

10. An image processing apparatus according to claim 7, wherein the intermediate data is image data representing, for respective points on a plane perpendicular to a direction of the light rays incident on the pixels constituting the first image data, pixel values corresponding to the light rays in each direction perpendicular to the plane.

11. An image processing apparatus according to claim 7, wherein the intermediate-data converting means uses, as pixel values of pixels on a virtual screen that is a predetermined virtual screen, pixel values corresponding to the light rays that coincide with straight lines connecting the user's viewpoint and the pixels on the virtual screen in the intermediate data, and uses image data composed of the pixel values on the virtual screen as the second image data.

12. An image processing apparatus according to claim 7, wherein the converting means further comprises first image-data converting means for converting the first image data into the intermediate data, and
wherein the intermediate-data converting means converts the intermediate data output from the first image-data converting means into the second image data.

13. An image processing apparatus according to claim 12, wherein the first image-data converting means converts the first image data into the intermediate data that is image data in which pixel values of designated pixels constituting the first image data are pixel values at intersections of light rays incident on the predetermined pixels and a plane perpendicular to the light rays and passing through a predetermined point.

14. An image processing apparatus according to claim 12, wherein the first image-data converting means converts the first image data into the intermediate data that is image data representing, for each direction of the light rays incident on the pixels constituting the first image data, pixel values corresponding to the light rays incident in a direction perpendicular to a plane that is perpendicular to a direction of the light rays, for respective points on the plane.

15. An image processing apparatus according to claim 12, wherein the first image-data converting means converts the first image data into the intermediate data that is image data representing, for respective points on a plane perpendicular to a direction of the light rays incident on the pixels constituting the first image data, pixel values corresponding to the light rays in each direction perpendicular to the plane.

16. An image processing apparatus according to claim 12, wherein the intermediate-data converting means uses, as pixel values at intersections of the light rays and a plane perpendicular to the light rays and passing through a predetermined point, pixel values corresponding to the light rays that coincide with straight lines connecting a viewpoint for the capture of the first image data and pixels of the first image data on a virtual screen that is a predetermined virtual screen, and uses image data composed of the pixel values at the intersections on the plane as the intermediate data.

17. An image processing apparatus according to claim 7, wherein the intermediate data is image data in which pixel values of designated pixels constituting the first image data are pixel values at intersections of light rays incident on the predetermined pixels and a plane perpendicular to the light rays and passing through a predetermined point, and wherein the image processing apparatus further comprises interpolating means for interpolating pixel values at points other than the intersections with the light rays on the plane passing through the predetermined point.

18. An image processing apparatus according to claim 17, wherein the interpolating means interpolates the pixel values at the points other than the intersections with the light rays on the plane passing through the predetermined point, by pixel values at intersections of another plane passing through the predetermined point and light rays perpendicular to the another plane.

19. An image processing apparatus according to claim 1, further comprising display means for displaying the second image data.

20. An image processing method utilized by an image processing apparatus that converts first image data into second image data, the image processing method comprising:
a setting step of setting a user's viewpoint at a designated position;
a converting step of converting intermediate data into second image data as viewed from the user's viewpoint, the intermediate data being image data based on pixel values corresponding to light rays incident on pixels of the first image data, using light-ray information representing trajectories of light rays for the capture of the first image data and representing pixel values corresponding to the light rays; and
an interpolating step of interpolating a missing pixel value of the intermediate data using at least one pixel value that is on adjacent planes, an adjacent plane associated with a different view point from the same designated position, the at least one pixel value having same coordinates as the missing pixel value,
wherein each missing pixel that has an interpolated pixel value is excluded from being used in an interpolation process of another missing pixel.

21. An image processing method according to claim 20, wherein the setting step detects a position of a user and sets the user's viewpoint at the detected position.

22. An image processing method according to claim 20, wherein the first image data is image data of an image representing a designated object as imaged from a plurality of view points.

23. An image processing method according to claim 20, wherein the first image data is captured by an imaging apparatus for capturing the first image data while moving the imaging apparatus linearly.

24. An image processing method according to claim 20, wherein the first converting step converts the first image data into the second image data using light-ray information that passes through a predetermined curved surface when the first image data is captured and light-ray information that coincides with light-ray information directed from the user's viewpoint to the predetermined curved surface.

25. An image processing method according to claim 24, wherein the predetermined curved surface is either an open curved surface, or a closed curved surface surrounding a designated object.

26. An image processing method according to claim 20, wherein the first converting step comprises an intermediate-data converting step of converting intermediate data into the second image data, and
wherein the intermediate data includes image data in a predetermined format and is composed of pixel values corresponding to light rays incident on pixels constituting the first image data.

27. An image processing method according to claim 26, wherein the intermediate data is image data in which pixel values of predetermined pixels constituting the first image data are pixel values at intersections of light rays incident on the predetermined pixels and a plane perpendicular to the light rays and passing through a predetermined point.

28. An image processing method according to claim 26, wherein the intermediate data is image data representing, for each direction of the light rays incident on the pixels constituting the first image data, pixel values corresponding to the light rays incident in a direction perpendicular to a plane that is perpendicular to a direction of the light rays, for respective points on the plane.

29. An image processing method according to claim 26, wherein the intermediate data is image data representing, for respective points on a plane perpendicular to a direction of the light rays incident on the pixels constituting the first image data, pixel values corresponding to the light rays in each direction perpendicular to the plane.

30. An image processing method according to claim 26, wherein the intermediate-data converting step uses, as pixel values of pixels on a virtual screen that is a predetermined virtual screen, pixel values corresponding to the light rays that coincide with straight lines connecting the user's viewpoint and the pixels on the virtual screen in the intermediate data, and uses image data composed of the pixel values on the virtual screen as the second image data.

31. An image processing method according to claim 26, wherein the first converting step further comprises a first image-data converting step of converting the first image data into the intermediate data, and wherein the intermediate-data converting step converts the intermediate data into the second image data.

32. An image processing method according to claim 31, wherein the first image-data converting step converts the first image data into the intermediate data that is image data in which pixel values of designated pixels constituting the first image data are pixel values at intersections of light rays incident on the predetermined pixels and a plane perpendicular to the light rays and passing through a predetermined point.

33. An image processing method according to claim 31, wherein the first image-data converting step converts the first image data into the intermediate data that is image data representing, for each direction of the light rays incident on the pixels constituting the first image data, pixel values corresponding to the light rays incident in a direction perpendicular to a plane that is perpendicular to a direction of the light rays, for respective points on the plane.

34. An image processing method according to claim 31, wherein the first image-data converting step converts the first image data into the intermediate data that is image data representing, for respective points on a plane perpendicular to a direction of the light rays incident on the pixels constituting the first image data, pixel values corresponding to the light rays in each direction perpendicular to the plane.

35. An image processing method according to claim 31, wherein the intermediate-data converting step uses, as pixel values at intersections of the light rays and a plane perpendicular to the light rays and passing through a predetermined point, pixel values corresponding to the light rays that coincide with straight lines connecting a viewpoint for the capture of the first image data and pixels of the first image data on a virtual screen that is a predetermined virtual screen, and uses image data composed of the pixel values at the intersections on the plane as the intermediate data.

36. An image processing method according to claim 26, wherein the intermediate data is image data in which pixel values of designated pixels constituting the first image data are pixel values at intersections of light rays incident on the predetermined pixels and a plane perpendicular to the light rays and passing through a predetermined point, and wherein the image processing method further comprises an interpolating step of interpolating pixel values at points other than the intersections with the light rays on the plane passing through the predetermined point.

37. An image processing method according to claim 36, wherein the interpolating step interpolates the pixel values at the points other than the intersections with the light rays on the plane passing through the predetermined point, by pixel values at intersections of another plane passing through the predetermined point and light rays perpendicular to the another plane.

38. An image processing method according to claim 20, further comprising a display step of displaying the second image data.

39. A non-transitory program recording medium having recorded thereon a program for allowing a computer to execute image processing for converting first image data into second image data, the program comprising:
a setting step of setting a user's viewpoint at a designated position;
a converting step of converting intermediate data into second image data as viewed from the user's viewpoint, the intermediate data being image data based on pixel values corresponding to light rays incident on pixels of the first image data, using light-ray information representing trajectories of light rays for the capture of the first image data and representing pixel values corresponding to the light rays; and an interpolating step of interpolating a missing pixel value of the intermediate data using at least one pixel value that is on adjacent planes, an adjacent plane associated with a different view point from the same designated position, the at least one pixel value having same coordinates as the missing pixel value, wherein each missing pixel that has an interpolated pixel value is excluded from being used in an interpolation process of another missing pixel.

40. An image processing apparatus for converting image data comprising:

obtaining means for obtaining the image data captured from a plurality of viewpoints;

converting means for converting the image data into intermediate data; and interpolating means for interpolating a missing pixel value of the intermediate data using at least one pixel value that is on adjacent planes, an adjacent plane associated with a different view point from the same designated position, the at least one pixel value having same coordinates as the missing pixel value, wherein the intermediate data includes image data in which pixel values of predetermined pixels constituting the image data are pixel values at intersections of light rays incident on the predetermined pixels and a plane perpendicular to the light rays and passing through a predetermined point, wherein each missing pixel that has an interpolated pixel value is excluded from being used in an interpolation process of another missing pixel.

41. An image processing apparatus according to claim 40, wherein the converting means converts the image data into the intermediate data that is image data representing, for each direction of the light rays incident on the pixels constituting the first image data, pixel values corresponding to the light rays incident in a direction perpendicular to a plane that is perpendicular to a direction of the light rays, for respective points on the plane.

42. An image processing apparatus according to claim 40, wherein the converting means converts the image data into the intermediate data that is image data representing, for respective points on a plane perpendicular to a direction of the light rays incident on the pixels constituting the first image data, pixel values corresponding to the light rays in each direction perpendicular to the plane.

43. An image processing apparatus according to claim 40, wherein the converting means uses, as pixel values at intersections of the light rays and a plane perpendicular to the light rays and passing through a predetermined point, pixel values corresponding to the light rays that coincide with straight lines connecting a viewpoint for the capture of the image data and pixels of the first image data on a virtual screen that is a predetermined virtual screen, and uses image data composed of the pixel values at the intersections on the plane as the intermediate data.

44. An image processing apparatus according to claim 40, wherein the intermediate data is image data in which pixel values of predetermined pixels constituting the image data are pixel values at intersections of light rays incident on the predetermined pixels and a plane perpendicular to the light rays and passing through a predetermined point, and wherein the image processing apparatus further comprises interpolating means for interpolating pixel values at points other than the intersections with the light rays on the plane passing through the predetermined point.

45. An image processing apparatus according to claim 44, wherein the interpolating means interpolates the pixel values at the points other than the intersections with the light rays on the plane passing through the predetermined point, by pixel values at intersections of another plane passing through the predetermined point and light rays perpendicular to the another plane.

46. An image processing method utilized by an image processing apparatus that converts image data, the image processing method comprising:

an obtaining step of obtaining the image data captured from a plurality of viewpoints;

a converting step of converting the image data into intermediate data, the intermediate data being image data in which pixel values of predetermined pixels constituting the image data are pixel values at intersections of light rays incident on the predetermined pixels and a plane perpendicular to the light rays and passing through a predetermined point; and an interpolating step of interpolating a missing pixel value of the intermediate data using at least one pixel value that is on adjacent planes, an adjacent plane associated with a different view point from the same designated position, the at least one pixel value having same coordinates as the missing pixel value, wherein each missing pixel that has an interpolated pixel value is excluded from being used in an interpolation process of another missing pixel.

47. An image processing method according to claim 46, wherein the converting step converts the image data into the intermediate data that is image data representing, for each direction of the light rays incident on the pixels constituting the first image data, pixel values corresponding to the light rays incident in a direction perpendicular to a plane that is perpendicular to the direction of the light rays, for respective points on the plane.

48. An image processing method according to claim 46, wherein the converting step converts the image data into the intermediate data that is image data representing, for respective points on a plane perpendicular to a direction of the light rays incident on the pixels constituting the first image data, pixel values corresponding to the light rays in each direction perpendicular to the plane.

49. An image processing method according to claim 46, wherein the converting step uses, as pixel values at intersections of the light rays and a plane perpendicular to the light rays and passing through a predetermined point, pixel values corresponding to the light rays that coincide with straight lines connecting a viewpoint for the capture of the image data and pixels of the first image data on a virtual screen that is a predetermined virtual screen, and uses image data composed of the pixel values at the intersections on the plane as the intermediate data.

50. An image processing method according to claim 46, wherein the intermediate data is image data in which pixel values of predetermined pixels constituting the image data are pixel values at intersections of light rays incident on the predetermined pixels and a plane perpendicular to the light rays and passing through a predetermined point, and wherein the image processing method further comprises an interpolating step of interpolating pixel values at points other than the intersections with the light rays on the plane passing through the predetermined point.

51. An image processing method according to claim 50,
wherein the interpolating step interpolates the pixel values at the points other than the intersections with the light rays on the plane passing through the predetermined point, by pixel values at intersections of another plane passing through the predetermined point and light rays perpendicular to the another plane.

52. A non-transitory program recording medium having recorded thereon a program for allowing a computer to execute image processing for converting image data, the program comprising:
an obtaining step of obtaining the image data captured from a plurality of viewpoints;
a converting step of converting the image data into intermediate data; and
an interpolating step of interpolating a missing pixel value of the intermediate data using at least one pixel value that is on adjacent planes, an adjacent plane associated with a different view point from the same designated position, the at least one pixel value having same coordinates as the missing pixel value,
wherein the intermediate data includes image data in which pixel values of predetermined pixels constituting the image data are pixel values at intersections of light rays incident on the predetermined pixels and a plane perpendicular to the light rays and passing through a predetermined point, and
wherein each missing pixel that has an interpolated pixel value is excluded from being used in an interpolation process of another missing pixel.

53. A non-transitory computer-readable medium having recorded thereon a computer executable program, when executed by a computer, controlling the computer to create a data structure of a first image data to be converted to a second image data:
wherein intersections of light rays incident on a plane perpendicular to the light rays and passing through a predetermined point serve as pixels of the second image data,
wherein pixel values of the intersections are used as pixel values of intersections of the light rays incident on predetermined pixels of the first image data,
wherein a missing pixel in the second image data is interpolated by using at least one pixel value that is on adjacent planes, an adjacent plane associated with a different view point from the same designated position, the at least one pixel value having same coordinates as the missing pixel value, and
wherein each missing pixel that has an interpolated pixel value is excluded from being used in an interpolation process of another missing pixel.

54. A non-transitory computer-readable medium according to claim 53,
wherein, for each direction of light rays incident on pixels constituting the original image data, pixel values corresponding to the light rays incident in a direction perpendicular to a plane that is perpendicular to the direction of the light rays, for respective points on the plane, are arranged.

55. A non-transitory computer-readable medium according to claim 53,
wherein, for respective points on a plane perpendicular to a direction of light rays incident on pixels constituting the original image data, pixel values corresponding to the light rays in each direction perpendicular to the plane are arranged.

56. A non-transitory computer-readable medium according to claim 53,
wherein pixel values at points other than the intersections with the light rays on the plane passing through the predetermined point are interpolated.

57. A non-transitory computer-readable medium according to claim 56,
wherein the pixel values at the points other than the intersections with the light rays on the plane passing through the predetermined point are interpolated by pixel values at intersections of another plane passing through the predetermined point and light rays perpendicular to the another plane.

58. An image processing apparatus comprising:
intermediate-data output means for outputting intermediate data in a predetermined format,
wherein the intermediate data is converted from a first image data and includes pixel values corresponding to light rays from an object and a missing pixel value of the intermediate data is interpolated by using at least one pixel value that is on adjacent planes, an adjacent plane associated with a different view point from the same designated position, the at least one pixel value having same coordinates as the missing pixel value;
viewpoint output means for outputting position information of a viewpoint for the object; and
intermediate-data converting means for generating an image of the object as viewed from the viewpoint, using the intermediate data,
wherein each missing pixel that has an interpolated pixel value is excluded from being used in an interpolation process of another missing pixel.

59. An image processing apparatus according to claim 58,
wherein the intermediate data is data in a predetermined format, in which pixel values corresponding to the light rays from the object and a direction of the light rays are associated with each other.

60. An image processing apparatus according to claim 58,
wherein the intermediate data is data in which a direction of the light rays from the object, positions of respective points on a plane that is perpendicular to the direction of the light rays and passing through a predetermined point, and pixel values corresponding to the light rays incident on the respective points in a direction perpendicular to the plane are associated with each other.

61. An image processing apparatus according to claim 60,
wherein the intermediate data is image data representing the pixel values for the positions of the respective points with regard to the direction of the light rays.

62. An image processing apparatus according to claim 60,
wherein the intermediate data is image data representing the pixel values for the respective points on the plane with regard to each direction of the light rays.

63. An image processing apparatus according to claim 59,
wherein the intermediate-data converting means uses, as pixel values of pixels on a virtual screen that is a predetermined virtual screen, pixel values corresponding to the light rays that coincide with straight lines connecting the viewpoint and the pixels on the virtual screen in the intermediate data, and uses image data composed of the pixel values on the virtual screen as an image of the object as viewed from the viewpoint.

64. An image processing apparatus according to claim 60, further comprising interpolating means for interpolating missing pixel values on the plane passing through the predetermined point.

65. An image processing apparatus according to claim 58, further comprising display means for displaying an image of the object as viewed from the viewpoint.

66. An image processing method utilized by an image processing apparatus comprising:
- an intermediate-data output step of outputting intermediate data in a predetermined format,
- wherein the intermediate data is converted from a first image data and includes pixel values corresponding to light rays from an object and a missing pixel value of the intermediate data is interpolated by using at least one pixel value that is on adjacent planes, an adjacent plane associated with a different view point from the same designated position, the at least one pixel value having same coordinates as the missing pixel value;
- a viewpoint output step of outputting position information of a viewpoint for the object; and
- an intermediate-data converting step of generating an image of the object as viewed from the viewpoint, using the intermediate data,
- wherein each missing pixel that has an interpolated pixel value is excluded from being used in an interpolation process of another missing pixel.

67. An image processing method according to claim 66, wherein the intermediate data is data in a predetermined format, in which pixel values corresponding to the light rays from the object and a direction of the light rays are associated with each other.

68. An image processing method according to claim 66, wherein the intermediate data is data in which a direction of the light rays from the object, positions of respective points on a plane that is perpendicular to the direction of the light rays and passing through a predetermined point, and pixel values corresponding to the light rays incident on the respective points in a direction perpendicular to the plane are associated with each other.

69. An image processing method according to claim 68, wherein the intermediate data is image data representing the pixel values for the positions of the respective points with regard to the direction of the light rays.

70. An image processing method according to claim 68, wherein the intermediate data is image data representing the pixel values for the respective points on the plane with regard to each direction of the light rays.

71. An image processing method according to claim 67, wherein the intermediate-data converting step uses, as pixel values of pixels on a virtual screen that is a predetermined virtual screen, pixel values corresponding to the light rays that coincide with straight lines connecting the viewpoint and the pixels on the virtual screen in the intermediate data, and uses image data composed of the pixel values on the virtual screen as an image of the object as viewed from the viewpoint.

72. An image processing method according to claim 68, further comprising an interpolating step of interpolating missing pixel values on the plane passing through the predetermined point.

73. An image processing method according to claim 66, further comprising a display step of displaying an image of the object as viewed from the viewpoint.

74. A non-transitory program recording medium having recorded thereon a program that is executed by a computer, the program comprising:
- an intermediate-data output step of outputting intermediate data in a predetermined format,
- wherein the intermediate data is converted from a first image data and includes pixel values corresponding to light rays from an object and a missing pixel value of the intermediate data is interpolated by using at least one pixel value that is on adjacent planes, an adjacent plane associated with a different view point from the same designated position, the at least one pixel value having same coordinates as the missing pixel value;
- a viewpoint output step of outputting position information of a viewpoint for the object; and
- an intermediate-data converting step of generating an image of the object as viewed from the viewpoint, using the intermediate data,
- wherein each missing pixel that has an interpolated pixel value is excluded from being used in an interpolation process of another missing pixel.

* * * * *